(12) United States Patent
Tabbara et al.

(10) Patent No.: US 6,460,043 B1
(45) Date of Patent: Oct. 1, 2002

(54) METHOD AND APPARATUS FOR OPERATING ON DATA WITH A CONCEPTUAL DATA MANIPULATION LANGUAGE

(75) Inventors: Bassam Tabbara, Seattle, WA (US); Rico Mariani, Kirkland, WA (US); Kristi L. Brandes, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/258,417

(22) Filed: Feb. 26, 1999

Related U.S. Application Data

(63) Continuation-in-part of application No. 09/018,287, filed on Feb. 4, 1998, now Pat. No. 6,148,296.

(51) Int. Cl.[7] .............................................. G06F 17/30
(52) U.S. Cl. ........................ 707/100; 707/101; 707/3; 707/4
(58) Field of Search .............................. 707/2, 3, 100, 707/101, 4, 102

(56) References Cited

U.S. PATENT DOCUMENTS

| | | | |
|---|---|---|---|
| 5,201,047 A | 4/1993 | Maki et al. ..................... | 707/4 |
| 5,377,103 A | 12/1994 | Lamberti et al. .............. | 704/9 |
| 5,418,957 A * | 5/1995 | Narayan ........................ | 717/1 |
| 5,495,604 A * | 2/1996 | Harding et al. ............. | 707/102 |
| 5,519,855 A | 5/1996 | Neeman et al. ................ | 707/3 |
| 5,548,755 A | 8/1996 | Leung et al. ................... | 707/2 |
| 5,548,770 A | 8/1996 | Bridges .......................... | 707/2 |
| 5,590,319 A | 12/1996 | Cohen et al. ................... | 707/4 |
| 5,590,321 A | 12/1996 | Lin et al. ...................... | 707/10 |
| 5,600,831 A | 2/1997 | Levy et al. ..................... | 707/2 |

(List continued on next page.)

OTHER PUBLICATIONS

Managaki et al., A Database Design System with Conceptual Model Description Language, IEEE online, pp. 141–146, Nov. 1979.*

Owei et al., Natural Language Query Filtration in the Conceptual Query Language, IEEE online, pp. 539–549, Jan. 1997.*

Jarzabek et al., Model–Based Design of Tools for Business Understanding and Re–Engineering, IEEE online, pp. 328–337, Jul. 1995.*

*Primary Examiner*—Greta L. Robinson
(74) *Attorney, Agent, or Firm*—Lee & Hayes, PLLC

(57) ABSTRACT

A data services layer is disclosed which maintains a dictionary of conceptual information and physical information about the data. Machine-readable requests to access the data are in a form related to a conceptual organization of the data, and is not specific to a physical organization of the data. A machine-readable query to obtain a subset of the data is produced by referencing the dictionary of conceptual and physical information about the data. The conceptual information is obtained from an object-relational-model of the data, and the physical information indicates how the data is organized on the data storage medium. Requests are written in a conceptual query language (CQL) which substantially uses terms belonging to or derived from a natural language. CQL includes terms in the classes of names and concepts, and wherein name terms are used to describe objects in the object-relational-model of the data, and concept terms are used to specify the data subset desired. Concept terms specify Facts desired from the data, and filters and sort specifications to be applied to the Facts. In an example embodiment, the data is organized in rows, and CQL includes a select command that retrieves data in rows. A set of data representing a profile of performance characteristics related to how to retrieve data is provided, and queries are formed based at least in part on the performance characteristics.

48 Claims, 47 Drawing Sheets

U.S. PATENT DOCUMENTS

| | | | |
|---|---|---|---|
| 5,615,337 A | 3/1997 | Zimowski et al. | 707/3 |
| 5,632,015 A | 5/1997 | Zimowski et al. | 707/3 |
| 5,666,526 A | 9/1997 | Reiter et al. | 707/2 |
| 5,734,887 A * | 3/1998 | Kingberg et al. | 707/100 |
| 5,806,059 A | 9/1998 | Tsuchida et al. | 707/2 |
| 5,822,747 A * | 10/1998 | Graefe et al. | 707/2 |
| 5,842,212 A | 11/1998 | Ballurio et al. | 707/100 |
| 5,857,180 A | 1/1999 | Hallmark et al. | 707/2 |
| 5,890,150 A | 3/1999 | Ushijima et al. | 707/3 |
| 5,893,095 A | 4/1999 | Jain et al. | 707/6 |
| 5,918,225 A * | 6/1999 | White et al. | 707/3 |
| 5,999,664 A | 12/1999 | Mahoney et al. | 382/305 |
| 6,167,405 A * | 12/2000 | Rosensteel, Jr. et al. | 707/102 |

* cited by examiner

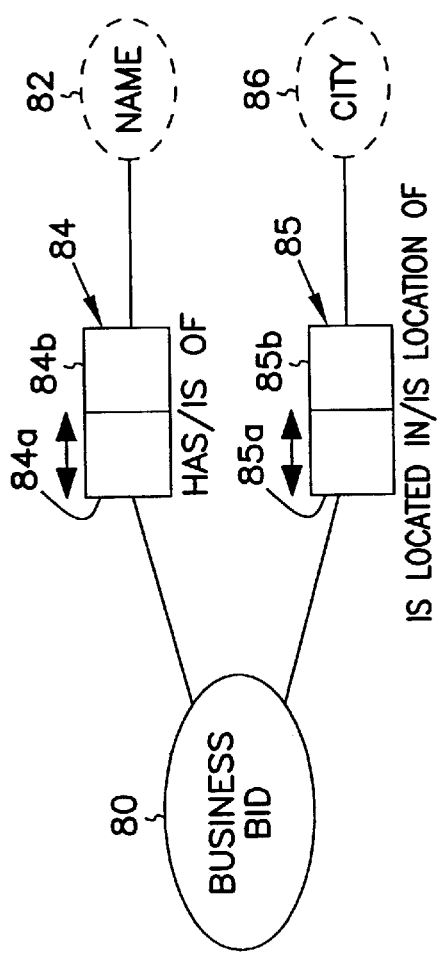

| SEntity ||||
| --- | --- | --- |
| Datatype | Fieldname | Comment |
| ENTITYID | eid | Persistent Unique Entity ID |
| WCHAR | wszEntityName[k_cchMaxConceptualName] | Name of Entity |
| UINT | cSuperTypes | If this entity is a subtype, this is the count of its supertypes. If the entity has more than one super type (multiple inheritance), then the first entry in this array is the primary supertype |
| SsuperType | asupt[k_MaxSupertypes] | If this entity is a subtype this array indicates the relevant IDs |
| PREDICATEID | ridNested | The Predicate ID of the nested predicate if any. If this a nested entity then we will use the physical mapping information from the predicate and ignore ymap below. |
| SPhysicalMapping | ymap | Physical mapping information. This is the mapping information that uniquely identifies an instance of this entity in the physical schema. |

FIG. 6A

| SSuperType |||
| --- | --- | --- |
| Datatype | Fieldname | Comment |
| ENTITYID | eid | the entity id of the supertype |
| SPhysicalMapping | ymapToSuperType | this is the physical mapping information from the subtype to the supertype |

FIG. 6B

| SValue | | |
|---|---|---|
| Datatype | Fieldname | Comment |
| VALUEID | vid | Persistent Unique Value ID. |
| INT | iMin | The minimum range if this is a range value constraint |
| WCHAR | wszValueName[k_cchMaxConceptualName] | Name of Value |
| SDataTypeInfo | dti | Type info for this value |
| UINT | cValueConstraints | The count of value constraints that should be applied to this value object |
| SValueConstraint * | avcons | Array of SValueConstraint that hold the allowed values/ranges |
| LPWSTR | pwszDefaultValue | A default value for this value object (string representation) |

FIG. 7A

| SValueConstraint | | |
|---|---|---|
| Datatype | Fieldname | Comment |
| BOOL | fRange | Is this a range value constraint. Range value constraints can only be used on Numeric data types. |
| INT | iMin | The minimum range if this is a range value constraint |
| INT | iMax | The maximum range if this is a range value constraint |
| LPWSTR | pwszValue | One of the allowed values for value constraints. These must be the same data type (string representation) as the value object for which they are applied |

FIG. 7B

| SConceptualPredicate | | |
|---|---|---|
| Datatype | Fieldname | Comment |
| PREDICATEID | rid | Persistent unique predicate ID |
| WCHAR | wszPredicateName[k_cchMaxConceptualName] | The canonical predicate name |
| UINT | cRoleBoxes | Count of roles in this predicate |
| SRoleBox * | arb | An array of role structures for each role, in role ordinal order |
| SPhysicalMapping | ymap | This is the stand-alone mapping information for the predicate |

FIG. 8A

| SRoleBox | | |
|---|---|---|
| Datatype | Fieldname | Comment |
| PREDICATEID | rid | The predicate ID that this role belongs to |
| UINT | irb | The position of the role within the predicate |
| VALUEID | vidRolePlayer | the value object that is playing this role (if non-null then eidRolePlayer must be null) |
| ENTITYID | eidRolePlayer | the entity object that is playing this role (if non-null then vidRolePlayer must be null) |
| BOOL | fMandatory | Is this role mandatory (in the ORM sense) |
| BOOL | fUnique | Is this role unique (in the ORM sense) |
| SPhysicalMapping | ymap | Physical mapping information. This is the mapping information from the predicate to the entity or value object identified by eidRolePlayer or vidRolePlayer. |

FIG. 8B

| SDataTypeInfo | | |
|---|---|---|
| Datatype | Fieldname | Comment |
| DBTYPE | usDataType | The OLE DB data type (see OLE DB specifications for the possible values, there are many, they correspond to things like integers, numerics, dates, times, currency, etc.) |
| UINT | uiCharacterLength | The maximum possible length of a value in the column – applies to columns like char(255) or varchar(255) |
| UINT | uiOctetLength | Maximum length in octets(bytes) of the column. |
| USHORT | usNumericPrecision | If the column's data type is numeric, this is the maximum precision of the column |
| USHORT | usNumericScale | If the column's type indicator is DBTYPE_DECIMAL or DBTYPE_NUMERIC this is the number of digits to the right of the decimal point |
| UINT | uiDatetimePrecision | Datetime precision (number of digits in the fractional seconds portion) of the column if the column is a datetime or interval type |
| DBCOLUMNFLAGS | dwFlags | Column flags as described in DBCOLUMNFLAGS in the OLE DB documention. Encodes things like nullable etc. |

FIG. 9

| SConstraint |||
|---|---|---|
| Datatype | Fieldname | Comment |
| CONSTRAINTID | csid | Persistent Unique Constraint ID |
| EConstraintType | eConstraintType | Constraint Type from enumeration |
| UINT | cTargets | Count of Target Role Boxes in this constraint |
| SConstraintTarget * | acont | An array of Constraint targets that are used by this constraint. I.e. the contrained roles in the contrained predicates |
| UINT | cSequences<br><br>cSequences is related to the constraint type in the following ways:<br><br>eConstraintType_Uniqueness =>cSequences = 1<br><br>eConstraintType_Mandatory => cSequences = 1<br><br>eConstraintType_Index => cSequences = 1<br><br>eConstraintType_SubtypeExclusiveTotal => cSequences = 1<br><br>eConstraintType_Equality => cSequences = 2<br><br>eConstraintType_Subset cSequences = 2<br><br>eConstraintType_Frequency => cSequences = 1<br><br>eConstraintType_Exclusion => cSequences > 1<br><br>eConstraintType_Ring, => cSequences == 1 AND cTargets = 2 | The count of sequences in this constraint. If the sequence is > 1 then cTargets must be divisible by cSequences, i.e, cTarget mod cSequence == 0 |
| UINT | uiMinFrequency | Minimum frequency for eConstraintType = eConstraintType_Frequency |
| UINT | uiMaxFrequency | Maximum frequency for eConstraintType = eConstraintType_Frequency |
| ERingType | eRingType | The ring type for eConstraintType = eConstraintType_Ring (see Object Relation Modeling documentation for more information about Ring Constraints) |
| BOOL | fPrimaryUniqueness | True if this is the primary uniqueness constraint (see ORM documentation for more info about Primary Uniqueness Constraints) |

FIG. 10A

| Constraint Types (EConstraintType) ||
|---|---|
| Name | Value |
| eConstraintType_Invalid | 0 |
| eConstraintType_Uniqueness | 1 |
| eConstraintType_Mandatory | 2 |
| eConstraintType_Index | 3 |
| eConstraintType_SubtypeExclusiveTotal | 4 |
| eConstraintType_Equality | 5 |
| eConstraintType_Subset | 6 |
| eConstraintType_Frequency | 7 |
| eConstraintType_Exclusion | 8 |
| eConstraintType_Ring | 9 |
| eConstraintType_Custom | 10 |

FIG. 10B

| SConstraintTarget |||
|---|---|---|
| Datatype | Fieldname | Comment |
| PREDICATEID | rid | The predicate ID that this constraint belongs to |
| UINT | irb | the role position of the role (index of a rolebox) |

FIG. 10C

| Ring Types (ERingType) ||
|---|---|
| Name | Value |
| eRingType_Invalid | 0 |
| eRingType_Irreflexive | 0x1 |
| eRingType_Intransitive | 0x2 |
| eRingType_Acyclic | 0x4 |
| eRingType_Asymmetric | 0x8 |
| eRingType_Antisymetric | 0x10 |
| eRingType_Aymmetric | 0x20 |

FIG. 10D

| SPhysicalMapping |||
|---|---|---|
| Datatype | Fieldname | Comment |
| EPhysicalMappingType | ePhysicalMappingType | what kind of mapping are we talking about (standalone, linking, etc.) |
| COLUMNID | cidValue | The column ID is used only for value objects to define which column they use in the physical schema |
| KEYID | kidPrimary | A primary (or unique key) that is used for entity objects as a reference mode. This will be used as either a start or end point for the map path. If this is non-null then cidValue will be null and vice-versa |
| UINT | cMappingRules | count of mapping rules in the array below. If cidValue is non-null then this must be zero (no mapping rules apply to value objects) |
| SMappingRule | amrul[k_MaxMappingRules] | an array of physical mapping rules. These form a path that will be used to perform the correct mapping. |

FIG. 11A

| Physical Mapping Types (EPhysicalMappingType) ||
|---|---|
| Name | Value |
| ePhysicalMappingType_Invalid | 0 |
| ePhysicalMappingType_Insertable | 1 (this means that the indicated physical mapping completely specifies all needed columns to allow insertion of new data) |
| ePhysicalMappingType_Multi_Usage | 2 (this means that a physical mapping has more than one usage tables in it which makes it impossible to insert new data, but data can be selected) |
| ePhysicalMappingType_LoosePK | 3 (this means that a non-nullable column hasn't been fully constrained and therefore new data cannot be inserted — usually this happens because part of the primary key of a table isn't specified in the mappings hence the name) |

FIG. 11B

| SMappingRule |||
|---|---|---|
| Datatype | Fieldname | Comment |
| EMappingRuleType | eMappingRuleType | Defines the type of mapping rule that will be in the union below |
| UMappingRule | uMappingRule | Space to hold the actual mapping rule |

FIG. 11C

| Mapping Rule Types (EMappingRuleType) ||
|---|---|
| Name | Value |
| eMappingRuleType_Invalid | 0 |
| eMappingRuleType_ForeignKey | 1 |
| eMappingRuleType_Constraint | 2 |

FIG. 11D

| UmappingRule (union) |||
|---|---|---|
| Datatype | Fieldname | Comment |
| KEYID | kidForeign | The id of the foreign key that is this step in the mapping rule, OR |
| SSimpleConstraint | Scons | A simple column constraint |

FIG. 11E

| SSimpleConstraint |||
|---|---|---|
| Datatype | Fieldname | Comment |
| COLUMNID | cid | The id of the constrained column |
| LPWSTR | PwszValue | This is the value of the column. This is a passthrough value that will be passed as is to the underlying provider. The comparison operator is in this passthrough string |

FIG. 11F

| STable | | |
|---|---|---|
| Datatype | Fieldname | Comment |
| TABLEID | tid | Persistent Table ID |
| CATALOGID | gid | the catalog this table is in |
| WCHAR | wszTableName[k_cchMaxPhysicalName] | Name of Table |

FIG. 12

| SCatalog | | |
|---|---|---|
| Datatype | Fieldname | Comment |
| CATALOGID | gid | Presistent Catalog ID |
| WCHAR | wszCatalogName[k_cchMaxPhysicalName] | Name of Catalog |

FIG. 13

| SColumn | | |
|---|---|---|
| Datatype | Fieldname | Comment |
| COLUMNID | cid | Persistent Unique Column ID |
| TABLEID | tidParent | The parent table id of this column |
| WCHAR | wszColumnName[k_cchMaxPhysicalName] | Name of Column |
| UINT | UiOrdinalPositon | The ordinal position of the column in the table. |
| UINT | uiColumnFlags | A bitmask that describes the column characteristics. DBCOLUMNFLAGS in the OLE DB documentation defines all the bits in this bit mask. |
| BOOL | fNullable | TRUE : The column might be nullable<br>FALSE : The column is known not to be nullable |
| SDataTypeInfo | dti | DataType Information |

FIG. 14

| SKey | | |
|---|---|---|
| Datatype | Fieldname | Comment |
| KEYID | kid | Persistent Key ID |
| TABLEID | tidParent | The parent table id of this key |
| CATALOGID | gidParent | the catalog this key is in (held here for easy access, implied by tidParent) |
| WCHAR | wszKeyName[k_cchMaxPhysicalName] | Name of Key |
| EKeyType | eKeyType | Key type according to the enumeration EKeyType |
| UINT | cKeyColumns | Count of Columns that are part of this key |
| COLUMNID | acidKeyColumns[k_MaxColumnInKey] | An array of column IDs that make up this key in column order |
| KEYID | kidReferenced | Referenced Key ID in referenced table (this is used only for foreign and virtual foreign keys and it is the unique key that the foreign key 'points' to). See SQL Server literature for a complete treatment of foreign keys. |

FIG. 15

| Key Types (EKeyType) | |
|---|---|
| Name | Value |
| eKeyType_Invalid | 0 |
| eKeyType_Primary | 1 |
| eKeyType_Alternate | 2 |
| eKeyType_Foreign | 3 |
| eKeyType_VirtualForeign | 4 |

Business Entity:
  [Business] *
    PKBusiness

134

Restaurant Entity:
  [Restaurant]
    PKBusiness
    BusinessType = 'Restaurant'
  [Business] *
    <empty>

136

Predicate Business_has_BusinessType:
  [Business_has_BusinessType] *
    PKBusiness
  [Business] *
    <empty>
  [BusinessType] *
    BusinessType

138

Predicate Business_has_Name:
  [Business_has_Name] *
    PKBusiness
  [Business] *
    <empty>
  [Name] *
    Name

140

Predicate Business_has_Phone
  [Business_has_Phone] *
    PKBusiness
    Phone NotNull
  [Business] *
    <empty>
  [Phone] *
    Phone

142

Predicate Business_owned_by_Business
  [Business_owned_by_Business] *
    PKBusiness
    Owner NotNull
  [Ownee] *
    <empty>
  [Owner] *
    FK1

144

Predicate Business_dines_at_Restaurant
  [Business_dines_at_Restaurant] *
    PKBusiness
    Caterer NotNull
  [Business] *
    <empty>
  [Restaurant] *
    FK2

146

Predicate Restaurant_serves_Cuisine
  [Restaurant_serves_Cuisine] *
    PKBusiness
    BusinessType = 'Restaurant'
  [Restaurant] *
    <empty>
  [Cuisine] *
    TypeCuisine

FIG. 19

| | |
|---|---|
| Business Entity:<br>　[Business] *<br>　　PKBusiness<br><br>Restaurant Entity:<br>　[Restaurant] *<br>　　PKRestaurant<br>　[Business] *<br>　　FK3<br><br>Predicate Business_has_BusinessType:<br>　[Business_has_BusinessType] *<br>　　PKBusiness<br>　[Business] *<br>　　<empty><br>　[BusinessType] *<br>　　BusinessType<br><br>Predicate Business_has_Name:<br>　[Business_has_Name] *<br>　　PKBusiness<br>　[Business] *<br>　　<empty><br>　[Name] *<br>　　Name | Predicate Business_has_Phone<br>　[Business_has_Phone] *<br>　　PKBusiness<br>　　Phone NotNull<br>　[Business] *<br>　　<empty><br>　[Phone] *<br>　　Phone<br><br>Predicate Business_owned_by_Business<br>　[Business_owned_by_Business] *<br>　　PKBusiness<br>　　Owner NotNull<br>　[Ownee] *<br>　　<empty><br>　[Owner] *<br>　　FK2<br><br>Predicate Business_dines_at_Restaurant<br>　[Business_dines_at_Restaurant] *<br>　　PKBusiness<br>　　Caterer NotNull<br>　[Business] *<br>　　<empty><br>　[Restaurant] *<br>　　FK1<br><br>Predicate Restaurant_serves_Cuisine<br>　[Restaurant_serves_Cuisine] *<br>　　PKRestaurant<br>　[Restaurant] *<br>　　<empty><br>　[Cuisine] *<br>　　TypeCuisine |

FIG. 21

| | |
|---|---|
| Business Entity:<br>  [Business] *<br>    PKBusiness<br><br>Restaurant Entity:<br>  [Restaurant]<br>    PKValue<br>    AttributeID = 'BusinessType'<br>    StringValue = 'Restaurant'<br>  [Business] *<br>    FK3<br><br>Predicate Business_has_BusinessType:<br>  [Business_has_BusinessType]<br>    PKValue<br>    AttributeID = 'BusinessType'<br>  [Business] *<br>    FK3<br>  [BusinessType]<br>    StringValue<br><br>Predicate Business_has_Name:<br>  [Business_has_Name]<br>    PKValue<br>    AttributeID = 'Name'<br>  [Business] *<br>    FK3<br>  [Name]<br>    StringValue | Predicate Business_has_Phone<br>  [Business_has_Phone]<br>    PKBusiness<br>    Phone NotNull<br>  [Business] *<br>    <empty><br>  [Phone] *<br>    Phone<br><br>Predicate Business_owned_by_Business<br>  [Business_owned_by_Business]<br>    PKRelation<br>    Relation = 'Ownedby'<br>  [Owner]<br>    FK1<br>  [Ownee]<br>    FK2<br><br>Predicate Business_dines_at_Restaurant<br>  [Business_dines_at_Restaurant]<br>    PKRelation<br>    Relation = 'DinesAt'<br>  [Business]<br>    FK1<br>  [Restaurant]<br>    FK2<br><br>Predicate Restaurant_serves_Cuisine<br>  [Restaurant_serves_Cuisine]<br>    PKValue<br>    AttributeID = 'Serves'<br>  [Restaurant]<br>    FK3, FK3<br>  [Cuisine] *<br>    StringValue |

FIG. 23

Business Entity:
　[Business] *
　　B:PKBusiness

Restaurant Entity:
　[Restaurant]
　　V:PKValue
　　AttributeID = 'BusinessType'
　　StringValue = 'Restaurant'
　[Business] *
　　(BusinessID) =
　　MainCatalog:PKBusiness

Predicate Business_has_BusinessType:
　[Business_has_BusinessType]
　　V:PKValue
　　AttributeID = 'BusinessType'
　[Business] *
　　(BusinessID) = B:PKBusiness
　[BusinessType]
　　StringValue

Predicate Business_has_Name:
　[Business_has_Name]
　　V:PKValue
　　AttributeID = 'Name'
　[Business] *
　　(BusinessID) = B:PKBusiness
　[Name]
　　StringValue

Predicate Business_has_Phone
　[Business_has_Phone]
　　B:PKBusiness
　　Phone NotNull
　[Business] *
　　<empty>
　[Phone] *
　　Phone

Predicate Business_owned_by_Business
　[Business_owned_by_Business]
　　B:PKRelation
　　Relation = 'Ownedby'
　[Owner]
　　FK1
　[Ownee]
　　FK2

Predicate Business_dines_at_Restaurant
　[Business_dines_at_Restaurant]
　　B:PKRelation
　　Relation = 'DinesAt'
　[Business]
　　FK1
　[Restaurant]
　　FK2

Predicate Restaurant_serves_Cuisine
　[Restaurant_serves_Cuisine]
　　B:PKValue
　　AttributeID = 'Serves'
　[Restaurant]
　　FK3, FK3
　[Cuisine] *
　　StringValue

FIG. 25

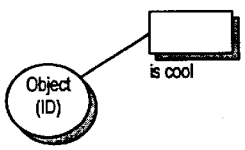

FIG. 26

| | |
|---|---|
| Object<br>PK Object ID<br>Is cool | Object has ObjectAttributes<br>PK Object ID    PK,FK Object ID<br>Etc              PK AttributeID<br>                  IntegerValu<br>                  StringValue |
| Object Entity:<br>   [Object] *<br>      PKObject<br><br>Predicate Object_is_cool<br>   [Object_is_cool] *<br>      PKObject<br>      Iscool = 1<br>   [Object]<br>      <empty> | Object Entity:<br>   [Object] *<br>      PKObject<br><br>Predicate Object_is_cool<br>   [Object_is_cool]<br>      PKObjectAttributes<br>      AttributeID = 'IsCool'<br>   [Object] *<br>      FKObject |

FIG. 27

*command*      : *select_command*
         | *insert_command*
         | *update_command*
         | *delete_command*

*select_command*     : *"SELECT" simple_select*
            | *"SELECT" select_with_context*

*simple_select* : *[options] referenced_object ["AS" identifier] [filter] [sort_clause]*

*select_with_context* : *referenced_object ["AS" identifier ] fact_list [sort_clause]*

*fact_list*    : *"{" fact { "," fact } "}"*

*fact*   : *simple_select*
      | *filter*
      | *["SELECT"] select_with_context*

*nested_context*      : *[options] referenced_object ["AS" identifier] fact_list [sort_clause]*

FIG. 28A

```
sort_clause      : "sort" "by" "(" referenced_object ["desc"] {"," referenced_object ["desc"] } ")"

options          : "[" "optional" "]"
                 | "[" "required" "]"
                 | "[" "exclude" "]"

insert_command   : "INSERT" identifier "{" insert_list "}"

insert_list      : insert_clause { "," insert_clause } insert_clause    : insert_object
                 | insert_context insert_context   : identifier [ "[" number "]" ] "{" insert_object_list "}"

insert_object_list : insert_object { "," insert_object } insert_object    : object "=" value_expr
                 | object "=" array_value
                 | object "=" "default"

array_value      : "{" value_expr_list "}"
```

FIG. 28B

*update_command* : *"UPDATE" update_context*

*update_context* : *identifier "{" update_list "}"*

*update_list* : *update_clause { "," update_clause }*

*update_clause* : *update_object*
                  | *filter*
                  | *update_context*

*update_object* : *object "=" value_expr*

*delete_command* : *"DELETE" [delete_options] identifier [filter]*

*delete_options* : *"cascade"*

*filter* : *"[" filter_expr "]"*

*filter_expr* : *filter_term*
                | *filter_term "or" filter_expr*

*filter_term* : *filter_primary*
                | *filter_primary "and" filter_expr*

*filter_primary* : *predicate*
                | *"(" filter_expr ")"*

FIG. 28C

*predicate*        : *[referenced_object] string_match*

| *[referenced_object] between_expr*

| *[referenced_object] in_expr*

| *[referenced_object] comparison*

*comparison*      : *comp_op value_expr*

*comp_op*         : "=" | ">" | ">=" | "<" | "<=" | "<>"

*string_match*   : *["not"] "like" value_expr*

*between_expr*   : *["not"] "between" "(" value_expr "," value_expr ")"*

*in_expr*          : *["not"] "in" "(" value_expr_list ")"*

*referenced_object*    : *object*

| *aggregate_object*

| *datetime_object*

*object* : *{ object_name "." } object_name*

*object_name*    : *[ identifier ":" ] identifier*

*aggregate_object*      : *aggregate_func "(" object ")"*

*datetime_object*     : *datepart*

| *dateadd*

FIG. 28D

*aggregates_func*     : *"count"*

| *"sum"*

| *"avg"*

| *"max"*

| *"min"*

*datepart*     : *"datepart" "(" identifier "," object ")"*

*dateadd*     : *"dateadd" "(" identifier "," number "," object ")"*

*value_expr_list*     : *value_expr { "," value_expr }*

*value_expr*     : *string*

| *number*

| *special_scalar*

| *referenced_object*

*special_scalar*     : *"currentdate"*

| *"currenttime"*

| *"currentdatetime"*

| *"NULL"*

FIG. 28E

*identifier*     *: [A-Za-z_][a-zA-Z_0-9]\**

*string : '([^']\*('')\*)\*'*

*number*     *: [0-9-+][0-9]\*(\.[0-9]\*)(\[eE][0-9+-][0-9]\*)*

*whitespace*     *: [\f\v\r\n\t ]+*

*comment*     *: --[^\n]\*\n*

FIG. 29

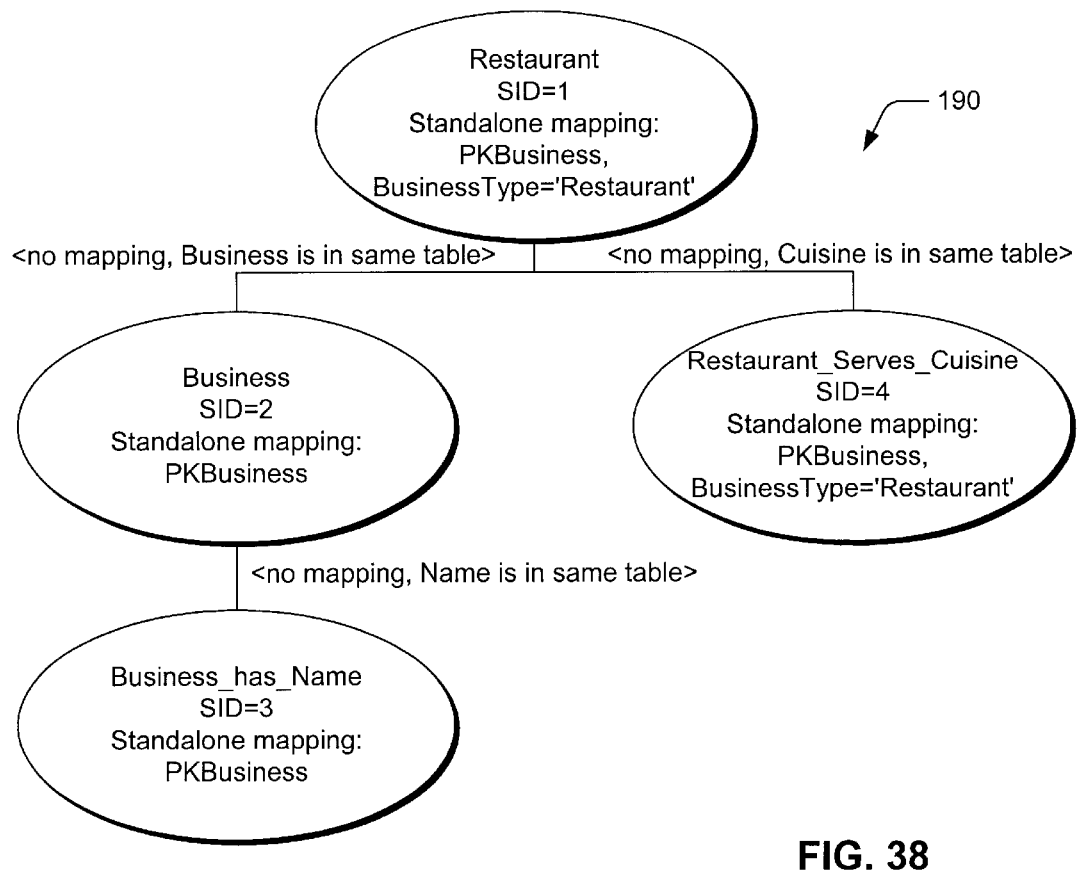
FIG. 38
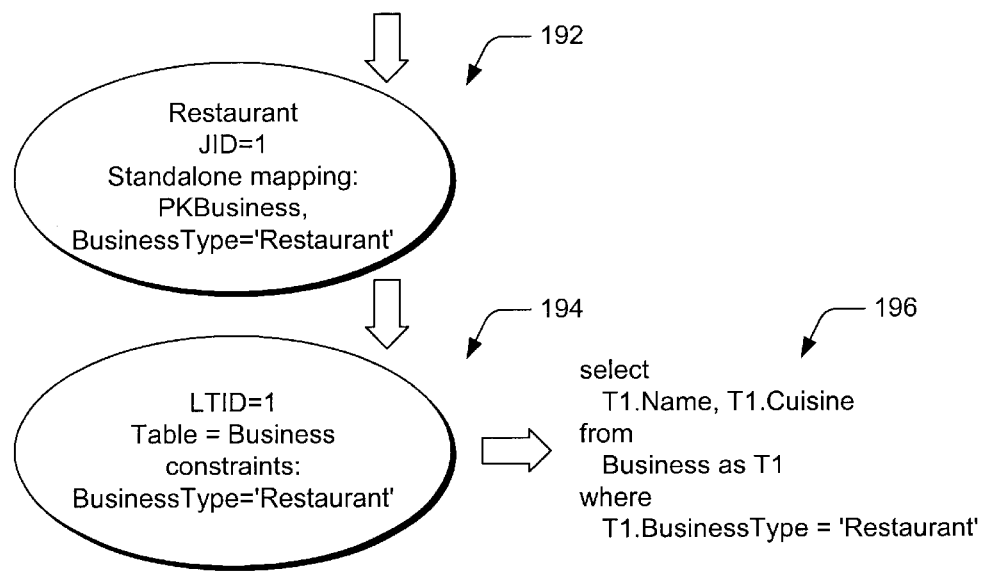

METHOD AND APPARATUS FOR OPERATING ON DATA WITH A CONCEPTUAL DATA MANIPULATION LANGUAGE

CONTINUATION DATA

This application is a continuation-in-part of U.S. Ser. No. 09/018,287, now U.S. Pat. No. 6,148,287 entitled "Automatic Generation of Database Queries," and filed Feb. 4, 1998.

COPYRIGHT NOTICE AND PERMISSION

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright ©1998, Microsoft Corporation.

TECHNICAL FIELD OF THE INVENTION

The present invention pertains generally to database technology, and more particularly to method and apparatus for facilitating database queries.

BACKGROUND OF THE INVENTION

Database Management Systems (DBMS) such as Microsoft's SQL Server provide for storing and managing information. The majority of applications that need to access data stored in such a system go through a data access layer such as the Microsoft Open Database Connectivity (ODBC) layer or the Microsoft OLE database (OLE DB). These layers provide many services that make writing applications that need access to information stored in databases much easier. These services include running database queries and fetching result sets without having to know the underlying protocols needed to communicate with the DBMS.

Most data access layers provide a way to pass database commands directly to the underlying DBMS. These commands are captured in a database language that is understood by the DBMS or can be readily translated using a DBMS driver. For example, ODBC uses SQL (Structured Query Language) as the language for issuing commands to the DBMS. Database query languages are comprehensive and cover operations from fetching simple data sets to backing/restoring of databases. Most database applications, however, use only a small subset of the database query language, specifically commands that fetch and update the data sets.

Referring to FIG. 1, there is shown a simplified diagram illustrating an example prior art configuration of a consumer application 10 which queries an underlying provider 12 such as a SQL database. Consumer application 10 may, for example, be a web interface allowing visitors to access data in provider 12. In the most common prior art configurations, consumer application 10 may include physical queries 16, such as coded data manipulation language (DML) queries, for example in SQL, that retrieve data from provider 12 in response to requests 18 for data entered by a user at the front end of the consumer application 10. In this manner, the user may be presented with a simplified front end interface with a set of standard data request options which allow access to data stored in provider 12 that may be of considerable complexity. Each data request option is typically implemented by a corresponding coded DML query. The user thus need not learn or understand how to create or write a DML request, as this is handled by the consumer application 10. This configuration works well when either or both the consumer application 10's data request options and the structure or schema of data stored in provider 12 remain relatively static. When either or both of these elements are routinely modified or changed, it can be burdensome, or at least time consuming, to rewrite the coded DML queries to accommodate such changes. Furthermore, new versions of the DML interpreters (e.g. MS SQL Server) often have different performance characteristics than previous versions, requiring additional re-writing of DML to achieve or maintain good performance.

Writing applications that rely heavily on reading and writing information to a database back-end is not trivial. In such applications, consideration must be given to efficiently retrieving data from the DBMS, or at least efficiently transferring requests and data between the front-end consumer and the DBMS. For example, in a web site application it is desirable, for reasons of efficiency and speed, to keep to a minimum the number of round trips between the web server and a server maintaining the DBMS. Another challenge in implementing a DBMS accessed through a front-end consumer is maintenance of the front-end code. Such code must accommodate changes in the underlying structure or schema of the DBMS tables, columns and constraints, and changes to the data that is sought by the front-end consumer for display or delivery to a user. It is undesirable to rewrite front-end code each time such changes are needed.

An example of a DBMS accessed through a front-end consumer is a web site that provides customers with an interface to browse and buy books online, wherein information about the books is stored in a SQL server database. When a user asks to display information about a book the web server retrieves the information from the database, renders it using HTML, and sends it back to the user. This effectively means that just about every user request will result in a database query. Also, changing and improving such a web site usually means that the queries going to the SQL server have to change, resulting in code maintenance. For example, if a display of a book's ISBN number is added to the web site, the query to the database must be changed to get the ISBN number in addition to the other information that had previously been retrieved. This may also mean that the underlying schema of the database might change. For example, if the ISBN number was not previously stored in the database it would have to be added, requiring a change to the underlying schema of the database. This change in the schema may require that any existing code for executing requests be updated or changed. Obviously, it is desirable if rewriting of the code required to query a DBMS can be kept to a minimum.

Therefore, there is a need for a system which can automatically generate queries based on a high level specification of the data required by the front-end consumer and from a high level description of the schema of the back end DBMS. One such system is described in the above referenced U.S. patent application Ser. No. 09/018,287, assigned to the same assignee as the present application, entitled "Automatic Generation of Database Queries", and filed Feb. 4, 1998, (U.S. '287) the entire disclosure of which is hereby incorporated herein. Generally, the system of U.S. '287 allows a consumer application to submit "high-level" database queries to a "schematizer" program which in turn formulates "lower-level" queries for the DBMS, for example in the form of the SQL query language. This operation thus allows the schematizer to make changes in the underlying database transparent to the application, and simplifies the process of rewriting the application's queries to the schematizer. U.S. '287 is not admitted to be prior art to the present application.

SUMMARY OF THE INVENTION

According to one aspect of the invention there is provided method, apparatus and software for querying data stored on a computer readable medium, which includes creating a dictionary of conceptual information and physical information about the data, and storing the data on a computer readable data storage medium. Requests to access the data are in a form related to a conceptual organization of the data and are not specific to a physical organization of the data. Requests specific to the physical organization of the data are created to operate on the data, wherein these requests are formed by referencing the dictionary of conceptual and physical information about the data.

According to other aspects, the conceptual information is obtained from an object-relational-model of the data, and the physical information indicates how the data is organized on the data storage medium. Requests are written in a conceptual query language (CQL) which substantially uses terms belonging to or derived from a natural language.

BRIEF DESCRIPTION OF THE DRAWING

FIG. 4B illustrates an object relational model.

FIG. 4C illustrates a conceptual query language query according to one example embodiment of the invention.

FIGS. 6A–16 illustrate data dictionary mapping information according to one example embodiment of the invention.

FIGS. 17, 18, and 19 are an example object-relational-diagram, corresponding physical schema, and corresponding annotated mapping file, respectively.

FIGS. 20 and 21 are an example physical schema and corresponding annotated mapping file, respectively.

FIGS. 22 and 23 are an example physical schema and corresponding annotated mapping file, respectively.

FIGS. 24 and 25 are an example physical schema and corresponding annotated mapping file, respectively.

FIGS. 26 and 27 are an example physical schema and corresponding annotated mapping file, respectively.

FIGS. 28A–28E illustrate the grammar for an example embodiment of the present invention.

FIG. 29 illustrates the lexemes of an example embodiment of the present invention.

FIG. 38–40C illustrate example translations of conceptual SELECT queries to physical queries according to one example embodiment of the invention.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

Hardware and Operating Environment

Figure 2:
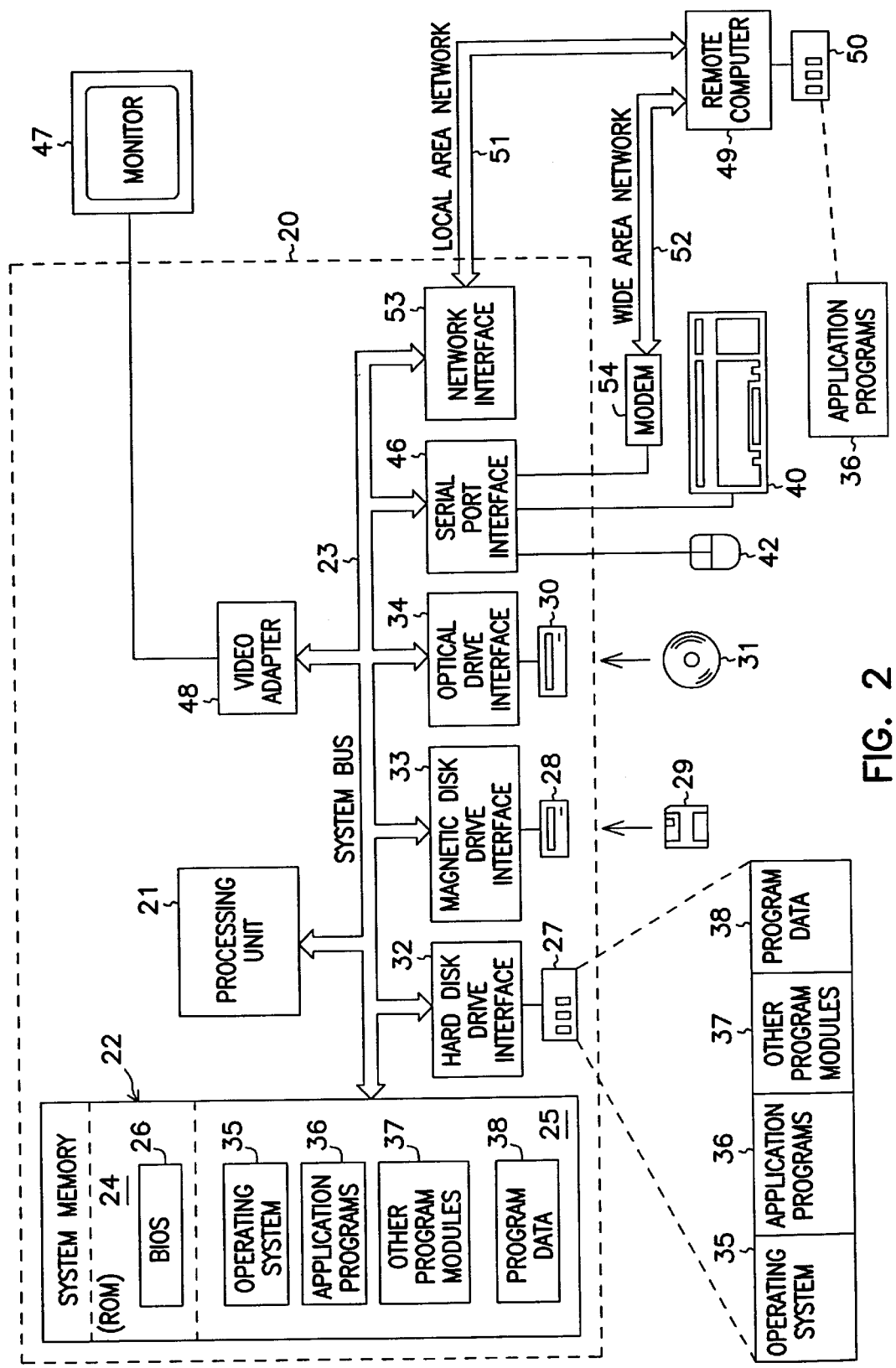
FIG. 2 illustrates a simplified overview of an example embodiment of a computing environment for the present invention.

Referring to FIG. 2, a diagram of the hardware and operating environment in conjunction with which embodiments of the invention may be practiced is shown. The description of FIG. 2 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc. that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 2 for implementing the invention includes a general purpose computing device in the form of a computer 20, including a processing unit 21, a system memory 22, and a system bus 23 that operatively couples various system components, including the system memory, to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, or an electrical signal such as an electronic data stream through a communications channel, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 2. The logical connections depicted in FIG. 2 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked enviromnent, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, an embedded computer or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

EXAMPLE EMBODIMENTS

OVERVIEW

Figure 3:
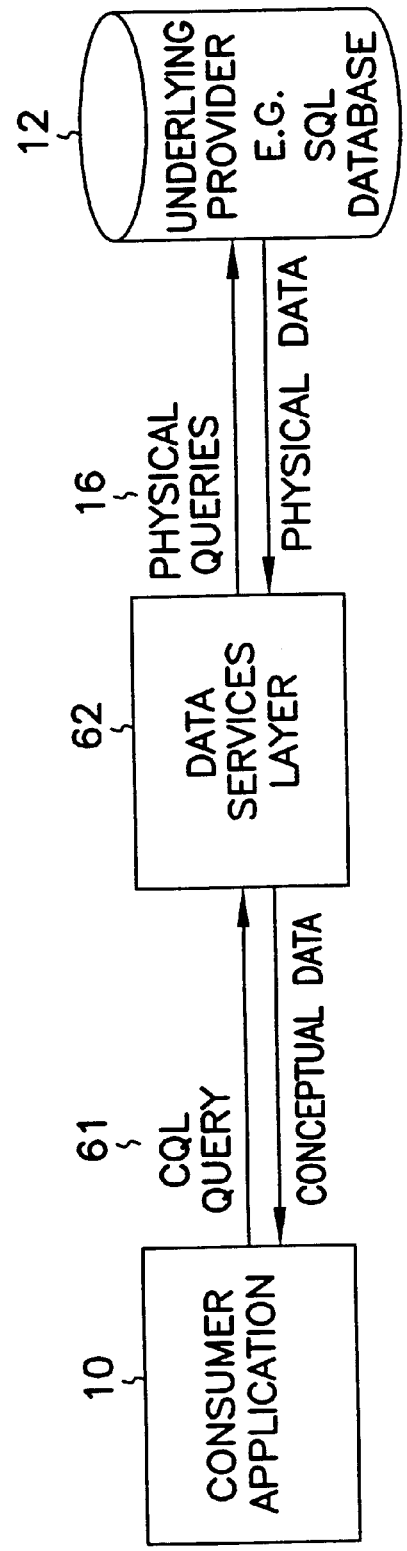
FIG. 3 is a simplified overview of an example embodiment of the present invention.

Referring now to FIG. 3, there is shown an overview of an example embodiment of the present invention. In the architecture of FIG. 3, a data services layer (DSL) 62 is interposed between a consumer application 10 and an underlying provider 12, which may be, for example, a SQL database. Instead of providing physical queries, such as DML (data manipulation language) queries, to provider 12, consumer application 10 provides a "conceptual query language" (CQL) query 61 to the DSL 62. The CQL 61 query is interpreted by the DSL 62, which in turn initiates one or more physical queries 16, such as DML queries, that are supplied to provider 12. While the invention is described herein in terms of use with a DML, it is not so limited, and DSL 62 can be configured to generate queries in other formats or in other manners, and to work with an underlying store even if it does not support a DML. For example, DSL 62 may be configured to query an indexed sequential access method store.

The CQL of the present invention provides a query language and associated rules, procedures and syntax by which data may be accessed and manipulated at a conceptual level. CQL also provides an abstraction over distributed, heterogeneous physical data stores. A principal underlying concept of CQL is the modeling of data on an abstract level in which it is easy to understand the relationships between data elements, and the use of this abstract model to reference data without respect to the underlying physical schema in which the data is stored. CQL provides language features by which data can be selected, inserted, updated, deleted, filtered and sorted without reference to the physical schema. Furthermore CQL provides query results in conceptual rowsets. Thus, it is possible to author CQL queries without having to know relational set theory. Because CQL is more consistent with the way people design middle-tier objects or programs, it is easier to generate CQL queries than it is DML queries.

Figure 4A:
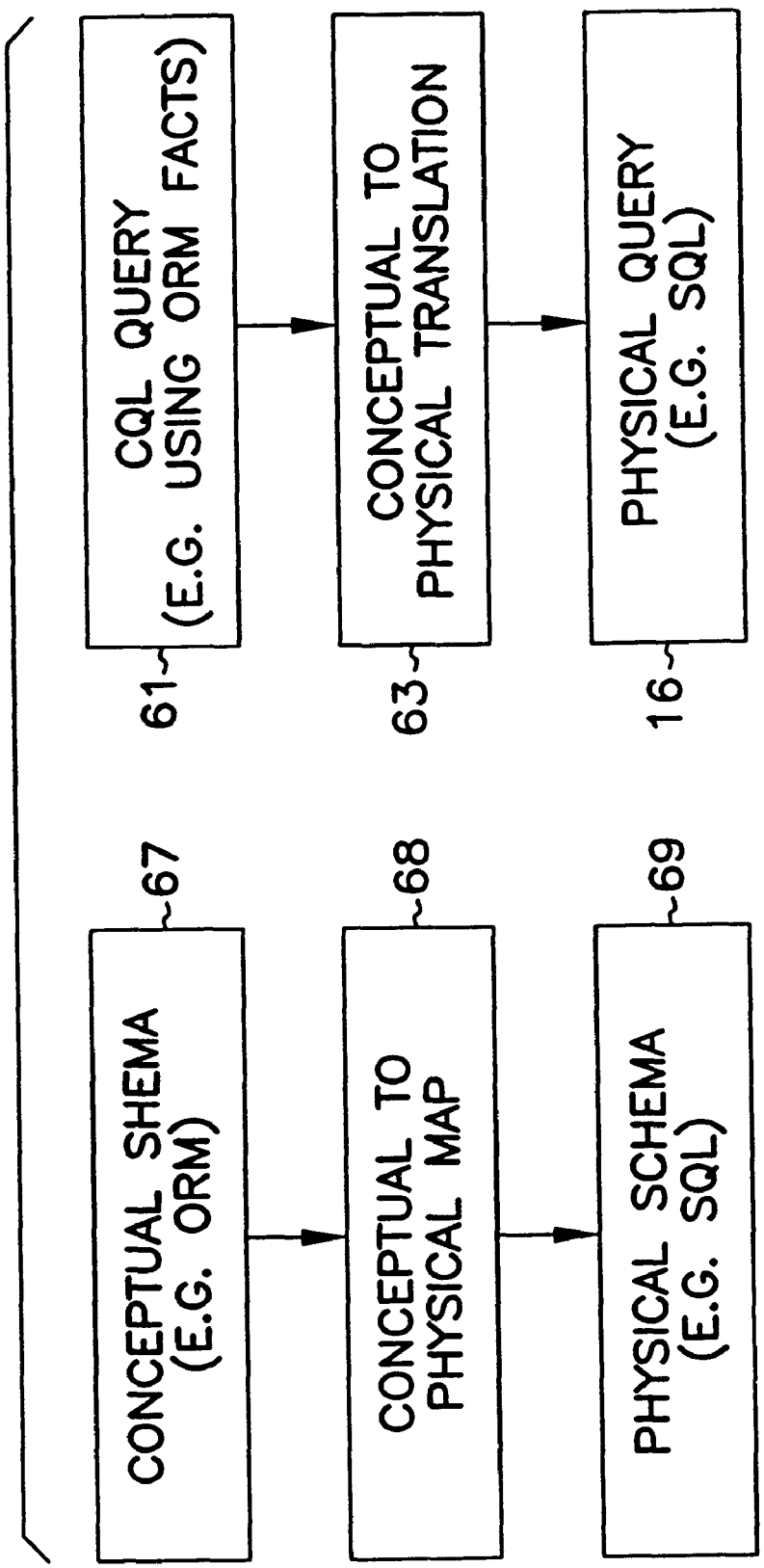
FIG. 4A illustrates a high-level overview of one example embodiment of the invention.

Referring now to FIG. 4A, there is illustrated a conceptual overview of one embodiment of the system according to the present invention. As illustrated in FIG. 4A, the system of the present invention provides that query 61 written using CQL can be translated (63) into a physical query 16, such as a DML query, or more specifically, for example, an SQL query. As also illustrated in FIG. 4A, CQL queries are formulated with reference to an abstract, conceptual schema 67, which is mapped (68) to a physical schema 69. In one example embodiment, the conceptual schema 67 is the abstract object relational model (ORM) of data. This model is mapped to, for example, a physical schema 69, such as an SQL schema, which includes catalogs, tables, columns and keys. Map 68, in one example embodiment, is formed of annotations on the conceptual schema, specifying where elements of the conceptual schema 67 are found in the physical schema 69.

As noted, fundamental to CQL is the modeling of data at a conceptual level and the mapping of the conceptual data to the physical schema 69 in which it is stored in the data store of the underlying provider 12. ORM, as described below, is one possible exemplary implementation for modeling of data at a conceptual level. It shall be understood that ORM modeling is not essential to the invention, and that other conceptual models presently known or later devised can be used for this purpose in the invention. Set forth immediately below is a brief overview of ORM modeling. A more complete description can be found in "Conceptual Schema & Relational Database Design," Second Edition, by Terry Halpin (©1995Prentice Hall/Australia). ORM is an approach to database design where, within the application domain, Objects play Roles. This view of the world allows data to be described in everyday terms—rather than requiring an artificial language that does not communicate effectively and is prone to be misunderstood. An ORM model comprises one or more Facts. A Fact is a statement, or assertion, about some piece of information within the application domain. Each Fact should be real and recognizable to anyone who is familiar with the application domain. At the most elementary level, a Fact comprises Objects and the Roles the Objects play. All the Roles in a Fact together make up the Predicate of that Fact. The great majority of Facts contain two Roles. There are two types of Objects: Entity Objects and Value Objects, as described more fully below. In the schematic of an ORM model, an Object type appears as an ellipse (solid for Entities, dashed for Values). Each Entity has a reference mode, which is typically a unique word, abbreviation, number, or combination of such that refers to a unique instance of the Entity.

Also, in an ORM diagram, a Predicate is represented by one or more roleboxes, one box for each Role in the Predicate. Each Role in a Predicate is expressed by a rolebox and is played by one Object type. In FIG. 4B, the Business Entity 80, an Entity Object, has a Name 82 and is located in a City 86, both of which are Value Objects. The abbreviation ID under the word Business in Business Entity 80, is the reference mode for this Entity. The Predicate 84 has two roleboxes, 84a and 84b. Rolebox 84a, when read from left to right, specifies that the Business Entity 80 "has" a Name 82. If the Predicate is read from right to left, rolebox 84b specifies that "The Name is of the Business." This is called inverse reading. A double headed arrow over the top of a rolebox represents a uniqueness constraint over that Role position. A uniqueness constraint limits the possible Objects that can play a given Role or sequence of Roles, so that data are not repeated. In the example of FIG. 4B, the constraint for rolebox 84b says that each business can play the role 'has name' only once—meaning businesses have only one Name, but there may be more than one business with the same, as there is no constraint on that Role. Similarly, rolebox 85 says that a Business is located in a City (85a), and that the City is the location of a Business (85b).

Referring now to FIG. 4C, a brief introduction to a query in CQL will be described. This introduction is intended to provide a frame of reference for the more detailed description to follow. FIG. 4C illustrates an example CQL SELECT query. As illustrated, the term SELECT is the command 90. The SELECT command is followed by a name, in this case the name "Business," which forms the Scope 92 of the query. Within the "{}" clause, the term "Name" is a Fact 94, and the term "City" is another Fact 95. The Fact 95 may optionally be followed by a Filter expression 96, in this example [='Seattle']. Also, a query may optionally include a "sort by" clause 98, specifying the order in which to sort results obtained with the query. In this case the query indicates that the results are to be sorted by Name. Thus, this query requests the names of all businesses in Seattle be returned in the conceptual rowset produced by the query.

As described in more detail below, the Scopes of a query determine how the DSL 62 locates, in the conceptual model, the Facts to be retrieved, as specified in the query. Generally speaking, this allows a Fact to be specified by its name in the ORM, without, in many cases, having to fully specify where to find the Fact in the ORM model. In this regard, DSL 62 will look for a Fact by the given name within the Scope in which the Fact appears. Scoping will be described in greater detail below.

As noted above, an example of an abstract data model suitable for use with the present invention is an ORM. While the invention is described herein in one example embodiment as implemented using ORM, it shall be understood that the invention is not so limited. In particular, any notation representing data in the conceptual domain that is mappable to the physical domain will suffice for the purposes of the invention. As explained in more detail below, CQL queries 61 use these abstract data constructs to reference data without specifying any information regarding the physical schema 69 of the data in the physical data store in the underlying provider 12. DSL 62, by referencing the map correlating the ORM for the data to its physical schema, translates the CQL queries to the DML needed to access data in the physical data stores in the underlying provider 12.

Figure 5A:
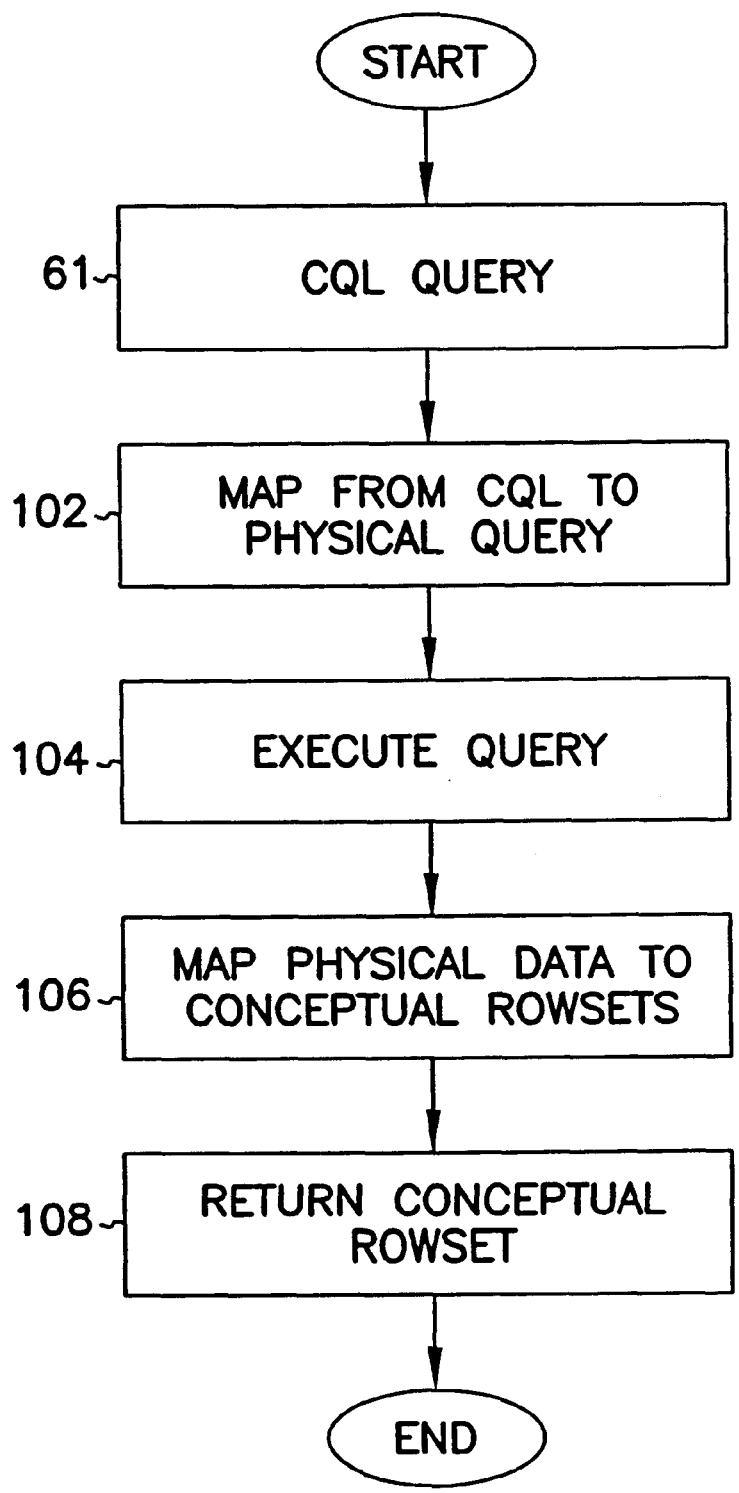
FIG. 5A and 5B provide a high-level flow diagram of the operations performed by the data services layer according to an example embodiment of the present invention.

FIG. 5A is a flow diagram of an overview of the functional operation of the DSL 62. The input to DSL 62 is a query 61 in the CQL dialect, in which data is identified at the conceptual level. The CQL query 61 is mapped from the conceptual to the physical form (102), such as a DML query. Once the final query is ready, it is executed and the corresponding data is returned from the underlying provider 12 (104). The data returned from the underlying provider 12 is in its physical form and needs to be mapped back to a conceptual form (106). A conceptual rowset is thus created. The final conceptual rowset is returned (108) to the consumer application 10.

Figure 5B:
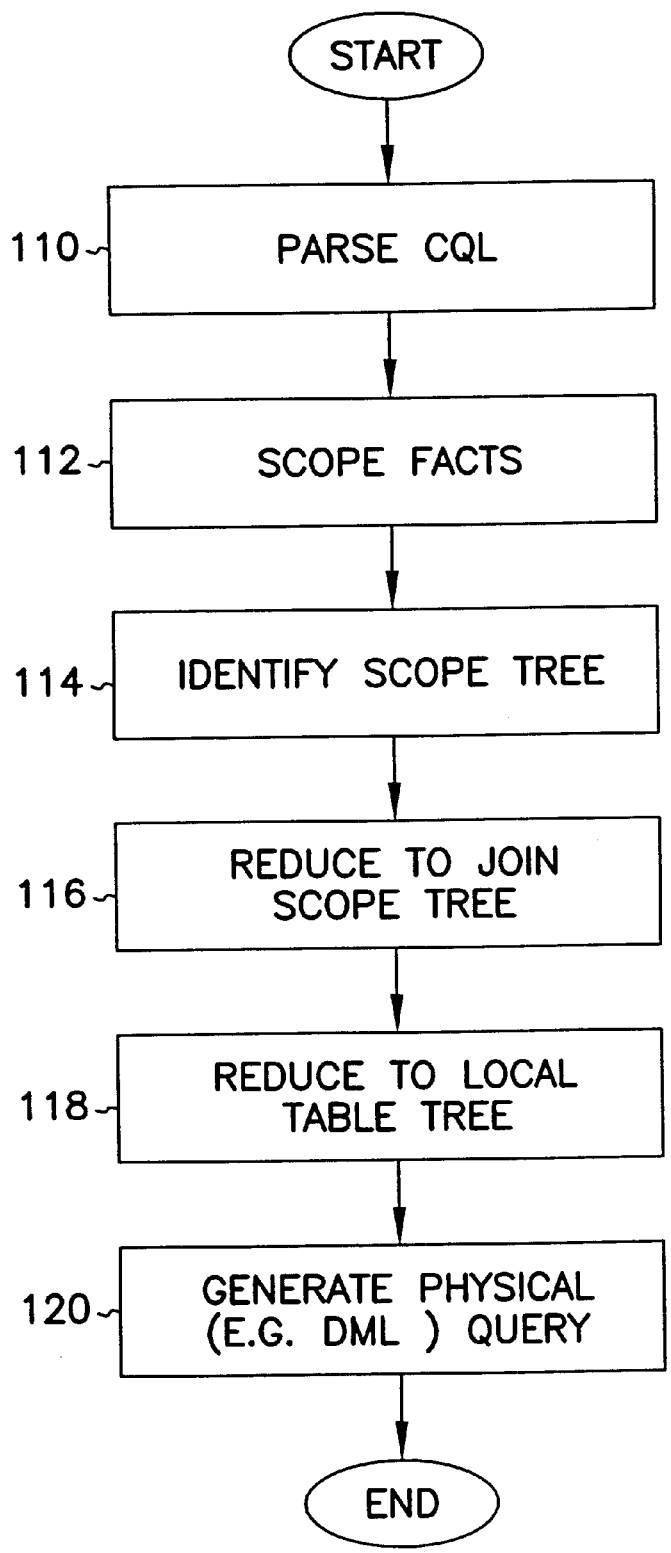

FIG. 5B is a flow diagram of a brief overview of the process DSL 62 uses to translate a CQL command to the DML. First, the CQL is parsed (110). Next, statements are "scoped," wherein the Facts sought by the query or command are located in the conceptual ORM schema (112). Once the required Facts are located, a "Scope tree" is determined (114), wherein, at the conceptual level, there is established a map showing the path between the Entities and Facts of the Query, wherein nodes on the tree are Scopes, i.e. Entities or Predicates in the ORM model. The Scope tree is broken into contexts (one context for each nested SELECT, as described in greater detail further below), each of which is in turn reduced to a "Join Scope Tree," (116) wherein nodes on the tree correspond to stand-alone mappings present in the Scope Tree. In general, this step allows nodes of the Scope Tree that have the same mapping to be folded into single nodes in the Join Scope Tree, thus reducing the size of the tree. Next, the Join Scope Tree is reduced to a "Local Table Tree," wherein the Join Scope nodes can be folded into Local Table nodes (118). Finally, the physical tables represented by the remaining nodes of the Join Scope Tree are joined to provide the shape of the query for the DML, and other elements of the DML query are generated with reference to the Facts, Filters and sort by clauses in the CQL query (120). By this process, a conceptual query 61 can be reduced to a DML query, as will be explained in further detail below.

Thus, DSL 62 controls and provides access to data, in accordance with the CQL, in such a way that the consumer application 10 need not know where the data it seeks is located, how the service is implemented or how it is accessed. This relieves developers from having to open several and various database connections in an environment where multiple databases may need to be accessed to do certain operations. The DSL 62 thus hides the physical schema from the consumer. This allows changes to the physical schema (if needed) without changing the code of consumer applications.

DETAILED DESCRIPTION OF AN EXAMPLE EMBODIMENT OF CQL

Described in detail below is a description of one example embodiment of the invention. As indicated above, CQL supports a number of common database commands such as the SELECT, INSERT, UPDATE and DELETE commands. CQL also supports versatile filtering and functions. Using the SELECT, INSERT, UPDATE and DELETE commands, consumer applications 10 can, respectively, retrieve rows from the underlying database, add new Objects to the database, change data in existing Objects, either by adding new data or by modifying existing data, or delete Objects from the database.

CQL Data Modeling and Mapping

Set forth below is a more detailed description of the elements of ORM modeling. Also specified is the data and data structure, referred to herein as "data dictionary" or the like, used to map the elements of an ORM model to the physical schema. This data, maintained in a data dictionary file (DDF). The DDF (identified by reference number 268 in the example embodiment of FIG. 44, described further below) is illustrated and discussed with respect to FIGS. 6A–16 and is sufficient to specify the structure of the ORM model, the structure of the physical schema (in this example an SQL schema), and the relationship or map between the conceptual ORM model and the physical schema. Each of FIGS. 6A–16 diagramatically illustrates, in a table form, the contents of each portion of the data dictionary. Each of these representations includes a first column indicating the Datatype, a second column indicating the FieldName in the file, and a Comment column indicating the function of each field. Individual rows in each of these columns correspond to fields of data.

The data maintained in the DDF is referenced by DSL 62, as described in more detail below, in order to translate CQL queries to DML queries and to perform rowset operations. All of the information necessary to accomplish this translation is maintained in the DDF.

COL Names

As noted above, CQL is used to describe and reference Objects in the ORM universe. The four sorts of names in this kind of modeling, Entities, Values, Predicates, and Roles, are described in more detail below.

Entity Objects: Entity Objects are Objects that can be identified in the real world as a real object or concept. An Entity Object is identified by a unique reference mode. A reference mode is a number, word, abbreviation or combination of these, that refers to a unique instance of an Entity. In a relational view this corresponds to the primary key of a table. FIG. 6A illustrates the data that is kept for each Entity Object in the DDF. As illustrated, that information includes a Unique Entity Id and the Entity name. If the Entity is a subtype, an array of the supertypes is enumerated. Also indicated is the Predicate ID of the nested Predicate, if any (this is the case where the reference mode of the entity is a predicate in it's own right—for example, in FIG. 30, "Address" and "BusinessBusinessType"—note the embedded predicate with uniqueness constraint spanning the entire predicate and marked with "P" for Primary Uniqueness, also known as the Primary Reference Mode). Also specified is the physical mapping information that uniquely identifies where this Entity is found in the physical schema. FIG. 6B illustrates the array of information kept for supertypes that are referenced in the file of FIG. 6A. Each supertype is identified by the Entity ID of the supertype. Also specified is the physical mapping information from the subtype to the supertype.

Value Objects: A Value Object has no means of reference in the application domain; it's a string or number. In an ORM diagram, a Value Object appears as a dashed ellipse. For example the Name "Cafe Lago" is just a string of characters. While the Name "Café Lago" can't be found, the Business having the Name "Café Lago" can be. In relational view, a Value Object corresponds to a column in a table. The information in the file of FIG. 7A is kept for each Value Object. Each Value Object has a Unique Value ID. The Name of the Value is further specified, along with a count and an Array of SValueConstraints that should be applied to this Value Object. A default value for this Value Object is also specified. Each SValueConstraint is specified in the data of FIG. 7B, described below. This table specifies if the constraint is a range value constraint, the minimum range if it is a range value constraint, the maximum range if it is a range value onstraint, and one of the allowed values for value constraints.

Predicates: A Predicate provides the semantic context for Objects and consists of one or more Roles that Objects' play. The Predicate determines the nature of the Role an Object plays. Any Role can be attributive (that is, can define a Value of an Object type), as in "Business 100 has Name Café Lago". Or, a Predicate can define relationship between one Object and another, as in "Business 100 sells Product 200". FIG. 8A illustrates the information (SConceptualPredicate) kept for each Predicate. The DDF includes a unique ID for the Predicate, the canonical Predicate name, a count of Roles in the Predicate, an array of Role structures for each Role, and the stand-alone physical mapping information for the Predicate.

Roles: A Predicate contains one or more Roles. Together with the Objects that play them, Roles represent the most fundamental elements of a Fact (which corresponds to a related group of columns in a database). Each Rolebox for a Role is played by one Object type. The information (SRolebox) kept for each Role is illustrated in FIG. 8B. This information includes the Predicate ID that this Role belongs to, the position of the Role in the Predicate, the ID for the Value Object playing this Role, the ID for the Entity Object playing this Role, an indication if the Role is mandatory (in the ORM sense), an indication if the Role is unique, and the physical mapping information from the Predicate to the Entity or Value Object identified as playing Roles. In the ORM universe, Entity and Value names must be unique (that is, duplicates can appear in the model but they refer to the same Entity or Value and are merely shown twice to make the diagram less cluttered). However, Predicate names are not unique and certainly Role names are not unique. To compensate for the ambiguous names that can result from names that are not unique, Predicates are given a canonical name that combines the entities and Value names to make a single, globally unique name, as illustrated further below.

In addition to Objects, Values, Predicates and Values, mapping from the ORM universe to the physical domain uses further information which include Data Type, Value Constraints, Physical Mapping, Constraints, and Physical Information. These aspects are described in more detail below.

Data Type: A data type specifies how the occurrences of an Object are stored in the physical database and how they are to be conceptually presented (note that a conversion might be required). The information illustrated in FIG. 9 is kept for each data type category (SDataTypeInfo). This information includes the OLE data type (see below for further explanation of OLE DB), the maximum possible length of a value in the column, in characters and octets, and, if numeric, the maximum precision of the column. If the data type is decimal or numeric (in the OLE DB sense), the number of digits to the right of the decimal point is specified, and if the column is a datetime or interval type, the datetime precision. Finally, DBCOLUMNFLAGS, as prescribed in OLE DB, are specified for the data type.

Value Constraints: In addition to prescribing the conceptual data type (above) a Value object may be further constrained to attain only specific values. Two types of value constraints are supported: Range of values and List of Values. Range value constraints allows for specifying a minimum and maximum range for a certain Value Object. List value constraints allow specifying a list of values that are permitted for this Value Object. Ranges and Lists value constraints can be intermixed. Each SValueConstraint is specified in the data of FIG. 7B. This table specifies if the constraint is a range value constraint, the minimum range if it is a range value constraint, the maximum range if it is a range value constraint, and one of the allowed values for value constraints.

Constraints: A constraint is a rule that limits the instances allowed in one or more Roles or that identifies a composite or nested Object. Additional meaning can be provided within and between Objects in a conceptual schema using the different types of constraints supported. FIG. 10A illustrates constraint information (SConstraint) kept for a Role or Object constraint. Each constraint has a Unique Constraint ID. A Constraint Type, as specified in the Constraint Type (EConstraintType) information of FIG. 10B, is also included. A count of the number of Target Roleboxes to which this constraint is applied, and an array of the Constraint targets (SConstraintTarget), i.e. the constrained Roles in the constrained Predicates, are also provided. These SConstraintTargets are each identified by the information (SConstraint Target) specified in FIG. 10C. Also included in the information for each Constraint is a count of the sequences in the constraint, the minimum and maximum frequency for the constraint type for the constraint, and the ring type for the eConstraintType for the constraint. Information as shown in FIG. 10D is kept for each ERingType. Finally, if the constraint is the primary uniqueness constraint, it is indicated. Further information on the meaning and use of constraints, especially the more unusual types, can be found in the ORM book identified above.

Figure 1:
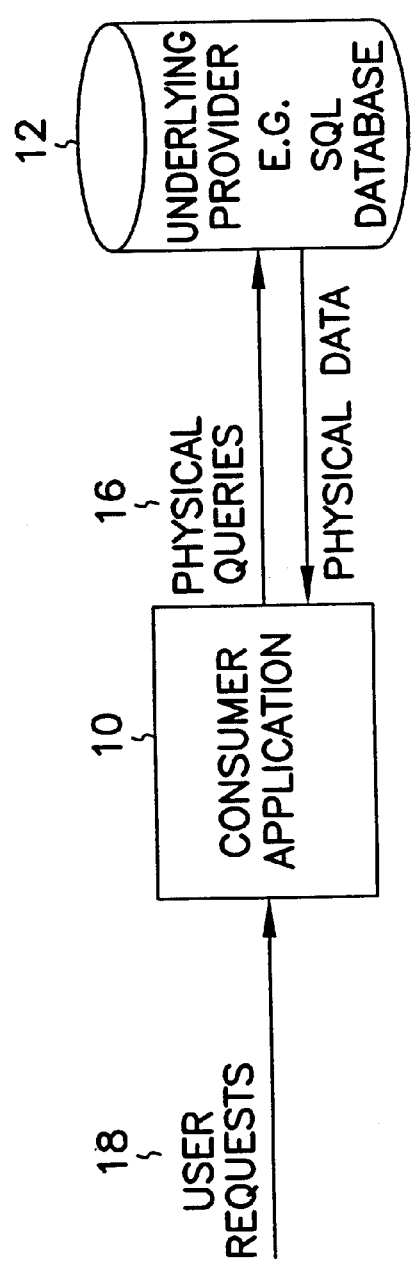
FIG. 1 illustrates a prior art configuration of an application and a database.

Physical Mapping: Physical mapping is the information that tells DSL 62 how to get to the physical schema from the conceptual schema. The mappings can be used to describe a straightforward, normalized physical schema, a general extensible schema, or something in between. This mapping information (SPhysicalMapping) is illustrated in FIG. 11 A. The first entry in this file structure is a parameter, EPhysicalMappingType, which specifies what type of mapping this file pertains to. FIG. 11B specifies the EPhysicalMappingTypes. A column ID is provided, where the map pertains to a Value Object, to define which column they use in the physical schema. A primary key(or any unique key) that is used for Entity Objects as a reference mode is provided where the mapping information is for an Entity. A count of mapping rules, and an array of physical mapping rules that form a path to be used to perform the correct mapping, is also provided. Each SMappingRule specified in the array is identified by the information shown in FIG. 1C. The SMappingRule array includes a type of rule (specified in FIG. 11D), and space to hold the actual mapping rule (UMappingRule). The UMappingRule is specified in the UMappingRule file illustrated in FIG. 11E. For each mapping rule, this specifies the id of the foreign key that is this step in the mapping or, a simple column constraint (SSimpleConstraint). The SSimpleConstraint file illustrated in FIG. 11F, specifies the id of the constrained column, and the constrained value of the column that is to be passed through to the underlying provider, along with the comparison operator.

Physical Information: Physical information is all the information pertaining to the physical model. This information is extracted from the DBMS system catalog and consists mostly of Table, Column and Key information. In one embodiment, the physical information is automatically extracted from the host physical system by inspection thereof (via system catalogs or the like). FIG. 12 illustrates physical table data (STable—one kept for each table) for a physical database. This includes a Table ID, the catalog that the table is in, and the name of the table. FIG. 13 illustrates the data kept for each catalog (SCatalog). That information includes a Catalog ID, and the name of the Catalog. FIG. 14 illustrates information on the physical columns that belong to a table (SColumn—one for each column). For each column, there is specified a Unique Column ID, the parent table ID of the column, the name of the column, the ordinal position of the column in the table, a bitmask that describes the column characteristics (DBCOLUMNFLAGS), a flag indicating if the column might be nullable, and data type information (FIG. 10A). FIG. 15 illustrates the keys that exist in the physical catalog (SKeys). Keys are used to define relationships between tables as well as to define uniqueness within a table. This information includes, for each key, a Key ID, the parent table ID of the key, the catalog ID for this key, the name of the key, the key type, as specified in the EKeyType information, as shown in FIG. 16, a count of columns that are part of this key, an array of column ID's that make up this key per the definition of the key, and the referenced key ID (KeyID), which is used only for foreign and virtual foreign keys.

Conceptual to Physical Mapping

Set forth below is a summary of the procedures used to perform conceptual to physical mappings, using the concepts outlined above. This mapping "language" has been optimized for the SQL store. However, the invention can support much richer mappings; for example it is possible to use DML to specify a mapping. Thus, the following mapping approach is exemplary only. These mappings comprise a sequence of annotations. The goal of a series of annotations is to start from a known physical anchor and show the series of joins and constraints that are necessary to, uniquely select a particular Fact or Entity. In order to be able to WRITE to the physical schema using conceptual notation, the entire series of annotations should result in a one-to-one mapping. However, it is not necessary to have a one-to-one mapping in order to be able to READ a physical schema using CQL. As has been previously discussed, the conceptual to physical mappings are maintained in the DDF; however, these are created from human authored annotations which are either applied to the ORM diagram directly, stored in external text files, or otherwise (and often in combination) imported into the machine readable DDF. In one embodiment, for example, the annotations set forth below can be stored in a spreadsheet, and conceptual to physical information may be automatically read from the spreadsheet and input into the form of the DDF. FIGS. 11A–11F shows examples of such annotations in a simple text form.

Types of Annotations

The following types of annotations are used in mapping.

Unique Key: Each annotation sequence begins with either a Primary Key or an Alternate Key in a specific physical table. This serves as the anchor point for the mapping—in this description these two key types are referred to as "Unique Keys". Unique Keys are of the form: Catalog:Keyname. The catalog portion is needed only if the key name is not unique across all catalogs.

Foreign Key: To follow links from one table to another in the physical schema, it is necessary to specify the foreign key in the database that represents the link to be traversed. The foreign key can be followed in either direction, and depending on which direction it is followed in the result might need to be further constrained if, as in general, following a foreign key results in a one-to-many mapping. Foreign Key annotations are of the form: Keyname. The foreign key comes from the same catalog as the Unique key that began the mapping sequence (or the most recent Virtual Foreign Key—see below).

Column Value Constraint: A Column Value Constraint allows the creation of conceptual columns that are not present as distinct columns in the physical schema. This sort of column is termed "virtual". Virtual columns are represented physically as a pair of columns—a discriminator that identifies the Role the physical column is playing, and a physical column which holds the value. The constraint construct is used to indicate the value that the discriminator must take on for the particular Fact. In general, several constraints might be necessary for various discriminating columns along the physical mapping route. Constraints are of the form: column =value. The column is assumed to be in the current table and catalog as implied by the most recent Unique, Foreign, or Virtual Foreign Key. Note that constraints may appear even if they follow a foreign key that is also a unique key in the target table. This is to facilitate restriction subtypes that live in the same table as their supertype. However, no column may be constrained twice without an intervening Foreign or Virtual Foreign Key.

Virtual For e Key: When crossing database boundaries there is no Foreign Key available to link the source and destinations of the physical mapping. In such cases, the columns to be linked across databases must be explicitly specified. The target of a Virtual Foreign Key can be either a Unique Key in the destination database or else a set of ad hoc columns which are to be joined to the source. The Virtual Foreign Key entries are of the form: UniqueKey= Catalog:Table(dest-column$_1$, . . . dest-column$_n$) or (src-column$_1$, . . . src-column$_n$)=Catalog:Unique-Key. All of the source (src) columns are taken from the current table and all of the destination (dest) columns are taken from the indicated table. As a safety check, the corresponding columns are required to have the same data type and, of course, the same number of columns must appear on both sides of the equality. Note that this sort of annotation can be used to do ad-hoc joins within a single database as well but that is not the intended purpose of this form.

Physical Column: Physical column specifications occur only in Value Fact Annotations (see below), and they merely describe the location of a datum. The form of a Physical Column Specification is: Columnname. The catalog and table are implied from the catalog and table of any Entity Fact in the related Predicate—and note that these must all be the same and are in turn implied by the last used Foreign, Unique or Virtual key in the Entity Fact Annotation.

Column NotNull: Often a property is encoded by the presence of certain links to other physical tables. In order to restrict membership to items which have certain links, the NotNull annotation can be used. The form of a NotNull annotation is: Columnname NotNull. As a safety check, Not restrictions can appear only at the end of a physical mapping sequence and they may not apply to the columns of the most recently used foreign key or unique key in the sequence.

How Annotations are Typically Combined into Mappings

Groups of annotations (i.e. a "mapping") tend to take one of three forms:

Standalone mapping: Such a mapping identifies the physical location where a conceptual Object resides in the database. The "standalone" mapping for an Object is the mapping that provides sufficient information to identify all conceptual Objects of that type in the database. The mapping begins with a Unique Key, which identifies a table and catalog, plus the physical primary key for this Object (i.e. vertical description of the Object), and is optionally followed by Foreign Keys or Constraints, which are used to restrict the rows of the table that participate in describing the Object (i.e. horizontal description of the Object).

Linking Mappings: This is a simple series of foreign keys and/or simple constraints which show the path from one Object to another. The foreign keys identify the jumps between tables (vertical description) and the constraints identify participating rows (horizontal selection).

Column Mappings: A simple column name is identified, this is used to describe the location that values are stored.

Annotating Conceptual to Physical Maps

There are four types of annotations used for mapping, one for each type Object or relationship that might need to be mapped from the conceptual to physical domain.

Entity Object Annotation: Each Entity Object contains the information necessary to locate its reference mode in the physical schema. This always begins with a Unique Key and is optionally followed by a Foreign Key, Virtual Foreign Key, or Constraints. This is its standalone mapping. Entities also include information for finding the reference mode of each of its supertypes (if any). This is a series of Foreign Keys and constraints that is assumed to begin at the table/column indicated by the Entity's location key (i.e. a linking mapping). Since the supertype's information can be in a different database, one or more Virtual Foreign Keys may appear in the sequence.

Predicate Annotation: A Predicate Annotation occurs to describe the physical location of the Facts of a Predicate—it appears both for nested Predicates and non-nested. The notation consists of a Unique Key optionally followed by a Foreign Key or Virtual Foreign Key that corresponds to the portions of the Predicate that are under uniqueness constraints. These Keys may be followed by one or more constraints (i.e. this is a standard standalone mapping). The Predicate annotation is associated with the Predicate's full name in the annotation block. In annotations for Predicates there is one section for the whole Predicate followed by one section for each Rolebox in the Predicate. They are not named after the linked Entity or Value—the Entity or Value name could be ambiguous. In these cases it is necessary to use the rolenames, and indeed in all cases the rolename is what is actually being used, it just so happens that the default rolename is the linked Value or Entity name and that most times this is in fact unique.

Entity Fact Annotation: An Entity Fact Annotation occurs to describe a particular Role, played by an Entity, in a particular Predicate in the conceptual schema. As such these annotations appear as part of the Predicate annotations, and they are associated with the particular Role name that corresponds to the Role that is played by the Entity. An Entity Fact Annotation may contain any legal combination of mapping rules (i.e., it is a linking mapping). The rules when followed should result in a path from the Entity Fact's physical location to Entity's primary reference location; even if that location is in a different catalog.

Value Fact Annotation: Value Fact Annotations simply describe the location of the value data. As with Entity Fact Annotations, Value Fact Annotations appear as part of the Predicate annotation, and they are associated with the particular Role name that corresponds to the Role that is played by the Value. Value Objects have a physical column annotation.

Mapping Examples

Figures 17, 18:
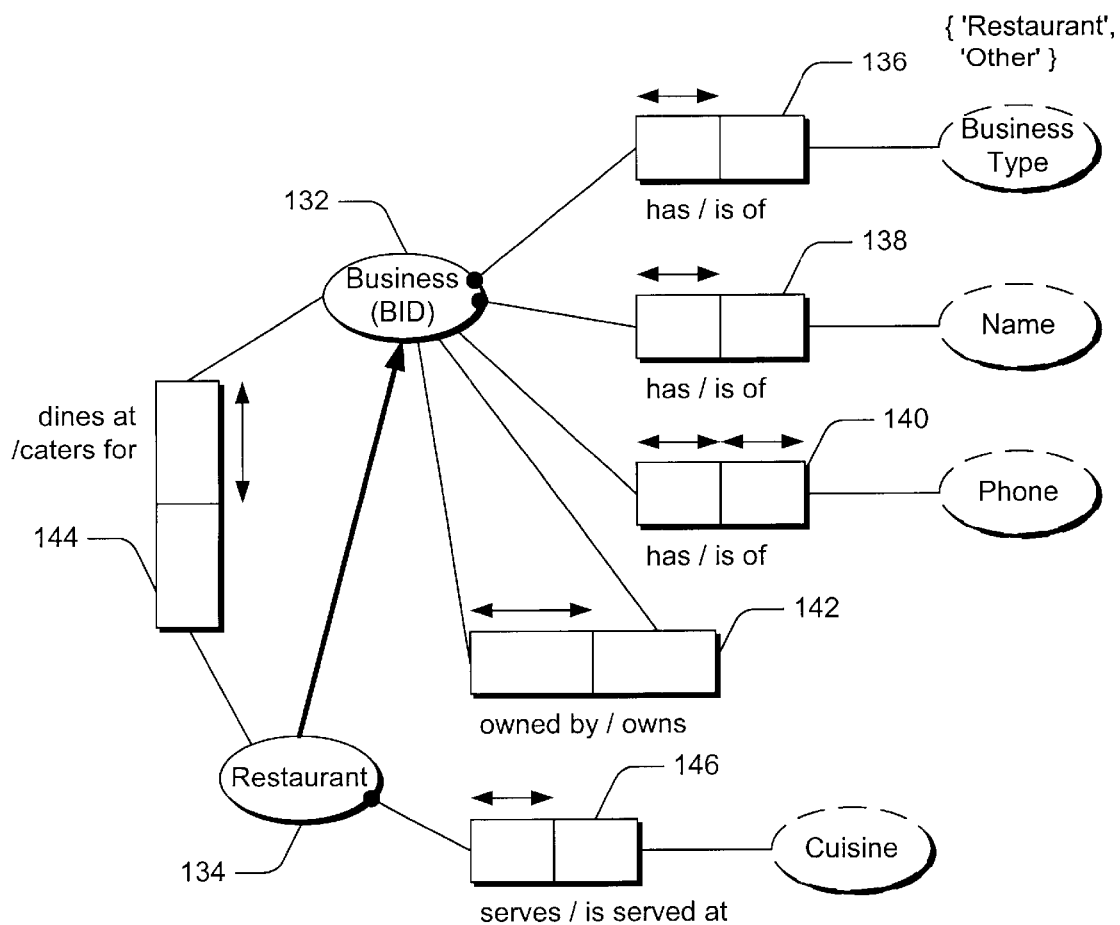

The use of the above-described annotations to define an ORM model and to relate it to the physical schema will now be described. FIG. 18 illustrates the simplest schema that can hold all of the Facts described in the reference conceptual model of FIG. 17. The information shown in the file of FIG. 19 is required to create the physical mapping. In FIG. 19 and the ensuing files, "*" means "could be inferred" when the annotations are loaded into the DDF. As shown in FIG. 19, each of the Entities and Predicates of FIG. 17 have a mapping. The mappings for the entities and Predicates (identified by rolebox) are identified with the same reference numbers as the entities and Predicates illustrated in FIG. 17. In the map of FIG. 19, the first mapping entry is an Entity Object annotation for the Business Entity 132, which has the reference mode BID. This annotation specifies that the Business Entity has the unique key PKBusiness which indicates that it is located in the Business table (PKBusiness=Primary Key is Business) in the physical schema (in this case an SQL schema). "PKBusiness" is an arbitrary name formed by the prefix "PK," which by convention typically means "primary key," and by the table name, Business in this case. As noted above in the preceding discussion, the DDF of FIGS. 6A–16 would contain this mapping information. For instance, the Business Entity structure (SEntity) for this Entity would point to a physical mapping structure (SPhysicalMapping). The KEYID for this primary key would be recorded in the SPhysicalMapping structure, in the kidPrimary field, and the quality of the mapping would be (EPhysicalMappingType).

In the next mapping entry of FIG. 19, the Restaurant Entity 134 is also shown to be located in the Business table, with the constraint that the BusinessType='Restaurant.' This constraint would also be stored in an SMappingRule structure of the DDF, with an eMappingRuleType of "2", indicating a constraint, with the actual constraint held in the UmappingRule structure(s) referenced by the SMappingRule structure. This standalone mapping is followed by a notation for any supertypes for the Entity Restaurant. In this case there is one supertype but it is in the same table, so the mapping is empty. The Predicate Business_has_BusinessType 136 is annotated with a Predicate annotation specifying the unique key PKBusiness, which indicates that the Predicate is mapped to the Business table of the physical schema. The Entity Business, associated with the Predicate, is identified by the rolename Business. The mapping is empty for the Entity Business as it is located in the same table as the Predicate (i.e., no linking mapping is required). The rolename BusinessType, which is a Value, is specified to be found in the physical column BusinessType. Like the mapping for the Business Entity, the mapping information for this Predicate and each rolebox in the Predicate are specified in the SPhysicalMapping structure and its related structures. The SPhysicalMapping structure is referenced from the structures of identifying information (SConceptualPredicate and SRoleBox) for the Predicates and roleboxes. Thus, it can be seen how physical mappings are obtained from the DDF structures, and further itemization of these associations will be further specified below. Similar annotations are used for the Predicates Business_has_Name 138 and Business_has_Phone 140, except in the latter case the constraint that the phone is not null is added (Phone NotNull). This requires that the physical column Phone non null in order for it to be the case that the Business has a Phone. Similarly, the mapping for the Predicate Business_owned-by_Business 142 requires that the Owner column be non null (Owner NotNull). This mapping also uses the rolenames Ownee and Owner for the rolebox annotations, because the default rolenames (Business for both) are not unique (see introductory discussion above regarding annotations of Predicates). The Owner rolename annotation ([Owner]) specifies that this Entity Object is linked by the foreign key link FK1 to the owning Business. The Ownee rolename annotiation ([Ownee]) has no mapping rules, indicating that the Predicate is in the same table as the owned business. This is consistent with the fact that the standalone mapping for the Business_owned_by_Business Predicate was the same as the standalone mapping for the Business Entity. Similarly, the Predicate Business_dines_at_Restaurant 134 is mapped to show that one gets from the physical location of the Business to the physical location of the Restaurant at which its employees dine by following the FK2 foreign key. In the mapping for the Predicate Restaurant_serves_Cuisine 146, the Predicate is bound to the table Business, constrained to BusinessType='Restaurant.' Since Entity Business is found in the same table, there are no mappings to foreign keys. The Value Cuisine is annotated as found in the TypeCuisine column, in the Business table.

Figure 20:
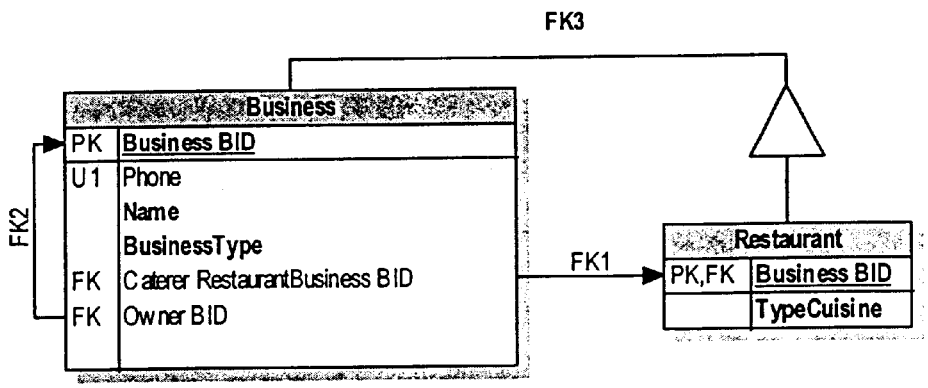

The next simplest form of a schema for the conceptual model of FIG. 17 uses two files, with the subtype factored out, as illustrated in FIG. 20. The mapping of FIG. 21 is largely similar to the mapping of FIG. 19, except altered to reflect that Restaurant has its own unique key and table in the schema of FIG. 20. Thus, for example, the Restaurant Entity annotation shows that the Object Entity Restaurant is found in the Restaurant table (PKRestaurant), and that its supertype Business table is found by following the foreign key FK3. Also, the foreign key FK1 for the Restaurant rolename in the Predicate Business-dines-at-Restaurant points to the Restaurant table, and the anchoring key for the Predicate Restaurant_serves_Cuisine is in the Restaurant table.

Figure 22:
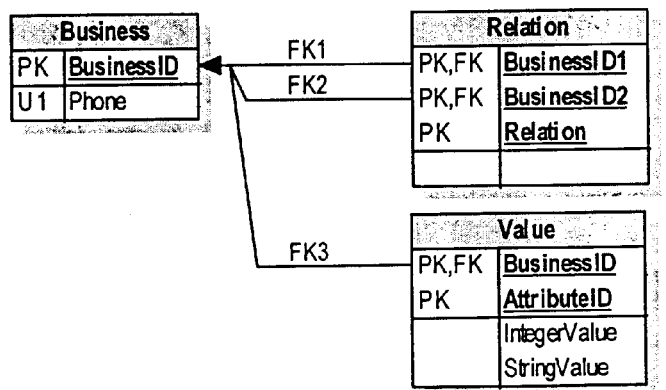

FIG. 22 shows a fairly general physical schema that can capture the required Facts but yet leaves room for further extension in the conceptual model of FIG. 17, without need for change in the physical schema. This example also shows that business information has been vertically partitioned across tables. In the mapping for the schema of FIG. 22, shown in FIG. 23, the Restaurant Object Entity is annotated as being located in the Value table (PKValue), with the constraints that Attribute ID="Business Type" and String Value='Restaurant' with the Business. The supertype Business is found by following the foreign key FK3. The annotation for the Predicate Business_has_BusinessType specifies that the Predicate annotation is anchored in the Value table, with the constraint Attribute ID='BusinessType'. The rolebox Business is mapped by the foreign key FK3, and the BusinessType is specified to be found in the column String Value of the Value table. Similar annotations are used for the Predicates Business_has_BusinessType, Business_has_Name, Business_owned-by_Business, Business_dines_at_Restaurant, and Restaurant_Serves_Cuisine.

Figure 24:
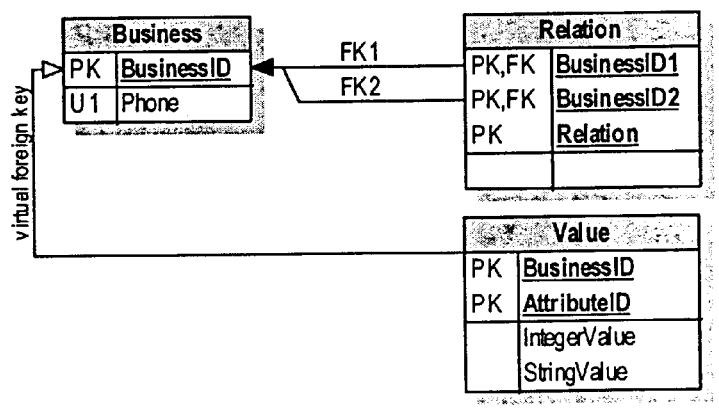

FIG. 24 illustrates cross database links. Here the schema of FIG. 23 has been altered slightly, indicating that the business attributes are now stored in a separate database. In other words, the Value table is not in the same catalog as the Business table. FIG. 25 shows the annotations required to accommodate the new physical schema where we assume that the Business table is in catalog 'B' and the Value table is in catalog 'V'. In this example the Business and Relation tables live in catalog 'B' and the Value table lives in catalog 'V'. For clarity, the notations are fully qualified even though the key names are all unique across databases in this example. The mapping for the schema of FIG. 24 is similar to that of FIG. 23, except, however, a virtual foreign key is used to locate the Business table, wherein the supertype Business is identified by catalog and by unique key (i.e., B:PKBusiness).

None of the preceding examples contained any unary Fact types, so for completeness there are included herein two different ways of modeling a unary Fact. The $2^{nd}$ physical model is very extensible, for example for the examples set forth in FIGS. 26 and 27. As illustrated, unary Fact types end up looking similar to subtype relationships.

CQL Commands and Syntax

As noted above, CQL provides support for most of the commonly used data manipulation commands, including the SELECT, INSERT, UPDATE and DELETE commands. CQL further provides support for hierarchical data set support for SELECT commands, compound INSERT and UPDATE operations, versatile filtering, and function support.

COL Concepts

As briefly introduced above with respect to FIG. 4C, and as is demonstrated in more detail below with respect to the CQL commands, the CQL syntax and operation incorporates the following language concepts: Scopes—provides for name scope to avoid typing long names; Facts—what are returned as the result of a query; Filters—used to constrain the result of a query; and Sort Items—used to sort the results of a query.

Scopes: In order to avoid typing long names, CQL includes the notion of name Scope. In fact, except for the very first name in a CQL query, every name is scoped in some way or another. A Scope is defined by its parent Scope and an Entity—either as the Entity Object itself or by identifying a Role that is played by an Entity. Neither Values nor Predicates can define a Scope (exception, a Nested Predicate is also an Entity—so it can be used to define a Scope). Scopes are discussed in more detail below.

Facts: In CQL Facts are returned as the result of a query. Simple Facts correspond to a single column in the underlying database. A simple Fact is specified by referring to a Value Object or Value Role in some Scope. There are numerous examples in the section on Scopes below where the Name Value is cited as a Fact. In addition to simple Facts, aggregate Facts and datetime operations can be inserted into the result.

Filters: Filters are used to constrain the result of a query. The Filter applies to the scope in which it is located, although the exact scope in which a filter is located tends to matter only in a few cases. Typically, the Filter is located so that it is in a Scope in which it is convenient to access the Values that are part of the Filter expression. There are four types of Filters: 1) a simple comparison; 2) a string 'like' comparison; 3) a range check via a 'between' expression; and 4) a check for a set of values with an 'in' expression. These basic types can be combined with 'and', 'or' and 'not' operators.

Sort Items: Sort Items apply to the entire SELECT statement with which they are associated. Anything that can be inserted as a Fact, can be inserted as a Sort Item—which is to say Value Objects, aggregates, and datetime operations.

COL Grammar

Prior to describing CQL further, reference is made to FIGS. 28A–28E, which illustrate the CQL grammar used in the many example queries described below. The grammar is given in Extended Backus-Naur Format (EBNF) notation. Simple terminals are quoted and in bold; lexeme definitions (identifiers, numbers, etc.) are shown in the subsequent section. Optional items are shown in [square brackets], and items which may be repeated zero or more times are shown in {braces} . The or bar "|" is used to show alternatives, usually one to a line for clarity. Lexemes are shown in regular expression notation. Anything not covered explicitly in the lexeme section is not valid in the CQL language of the present example embodiment. The standard rule for a lexer is that the longest matching lexeme is returned from the token stream. This is how the CQL language works as well. Note the lexical alternation "(|something)" indicates an optional "something"—there is an empty string before the "|" that is a valid value. The lexer supports standard identifiers (case insensitively), single quoted strings which use two single quotes in a row to escape a quote, optionally signed simple floating point or integer numerics, whitespace which is a separator only, and SQL style comments. Note the CR is not required to terminate a comment; an LF is necessary and sufficient. These are illustrated in FIG. 29.

COL Commands

Described below are the commands that are supported in one example embodiment of the CQL. The syntax for these commands is shown in FIGS. 28A–28E.

SELECT Command: The SELECT command retrieves rows from a database. The data is returned as part of a rowset, that could option)ally have other rowsets linked to it. SELECT commands are the most powerful commands in CQL. They allow for the construction of rich hierarchical views on the data. Each nested SELECT statement causes the creation of a linked rowset and a Context for filters and sorting to occur in. Filters are used to restrict the data returned. A nested SELECT statement can return OLE DB chaptered row-sets. Filters are always applied in the context they exist in. Filters are always applied and there is no way to tag them as optional. If more than one filter line is present in the same context, then they are connected with the AND operator. Each Object (Value or Entity) can be identified by either it's name (if it is unique in the current Scope), or the rolename (if that is unique), or finally by canonical form 'Predicate-name:role-name' which is always globally unique. Further discussion on name binding is presented further below. It shall be understood that the particular name binding rules set forth herein are examplary only, and in particular, are specific to ORM. Many other suitable name binding rules are possible, and indeed can be readily formulated for the ORM domain or other domains, including, for example, rules which allow for a greater amount of inference between the relationships of the various Objects by the DSL 62. Indirect relationships are possible and natural and would form a part of a more advanced set of name binding rules. Accordingly, the invention is in no way limited to the example name binding rules set forth herein.

INSERT Command: This command adds a new Object to the database. This command supports compound inserts, which allow you to INSERT multiple nested Objects in the same command. There are two forms of the INSERT statement: simple INSERT and compound INSERT. The simple INSERT deals with one Entity Object and all of its Value Objects. The compound INSERT allows for the INSERT of multiple related Entity Objects in the same INSERT command. Nested Objects in compound INSERT commands can not have nested Object themselves—only one level of nesting is in this exemplary grammar. Array values are supported for nested Objects. This allows the user to INSERT more than one Object in the same compound INSERT command. If the array count provided does not match the number of values inside the value array then the INSERT command will fail. It is contemplated that special handling of NULL values, especially in an array INSERT, can be provided (e.g. to allow for validation of values and reduction of the generated DML).

UPDATE Command: The UPDATE command changes data in existing Objects, either by adding new data or by modifying existing data. There are two forms of the UPDATE statement: simple UPDATE and compound UPDATE. The simple UPDATE deals with one Entity Object and all of its Value Objects. The compound UPDATE allows for the update of multiple related Entity Objects in the same UPDATE command. Nested Objects in compound UPDATE commands can not have nested Object themselves—only one level of nesting is supported. In an alternate embodiment, multiple nested contexts within the same query may be supported.

DELETE Command: The DELETE command deletes Objects from the database. It is important to note that only Entity Objects can be deleted using this command. The default deletion mode would only delete the Entity Object specified and all Value Objects related to it. With a cascade DELETE the Entity Object, Value Objects and other dependent Entity Objects are deleted.

Example Uses of Commands

Figure 30:
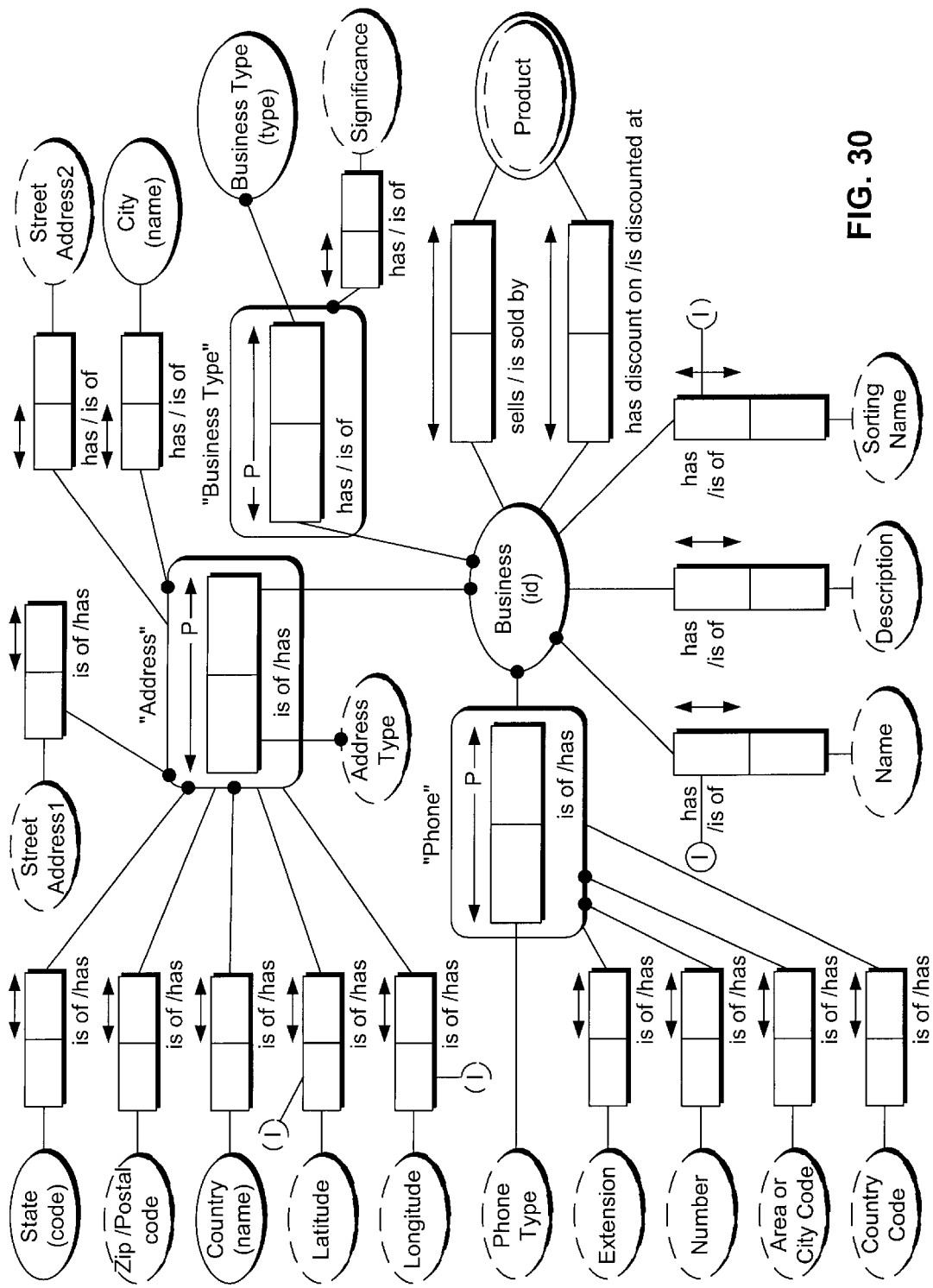
FIGS. 30, 31 and 32 are conceptual object-relational-model diagrams used to illustrate SELECT, DELETE, INSERT and UPDATE commands according to an example embodiment of the invention.
Figure 31:
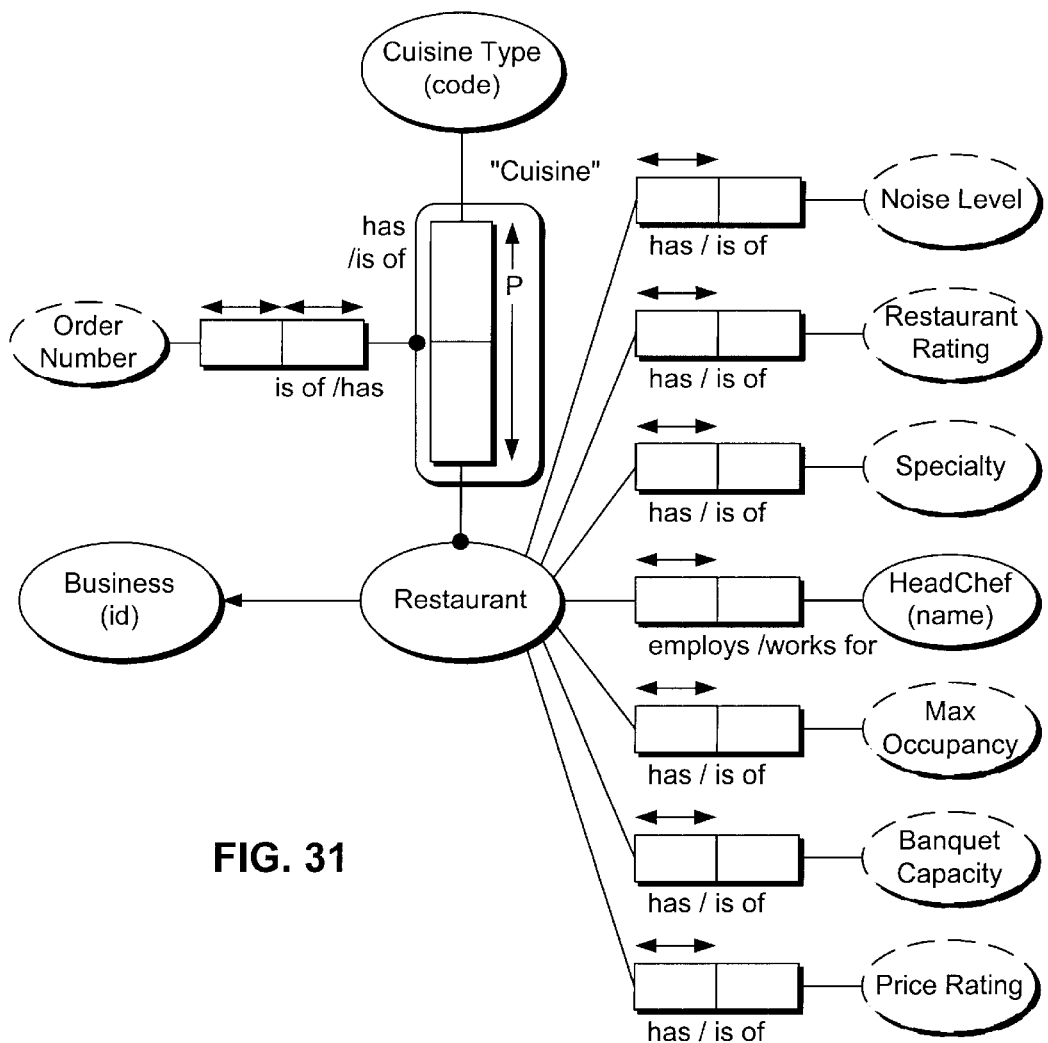
Figure 32:
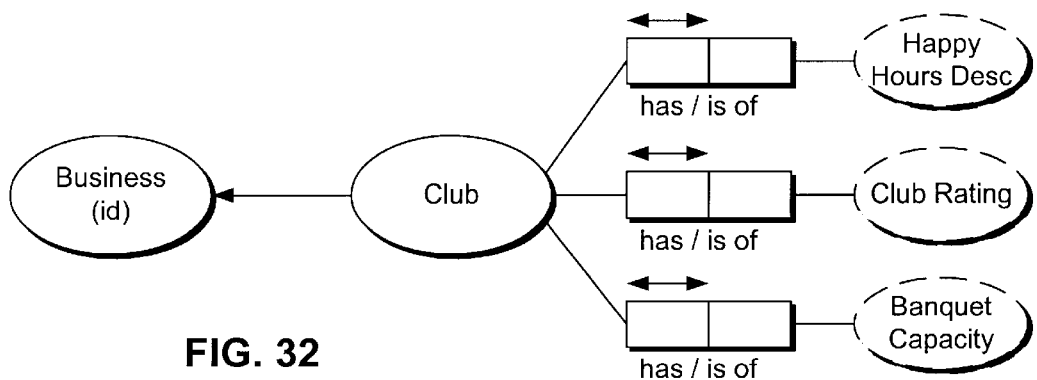
Figure 33:
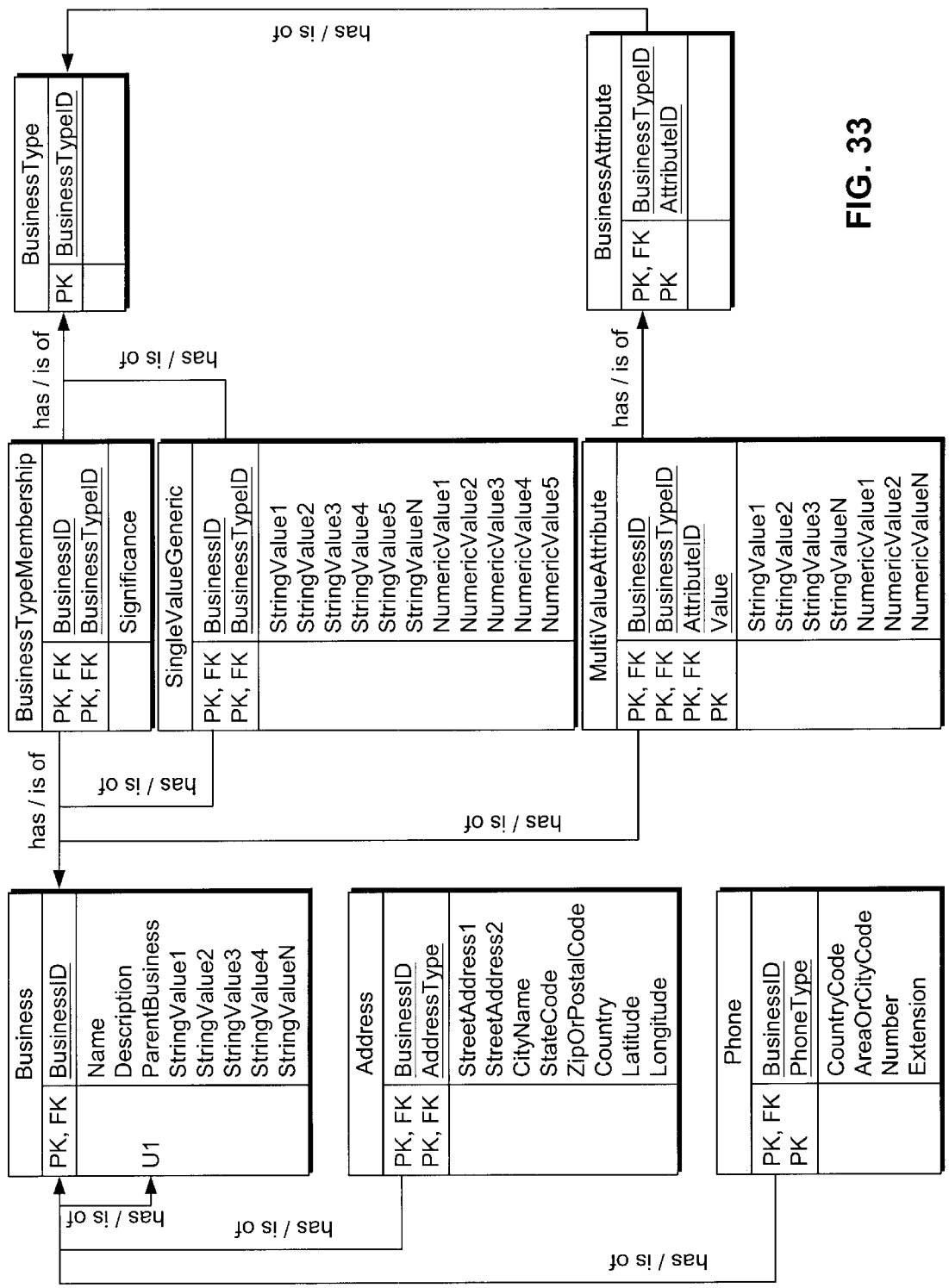
FIG. 33 illustrates a physical schema corresponding to the diagrams of FIGS. 30, 31 and 32.

The following examples are made with reference to FIGS. 30, 31 and 32. FIG. 30 illustrates an ORM model for a database of businesses. In this model, each business has a Name, Description and Sorting Name. Each business also can be of one or more BusinessTypes. The BusinessTypes have different significance. A business must have at least one phone, at least one address, and so forth. Also, a business sells many products, and has a discount on many products. FIG. 31 illustrates a restaurant model. Facts represented here are a Restaurant is a Business, a Restaurant has an optional NoiseLevel, RestaurantRating, Specialty, HeadChef, MaxOccupancy, BanquetCapacity and PriceRating; a Restaurant has at least one Cuisine; Cuisines have an OrderNumber and so forth. FIG. 32 shows a club model. Facts represented here are: a Club is a Business; a club has a ClubRating, HappyHourDesc and BanquetCapacity. FIG. 33 illustrates a sample physical schema for the above models. Business, Address and Phone may have their own tables since they change infrequently. All other properties associated with restaurants and clubs are modeled in the generic SingleValue and MultiValue tables.

Example Uses of the SELECT Statement

The following example returns a list of all Restaurants, their BusinessID, Name, and all of the single valued Restaurant attributes of a Restaurant. This is equivalent to the SELECT * FROM Restaurant query in the relational world with the Business facts added.

SELECT Restaurant

```
{
    BusinessID,
    Name,
    *
}
```

The following example returns a list of Restaurants (and single value information) where BusinessIDs are greater than 500.

SELECT Restaurant

```
{
    BusinessID [>500],
    Name,
    *
}
```

The following example returns a list of Restaurants (and single value information) where BusinessIDs are greater than 500. The result is sorted by the Business Name.

SELECT Restaurant

```
{
    BusinessID [>500],
    Name,
    *
} sort by (Name)
```

The following example returns a count of all restaurants. A single row is returned.

SELECT count(Restaurant)

The following example returns the count of all Restaurants that have a BusinessID>500. A single row is returned. Notice the use of the alias RestCount. The result set returned will have a column called RestCount.

SELECT count(Restaurant) as RestCount [BusinessID>500]

The following example returns a list of all restaurants their Name, Description and HeadChef sorted by the name. Restaurants with no Description or HeadChef information are still returned.

SELECT Restaurant

```
{
    Name,
    [optional] Description,
    [optional] HeadChef
} sort by (Name)
```

The following example returns a list of all restaurants their Name, Description and HeadChef sorted by the name. Only restaurants that have a HeadChef filled out are returned. In the example embodiment of CQL set forth herein, Facts are required by default, and the notation on HeadChef is shown here to be explicit. Note that has been used in many of the examples already to allow for missing Facts in the result.

SELECT Restaurant

```
{
    Name,
    [OPTIONAL] Description,
    [REQUIRED] HeadChef
} sort by (Name)
```

The following example returns a list of all restaurants their Name, Description and HeadChef sorted by the name. Only restaurants that do not have a HeadChef filled out are returned.

SELECT Restaurant

```
{
    Name,
    [OPTIONAL] Description,
    [EXCLUDE] HeadChef
} sort by (Name)
```

The following example returns a list of all restaurants whose name starts with the letter S. Notice how the filter does not include the Object name within the square brackets—this is a shortcut.

SELECT Restaurant

```
{
    Name [like 's%'],
    [OPTIONAL] Description,
    HeadChef
}
```

The following example returns a list of all restaurants whose name starts with the letter S in this case Name is not returned in the final result set. The returned list is sorted by the name in descending order.

SELECT Restaurant

```
{
    [OPTIONAL] Description,
    [OPTIONAL] HeadChef
    [Name like 's%']
} sort by (name desc)
```

The following example returns a list of all restaurants that have a PriceRating >3 and RestaurantRating>2. PriceRating and RestaurantRating are not included in the final result set.

SELECT Restaurant

```
{
    Name,
    [OPTIONAL] Description,
    [OPTIONAL] HeadChef
    [PriceRating > 3 and RestaurantRating > 2]
}
```

The following example return a list of restaurant names that have a noiselevel of low or medium AND Pricerating>3 and RestaurantRating>2. It illustrates more than one filter on separate lines are ANDed together.

SELECT Restaurant

```
{
    Name,
    [NoiseLevel in ('low', 'medium')],
    [PriceRating > 3 and RestaurantRating > 2]
}
```

The following example returns a list of restaurant names that have a MaxOccupancy range between 10 and 50.

SELECT Restaurant

```
{
    Name,
    [MaxOccupancy between (10, 50)]
}
```

The following example returns a list of Italian restaurants, notice the dot notation used. Since we only wanted Italian restaurants we added the filter in the same Restaurant context. CuisineType is an attribute of the Cuisine Object and so a dot notation had to be used.

SELECT Restaurant

```
{
    Name,
    [Cuisine.CuisineType = 'Italian']
}
```

The following example shows another way of returning the same result as the previous example. Notice the explicit use of the REQUIRED default scope option that forces a return of only restaurants that have an Italian Cuisine.

SELECT Restaurant

```
{
    Name,
    [REQUIRED] Cuisine
    {
        [CuisineType = 'Italian']
    }
}
```

The following example returns a list of restaurant names that have three cuisine types. It also uses the dot notation because we want the Cuisine OrderNumber filter to be applied in the Restaurant context.

SELECT Restaurant

```
{
    Name,
    [max(Cuisine.OrderNumber) = 3]
}
```

In this example a list of all restaurants are returned whether they are Italian restaurants or not. Another rowset is also returned (because of the nested SELECT) that has a row for each Restaurant. All rows in the cuisine rowset will contain 'Italian'.

SELECT Restaurant

```
{
    Name,
    SELECT Cuisine
    {
        CuisineType [= 'Italian']
    }
}
```

The following example returns a list of all Restaurants and their Main Address and all phones. Note, the default relation between a context and its sub contexts is optional. So in this case, restaurants are returned if they have an Address or not. The same applies for Phone.

SELECT Restaurant

```
{
    Name,
    Description,
    SELECT Address
    {
        StreetAddress1,
        City,
        [AddressType = 'Main']
    },
    SELECT Phone
    {
        AreaOrCityCode,
        Number
    }
}
```

In the following example only restaurants that have a Main Address and at least one phone are returned.

SELECT Restaurant

```
{
    Name,
    Description,
    [REQUIRED] Address
    {
        StreetAddress1,
        City,
        [AddressType = 'Main']
    },
    [REQUIRED] Phone
    {
        AreaOrCityCode,
        Number
    }
}
```

In the following example only restaurants that have a Main Address and do not have a phone are returned. Note that for the [exclude] can not be used with a nested context.

SELECT Restaurant

```
{
    Name,
    Description,
    [REQUIRED] Address
    {
        StreetAddress1,
        City,
        [AddressType = 'Main']
    },
    [EXCLUDE] Phone
}
```

The follow example returns a list of Restaurants who's Phone Number has not been specified. In the previous example, if any aspect of the Phone information had been specified, then the Restaurant would have been excluded (in this query, if the area code is known but the Phone Number isn't, the Restaurant appears. In the previous query, however, the Restaurant would have appeared since some aspect of its Phone information was known).

SELECT Restaurant

```
{
    Name,
    Description,
    [EXCLUDE] Phone
    {
        Number
    }
}
```

The following example returns a list of restaurants sorted by the primary cuisine type.

SELECT Restaurant

```
{
    Name,
    Description,
    Cuisine.OrderNumber [= 1]
} SORT BY (Cuisine.CuisineType)
```

The following example gets all Businesses that are both a Restaurant and Club.

SELECT Business

```
{
    Name,
    Description,
    [REQUIRED] Club
    {
        HappyHourDesc,
        ClubRating
    } SORT BY (ClubRating desc),
    [REQUIRED] Restaurant
    {
        RestaurantRating,
        HeadChef,
        Specialty
    } SORT BY (RestaurantRating)
}
```

The following example returns a list of restaurants and the count of Address, phones and cuisines, of restaurants that have more than one cuisine. Note that the [>1] filter applies to the count of Cuisine and not the Cuisine Object.

SELECT Restaurant

```
{
    Name,
    Description,
    count(Address),
    count (Phone),
    count(Cuisine) [> 1]
} SORT BY (Name)
```

The following example returns a list of restaurants and all their Address, phone and cuisine information.

SELECT Restaurant

```
{
    Address {*},
    Phone {*},
    Cuisine {*'}
} SORT BY (Name)
```

The following example returns a list of all BusinessIDs and the max cuisine order number.

SELECT Restaurant

```
{
    max (Cuisine.OrderNumber)
}
```

The following example returns a list of business that are of type restaurant and club and have ratings >1.

SELECT Business

```
{
    Name,
    Description,
    [Restaurant.PriceRating > 1 and
    Restaurant.RestaurantRating > 1],
    [Club.ClubRating > 1]
}
```

The following example returns a list of Business Name, Description and all the single value information about the Products they sell and Products they have at discount. Since the conceptual schema has business playing two Roles (sells, has discount on) to Products, the CQL query must specify which Role is being referenced. The Role text is only required when there is more than one Role played between two Objects. If only one Role is played between two Objects, the Role text is optional. Further information on the need to specify roles is set forth below in the description of scoping.

SELECT Business

```
{
    Name,
    Description,
    SoldProduct {*}
    DiscountedProduct {*}
} sort by (Name)
```

The following example returns all Restaurant single Value Objects with a complicated filter.

SELECT Restaurant

```
{
    *,
    [name like 'S%' and PriceRating < 3 and
    Cuisine.CuisineType in ('Italian','Mexican')]
}
```

EXAMPLE USES OF THE INSERT STATEMENT

The following example inserts a Business.

INSERT Business

```
{
    Name = 'Café Lago',
    Description = 'Montlake café has terrific Italian food.',
    SortingName = 'Cafe Lago'
}
```

The following example sets the primary BusinessType for Business 1456 to Restaurant.

INSERT Business BusinessType

```
{
    Business = 1456,
    BusinessType = 'Restaurant',
    Significance = 1
}
```

The following example inserts an Address for Business 1456.

INSERT Address

```
{
    Business = 1456
    AddressType = 1,
    CityName = 'Seattle',
    Country = 'USA'
}
```

The following example is a compound INSERT command that inserts a new restaurant, address, phone and cuisine information. Notice the array INSERT of two phones.

```
{
    Name = 'Café Lago',
    Description = 'Montlake café has terrific Italian
    food.',
    NoiseLevel = 'High',
    PriceRating = 1,
    RestaurantRating = 3,
    RestaurantCuisine
    {
        CuisineCode = 'Italian',
        OrderNumber = 1
    },
    Address
    {
        AddressType = 1,
        StreetAddress1 = '2305 24th Ave E',
        CityName = 'Seattle',
        State = 'WA',
        ZipOrPostalCode = '98102',
        Country = 'USA'
    },
    Phone [2]
    {
        PhoneType = ['Business', 'Toll Free'],
        AreaOrCityCode = ['206', '800'],
        Number = ['3230145', '2341234']
    }
}
```

The following example will fail since Name is not an Entity Object.

```
{
    Description = 'Hello'
}
```

The following example will fail since the array count is 2 and only one value is provided.

```
{
    Name = 'Café Lago',
    RestaurantCuisine [2]
    {
        CuisineCode = 'Italian',
        OrderNumber = 1
    }
}
```

EXAMPLE USES OF THE UPDATE STATEMENT

The following example sets the NoiseLevel of Restaurant 1234 to 'Medium'.

```
{
    NoiseLevel = 'Medium',
    [Restaurant = 1234]
}
```

The following example sets the NoiseLevel of all restaurants to 'Medium'.

```
{
    NoiseLevel = 'Medium'
}
```

The following example updates the NoiseLevel and Cityname of Restaurant 1234 and its main address.

```
{
    NoiseLevel = 'Medium',
    Address
    {
        CityName = 'Seattle'
        [AddressType = 'Main']
    }
    [Restaurant = 1234]
}
```

EXAMPLE USES OF THE DELETE STATEMENT

The following example deletes Restaurant 1234. Note that this is a cascade DELETE. All of the Objects associated with this restaurant are deleted, business, address, phone, cuisine, etc.

DELETE [CASCADE] Restaurant [=1234]

The following example DELETE all Italian restaurants.

The following example will DELETE all Italian restaurants.

The following example will DELETE all Italian restaurants. Since this is not a cascade DELETE, only Restaurant information is deleted. Business and clubs remain intact.

DELETE Restaurant

The following example will fail since Name is not an Entity Object.

DELETE Name

Scopes

CQL Name Searching Rules: In order to interpret and execute queries, CQL must identify names used in the query. For this purpose, CQL has two sets of name searching rules. Which one it employs depends on the nature of the current Scope. As mentioned earlier, at the most basic level, each new Scope is equivalent to following one link in the ORM diagram. Starting for instance from an Entity, a Predicate may be entered, then left going to another Entity, then a link followed to a supertype, then perhaps a Predicate again and finally access a value. So along the way either a Predicate has just been entered, coming from an Entity, or else the thread is on an Entity—having just left a Predicate or perhaps followed an Entity to Entity link. DSL 62 Scopes a Name in accordance with the following rules, using the data dictionary information stored in the DDF.

Rules for binding names when scoped in an Entity. In this case a new name of the form Predicate:Object—with the Predicate being optional—has been specified in the Scope of an Entity. The following rules are applied in this order to resolve the name:

1) Find the Predicate if any: If a fully qualified name was specified the Predicate name must be a valid Predicate, or else an unknown Predicate name rule is originated. A valid Predicate name is either a normal Predicate name, or else the Entity name of an Entity with a nested Predicate—in the latter case the name refers to the nested Predicate and not the Entity.
2) Check for self-reference: If no Predicate was specified, a check is made to see if the Object that is trying to be linked to is the same as the current Entity name—if it is an error indicating that it is already in the same Scope is originated. This prevents a construct like SELECT Restaurant {Restaurant . . . }.
3) Check for Predicates directly connected to the current Entity: All of the Predicates that the current Entity plays some Role in are examined for potential matches to the name. If a given Predicate has a Role whose name matches with the desired Object, this is a candidate match. If a given Predicate does not have any Roles names that match, then the Entity or Value names that are associated with each Role are considered—any name match there is a candidate. If exactly one Predicate had a matching candidate Role the name is bound to that Role. If a Predicate is present in rule #1 only that Predicate is considered here instead of all Predicates connected to the Entity. If no match is found, then the process proceeds to rule #4. If there is more than one candidate then an error message indicating that the name is ambiguous is originated.
4) Check for supertype name: The given Object name is checked against all supertypes of the current Entity. If there is an exact match then the process implicitly follows the links to the named supertype to create the new Scope.
5) Check for Predicate connections via supertypes: The search in rule #3 is widened to include all supertypes of the current Entity. If a unique candidate emerges from this search then all the links are followed to the supertype that had the matching candidate and bind to the candidate Object.
6) Check for a subtype name: All subtypes of the current Entity are examined—if there is an exact match then implicitly the links are followed to the subtypes (going against the arrows on the diagram) and place the system in that Scope.
7) Try tunneling into the current Entity: If the current Entity is a nested Predicate, then the Roles of the current Entity/Predicate are examined just as any other Predicates Roles would be examined in rule #3. If there is a match a bind to the matching rolebox is provided.
8) Try tunneling into a target Entity: If the given Object name specifies an Entity which has a nested Predicate then there is examined the Roles of that Predicate for any with Role names that match the current Entity. If a matching name is found a link to that nested Role is provided.
9) Try tunneling into a target Entity connected to a supertype: The current Entity may not be connected to a nested Predicate, but one of its supertypes might be. All supertypes of the current Entity are examined for an unambiguous link into a nested Predicate.
10) Report Errors: If a matching name after rule #9 has not been found, then there is issued a failure code and the search is stopped.
11) Infer a single link to the Predicate containing the bound Object: If the Object was found, and a match was obtained using either rule #3 or rule #5, then it may be that the name matched a Role other than the current Entity—in this case there must be a unique entry into the matching Predicate from the current Entity. If that link is unique, then there is an inferred intermediate link. Otherwise an ambiguous link error message is generated if it is not unique.

Rules for binding names when scoped in a Predicate. Here again a name of the form Predicate:Object—with the Predicate being optional—has been specified. However, in this case it is within the Scope of a Predicate, and the next link must leave the Predicate as there are no other kinds of links to follow in the ORM diagram. The following rules are applied in this order to resolve the name.

1) Find the Predicate if any: If a filly qualified name was specified the Predicate name must be a valid Predicate, or else an error code indicating the Predicate name is unknown is originated. A valid Predicate name is either a normal Predicate name, or else the Entity name of an Entity with a nested Predicate—in the latter case the name refers to the nested Predicate and not the Entity. If a Predicate other than the current Predicate is specified here, and the current Predicate is not nested, then the error indicating that a new Predicate must go through an Entity is generated.
2) Check for Roles in the current Predicate: If no Predicate was specified in rule #1, or if the Predicate specified was the current Predicate (redundant, but valid), then there is examined all the Roles in the current Predicate to find a Role that matches the Object name. See rule #3 in the Entity Scope for the Role name matching details.
3) Try to un-nest the current Predicate: If the current Predicate is nested, and the process was unable to find a match using rule #2, then it is "un-nested" —that is, the current Scope is changed to be the Entity that contains the current nested Predicate and there is applied all of the Entity Scope rules on the input.
4) Report Errors: If neither rule #2 nor rule #3 was applicable then an error message indicating the name was not found in the search is originated.

Rules for binding names when not in any scope. Once again a name of the form Predicate: Object—with the Predicate being optional—has been specified. However, in this case the query is just beginning and there is no initial Scope. The following rules are applied in this order to resolve the name:

1) Find the Predicate and Role
2) Find the Entity
3) Report Errors

Note that in this case the DSL 62 is looking for a Entity Object or Entity Role in a Predicate and not a value—this is because if there is no Scope yet then the root Scope must be created and only entities can be used to make a Scope.

EXAMPLE SCOPING

Figure 34:
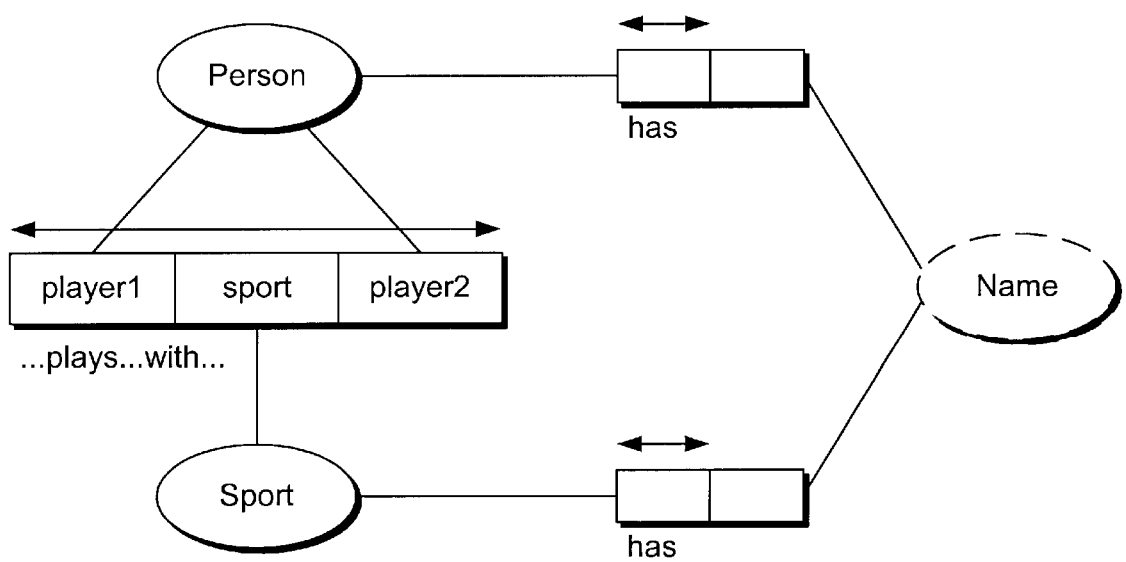
FIGS. 34 and 35 illustrate object-relational-models used to illustrate scoping according to one example embodiment of the invention.

In the sample ORM diagram of FIG. 34, there are two different Entities, Person and Sport, which each have a name. Thus, the following example query specifies that it is looking for Person names:

SELECT Person

```
{
    Name
}
```

Starting the query with "SELECT Person" accomplishes this objective. The following example query uses the dot operator like the computer language C++ to attach a Fact to a Scope on the same line:

SELECT Person

```
{
    Name,
    Sport.Name
}
```

This CQL statement appears that it might produce the names of all the people and the name of the sports they play. While with another schema it might—in the schema of FIG. 34 there is an ambiguous relationship between Person and Sport. The Person might be playing the Sport in their capacity as "player1" or as "player2" (in this schema these Roles are not symmetric, for instance player1 might be white and player2 black where the "sport" was chess). CQL can connect Objects through a Predicate (such as Person and Name above), but only if the path between them is unambiguous. Therefore, a mechanism is needed to provide an unambiguous path, as illustrated in the example query below:

SELECT Person

```
{
    Name,
    Player1.Sport.Name
}
```

In this query, the link is disambiguated, so the query is to return names of people and the names of the sports they play as player1. Even so, the name Player1 was still not fully qualified—Role names are guaranteed to be unique only within a particular Predicate. However, since it was in the Scope of "Person" there was only one "player1" Role that a person could play, and so the link was inferred. The example query below shows that explicitly instead:

SELECT Person

```
{
    Name,
    Person_plays_Sport_with_Person:Player1.Sport.Name
}
```

If the example of FIG. 34 were to have a schema with two Predicates having a Role named "player1" connected to Person, it would not be possible to infer the Scope, and this fully qualified name would be required.

Figure 35:
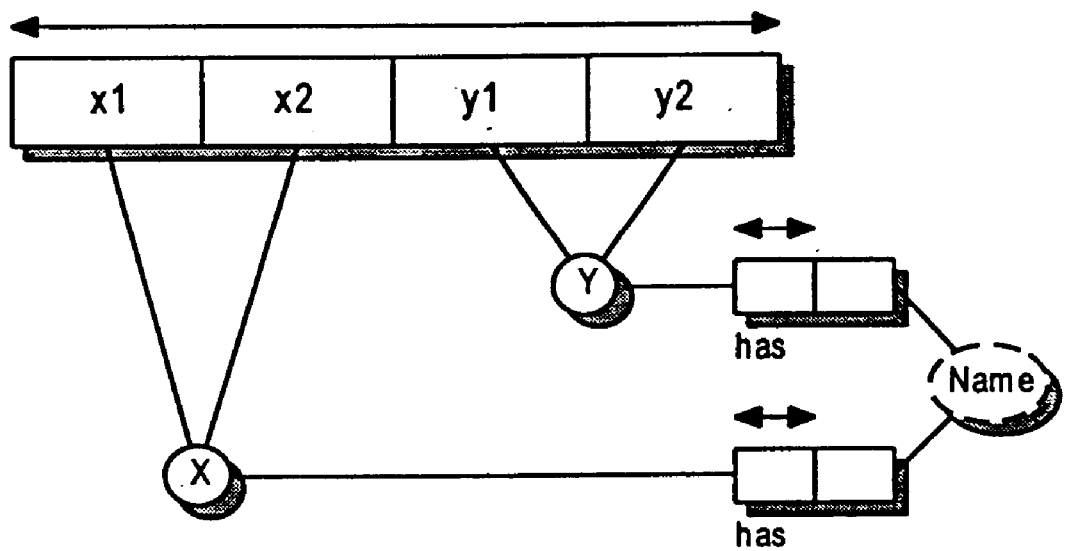

FIG. 35 shows a complex relation of pairs of x's to pairs of y's. The canonical name of the Predicate is X_and_X_use_Y_and_Y. However, the Object location syntax of CQL allows referencing as illustrated in this example query:

SELECT X

```
{
    Name,
    X1.Y1.Name
}
```

This query is a reasonable query asking for the names of all X and the name of all Y Objects which act as the Y1 while X is acting as X1. While the full Predicate name could be included before X1 and Y1 in the example, it was not necessary since the X Scope was good enough to identify the Role names uniquely.

The following example illustrates how DSL 62 interprets. Each hop through a Predicate has to be fully qualified, showing both the Role that was used to get into the Predicate and the Role that was used to get out of the Predicate. It can be viewed as following the lines in the diagram of FIG. 35, starting at X, following the line to x1, leaving via y1 to Y and finally to Name. As illustrated, Y isn't connected directly to Name, such that there is an inferred hop, as illustrated below. It can be seen that DSL 62 internally reduces all of the Object references to a series of simple "one line" hops. Also, although the diagram included no Role names, there were implied Role names which were the names of the Objects playing the Roles—Y and Name in this example are both Role names and Entity/Value names respectively.

Input to DSL: Internally Became:

```
SELECT Y              SELECT Y
{                     {
    Name                  Y_has_Name:Y.Y_has_has_Name:Name
}                     }
```

As can be seen by the previous examples, it's most common in DSL 62 to go from one Entity to another or to a Value directly. But, it is permissible and sometimes even necessary, to explicitly go through the Predicate—following one line on the diagram instead of two at a time. These intermediate Scopes are also valid starting points. Many of the above examples have shown rather complicated Scope building, and of course following a long path in the ORM could be even more complex. CQL provides two notations that are useful to help with this—aliasing and Scope nesting, as illustrated below:

```
SELECT                SELECT              SELECT
Y_has_Name:Y          Y_has_Name:Y        Y_has_Name:Y
{                     {                   {
    Y.y1.x1.Name,         Y.y1                Y.y1 as M,
    Y.y1.x2.Name          {                   M.x1.Name,
}                             x1.Name,        M.x2.Name
                              x2.Name     }
                          }
                      }
```

The above three forms of the query are semantically identical and result in exactly the same query.

Data Operations

In one example embodiment of the invention, there is provided a data structure for representing the ORM and its mapping to the physical schema, and rules and methods for operations on the underlying data, and in particular on the rowsets. In this regard, DSL 62 performs certain validations of data structures and also prevents DSL 62 or a user from corrupting the underlying database. These structure, rules and methods are, however, merely exemplary, and should not be regarded as limiting the invention. Further, the following examples are generally specific to using SQL as the physical data structure.

Figure 36:
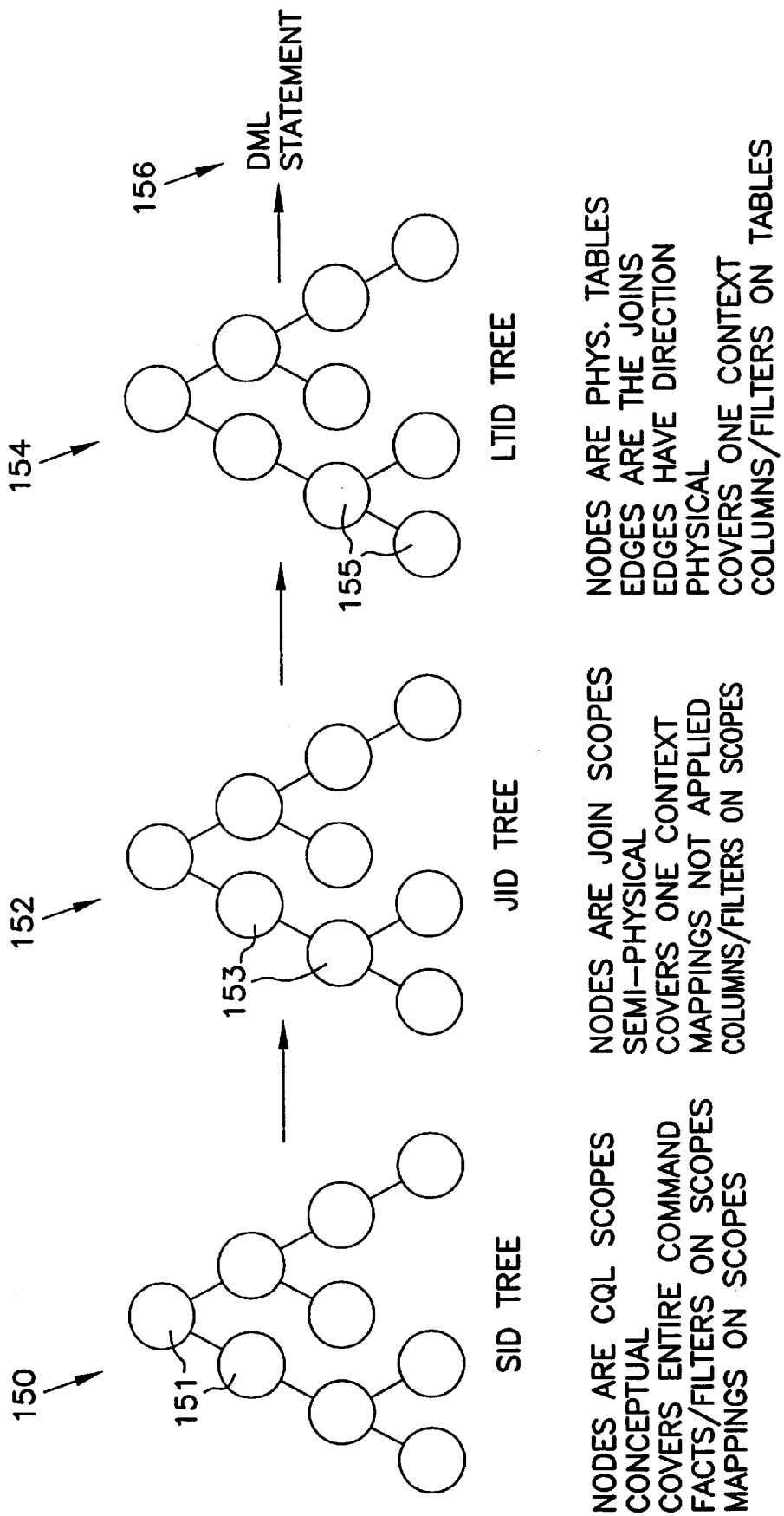
FIG. 36 illustrates a high-level overview of the use of the Scope, Join Scope, and Local Table trees used for translating a conceptual query to a physical query according to one example embodiment of the invention.

As noted above in the overview section of this patent, DSL 62 employs three different data structures in order to translate queries from CQL to DML. These are represented in FIG. 36. At the conceptual level, in order to perform scoping of queries, DSL 62 uses a scope tree structure 150 with each node 151 being identified by a Scope ID (SID), and referred to as the SID tree. This tree is stored, for example, in short term memory, in a manner allowing its parents and sibling scopes to be determined. Nodes 151 on the SID tree are CQL Scopes, which correspond to the links between Entities and Predicates in an ORM diagram. In one example embodiment, one tree is provided for each command type (SELECT, DELETE, UPDATE, or INSERT), such that the tree include Facts only in the case of DELETE, UPDATE or INSERT operations, where filters, sort items and the like are not applicable and do not need to be represented in the tree; however, the same tree can be used for all command types if desired, and unnecessary scopes ignored. Facts, Filters and mappings are applied on scopes. As described further below, many operations are performed on these trees to support modification commands. Although not necessary to the invention, one example embodiment of the invention provides for the ability to create nested SELECT queries (as described elsewhere herein). In the presence of multiple nested SELECTS, one embodiment of the invention partitions the Scope tree into "contexts", with one context for each nested "select". The Scope subtrees corresponding to each context are then independently reduced into separate Join Scope trees 152, as described below. As will be demonstrated below, the result is that each context has it's own DML fragment which facilities the creation of a suitably shaped rowset.

Each SID tree is reduced by DSL 62 into one or more SQL Join Scope trees 152 with each join scope node 153 being identified by a Join Scope ID or JID. The join scopes represent a partial reduction from conceptual to physical—each join scope corresponds to an instance of a stand-alone-mapping described in the mapping rules discussed above. Since each stand-alone mapping might include multiple tables (by means of foreign keys appearing in the mapping), additional tables are required to represent these joins. Further, each join scope is linked to its parent join scope by means of the linking mappings for the Predicates of the ORM, which in turn could involve intermediate tables.

Once the join scopes are fully identified, they are reduced to the final physical tree (154) form "local tables" where all of the conceptual and physical joins have been accounted for. Each node 155 on the tree is a physical table, and edges are the joins between tables. The local tables form a tree with nodes identified by local table ID (LTID). As described further below, walking the LTID tree gives the final shape of the DML query 156 (in this case an SQL statement—SELECT, INSERT, UPDATE, DELETE) that will be needed to perform the desired function. Note that since the physical joins were computed by reference to the foreign keys that were in the conceptual to physical mappings, the joins in the LTID "tree" have direction. So more properly, the LTID "tree" is actually a directed acyclic graph (DAG) and indeed does not have to be a "tree" in the mathematical sense.

In addition to explicit operations via CQL statements, DSL 62 supports direct manipulation of rowsets returned from SELECT statements. Using the normal OLE DB interfaces (IRowsetChange, IRowsetUpdate as defined in Microsoft's OLE DB specifications) DSL 62 clients can insert, delete, or modify some or all of the rows in a rowset. Preferably, DSL 62 performs checks and validations on rowsets to maintain their validity. For example, nullability is preferably checked (these are mandatory for the Predicate Roles). Also, value ranges or allowed lists are checked. In one possible embodiment, DSL 62 tracks a number of changes on rowsets, namely: each cell is tracked if it's been changed; each row is tracked if it's been changed, deleted, or freshly inserted (at commit time these tracking bits are reset after the appropriate commands have been issued); and once a row has been marked as deleted, no changes to that row are allowed until/unless there is an undo.

In order to transform a CQL statement or modified rowset into the correct DML needed, DSL 62 makes one or more passes over the LTID trees described above. For purposes of the following discussion it is assumed that the LTID's do in fact form a tree although the scheme readily extends to a DAG structure, as mentioned above.

Figure 37:
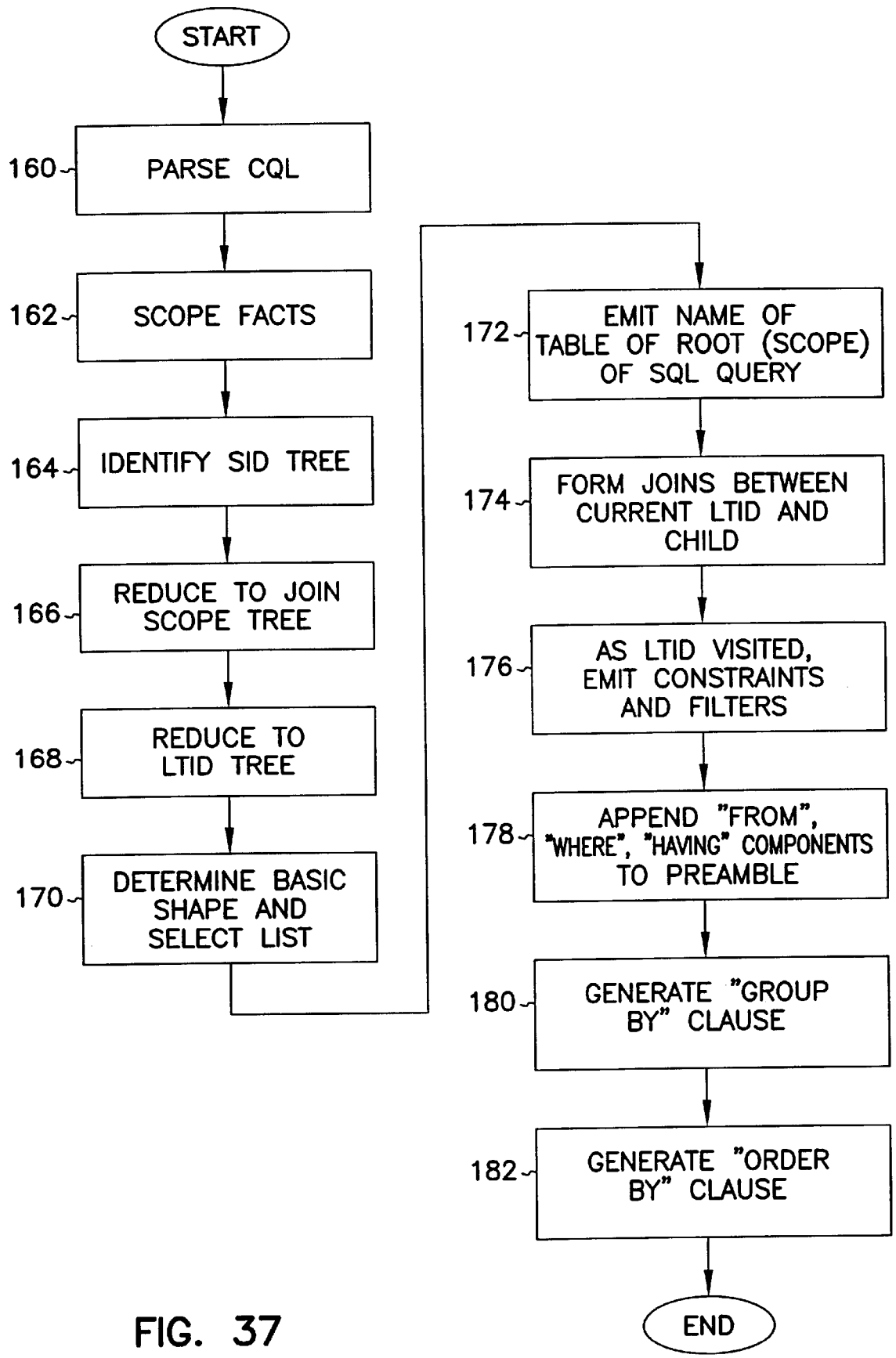
FIG. 37 is a flow diagram of the processing of a conceptual query by the data services layer according to one example embodiment of the invention.

SELECT processing: Referring to FIG. 37, the processing of a SELECT statement will now be described. The CQL statement is first parsed into logical units for further processing, for example with respect to each Fact requested (160). Each requested Fact is scoped (162), as explained above, to determine the Predicate to which it should be bound, and the SID tree is identified (164). The join scope for the Predicate is then identified (166), and the join scope is then reduced to final physical joins in the form of the LTID tree (168). Next, a suitable SQL SELECT statement (SQL being the preferred DML) is ascertained from the LTID tree. This process involves a recursive walk of the tree, beginning from the root with pre-walk and post-walk processing. First, in the prewalk, the basic shape of the SELECT statement is emitted along with the "select list"—the items which will be emitted (170). Each Fact that was present in the CQL statement is mapped to the LTID which it will come from (per the data dictionary information) so this is accomplished with a simple walk through the list of Facts sought in the CQL query. The last preamble task is to emit the name of the table associated with the root of the LTID tree as the first part of the SQL "From" clause (172). This is the physical table that was the root of the CQL query and it will be the root of the SQL From clause. Next, the recursive portion of the SELECT processing begins. Each child of the current LTID is visited and a SQL "join" is formed between the current LTID and the child (174)—the join is a simple INNER JOIN where the LTID corresponds to required Fact, a LEFT OUTER JOIN where the LTID is optional, and either a NOT EXISTS or EXISTS sub-clause where exclusion or inclusion (but not a join) is specified. These join types correspond directly to the [required], [optional], and [exclude] constructs in CQL and indeed survive each successive translation from conceptual to physical. Recalling that the edges in the LTID tree correspond to foreign keys or virtual foreign keys it is readily seen that the join condition (i.e. the linkage between the parent LTID and the child LTID) is equality of all the corresponding columns that are part of the foreign key (remembering that foreign keys constrain columns at one end to be equal to corresponding columns in a unique key on the other end). These operations give the basic shape of the query with all the joins in place. Additionally, as each LTID is visited, any constraints and/or filters associated with that table are emitted into either the FROM, WHERE, or HAVING clause as appropriate for the type of join and the aggregate or non-aggregate nature of the filtered items (176).

Once the recursion is complete it remains only to append the accumulated FROM, WHERE, and HAVING components to the preamble (178) and then to generate a suitable GROUP BY clause (180) based on the presence of aggregates (DSL 62 preferably emits a GROUP BY clause that groups by all non-aggregate Facts in the order they occurred) and finally to generate an ORDER BY clause (182) that corresponds to all of the Facts that were found in CQL "sort by" clauses—as with the selected Facts these have already been reduced to columns on particular local tables (i.e. bound to an LTID). It readily follows from the above described process that explicit DELETE, UPDATE and INSERT statements can be generated from explicit CQL for those respective statements in an analogous manner. Rowset based processing of the UPDATE family of commands is discussed below.

Referring now to FIG. 38, there is illustrated one example of the reduction of a CQL query to SQL using the three different tree data structures outlined above. This example is made with reference to the conceptual schema of FIG. 17, and the physical schema of FIG. 18. It assumes the following CQL query:

SELECT Restaurant

{
    Name,
    Cuisine
}

It further assumes that this query has been scoped, using the above described scoping processes, so that the sought after Facts, Name and Cuisine, have been located in the conceptual schema by following the links from the Entity Restaurant, and the maps from the Scope (Restaurant) to the needed Predicates (Business_has_Name and Restaurant_has_Cuisine) have been determined. In the SID tree 190 for this query, the mapping information noted in each node of the SID tree correlates to the mapping information in FIG. 19. As illustrated, the Restaurant scope, or node, SID=1, is linked to the scope or node for the Business Entity, SID=2, which in turn is linked to the Predicate Business_has_Name. The SID=1 node is also linked to the Restaurant_has_Cuisine Predicate which includes the constraint that BusinessType=Restaurant. The JID tree 192 is obtained from the SID tree. In this case it is seen that the nodes of the SID tree have been folded into one JID node, where Restaurant is the Scope, and the constraint is that BusinessType=Restaurant. This JID tree node contains all the mapping information of the SID nodes. The JID scope tree 192 is then reduced to the LTID tree 194, wherein the primary key PKBusiness is used to identify the Business table from the DDF (FIGS. 6A–16), and wherein the constraint continues to be that the BusinessType=Restaurant. This LTID node is in turn used to form an SQL statement 196, where the column targets T1.Name and T1.Cuisine are formed from the Name and Cuisine Facts, and the From clause is formed of the Business table, and the Where clause is formed from the column designator T1.BusinessType= 'Restaurant.'

Figure 39:
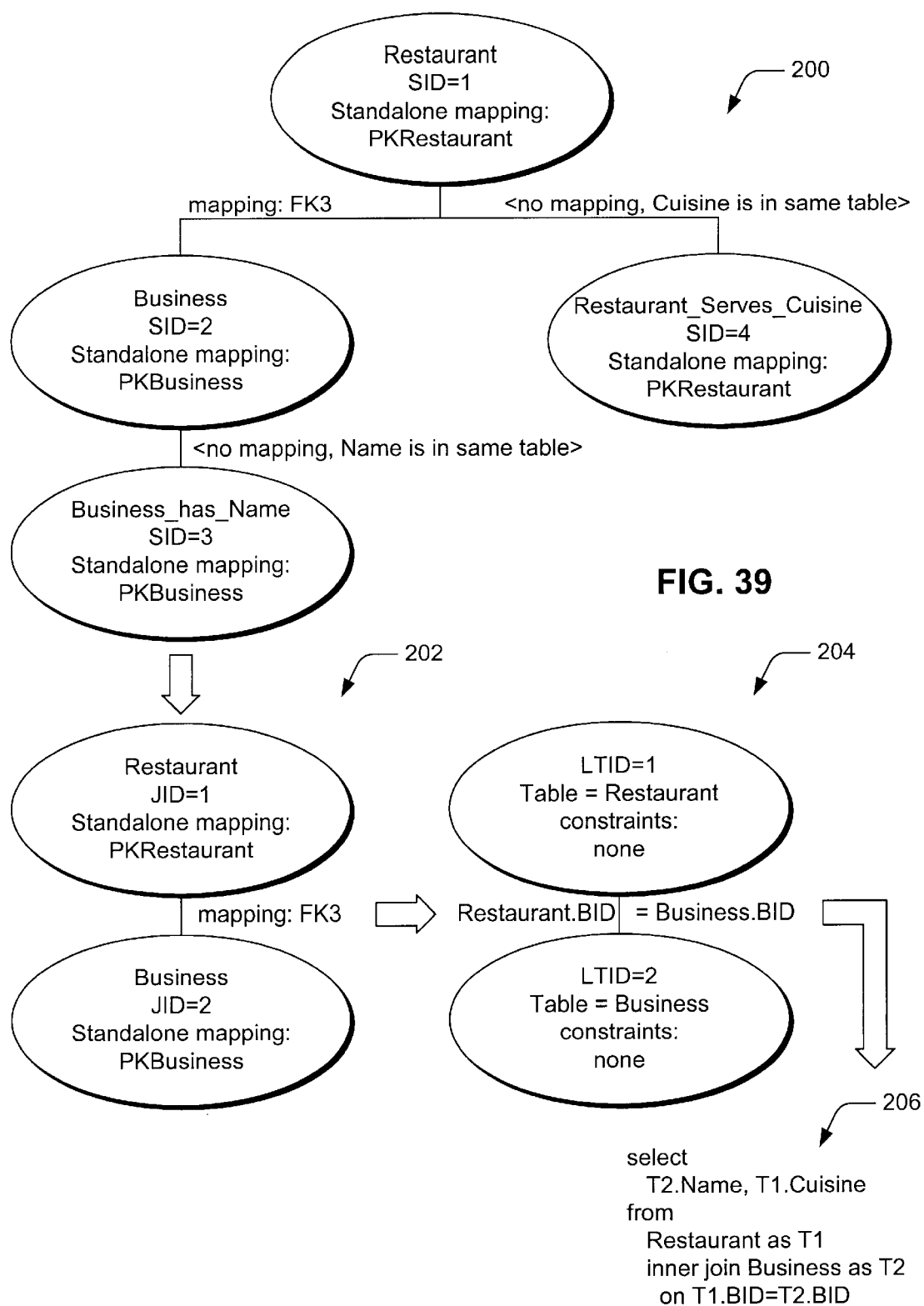

FIG. 39 illustrates yet another reduction of the same CQL SELECT statement into SQL, in this case assuming the conceptual schema of FIG. 17 and the physical schema of FIG. 20, and the mapping of FIG. 21. The SID tree 200 is similar to the tree 190, except that the Restaurant_serves_Cuisine Predicate is mapped to the Restaurant Entity instead of the Business Entity. Further, this tree reduces to the JID tree 202, which has a node for each primary key, PKBusiness and PKRestaurant, linked by the foreign key FK3. This tree is in turn reduced to the LTID tree 204, wherein the Restaurant and Business tables from the physical schemas, with no constraints, are identified. The arrow from the Restaurant to the Business Table indicates the direction of the foreign key. This tree in turn determines the shape of the SQL query 206. It is known from the scoping and the DDF that the column Name is found in the Business table, and the column Cuisine is found in the Restaurant table. These tables are joined in the From clause, to complete the SQL query.

Figure 40A:
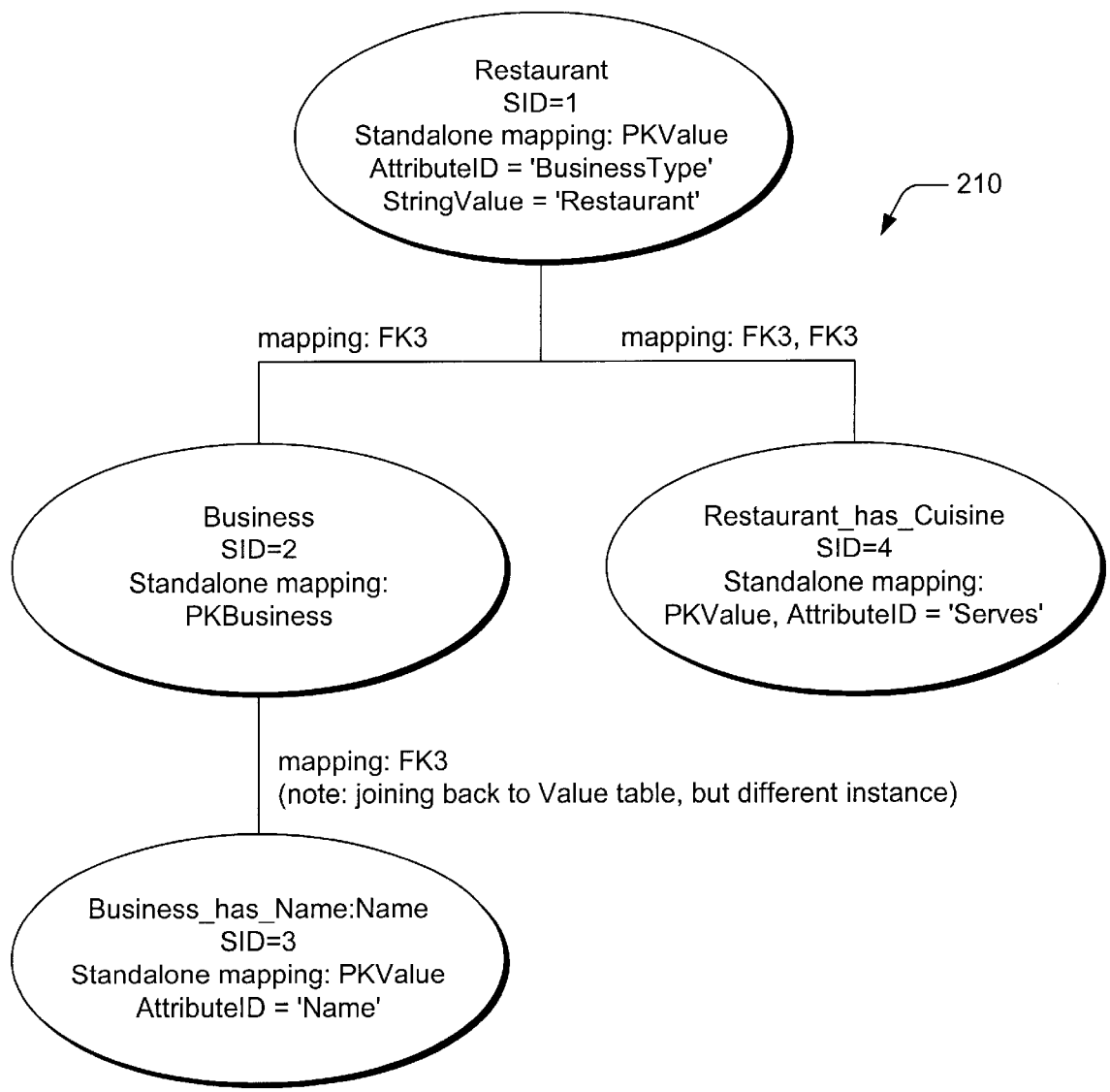
Figure 40B:
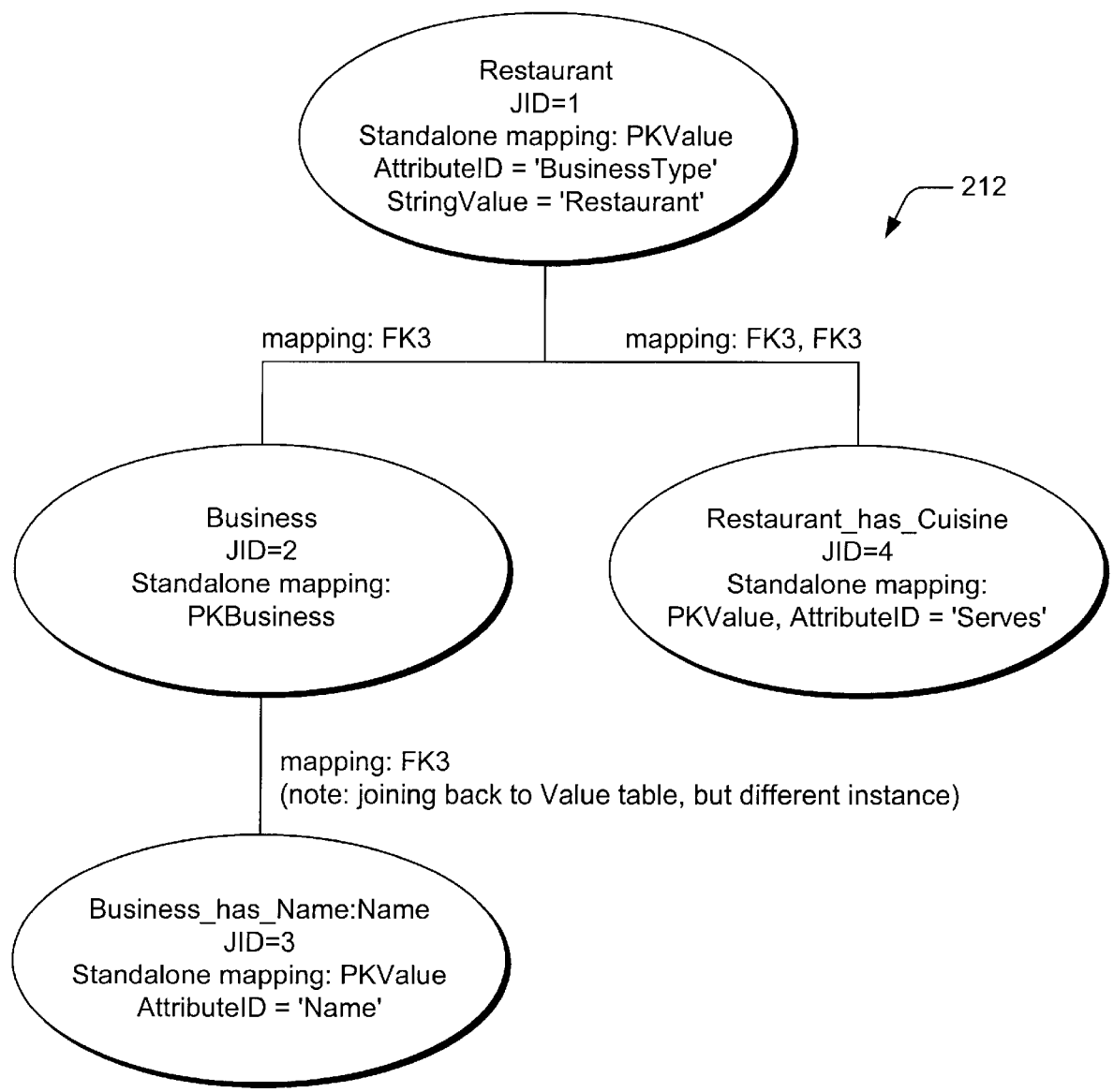
Figure 40C:
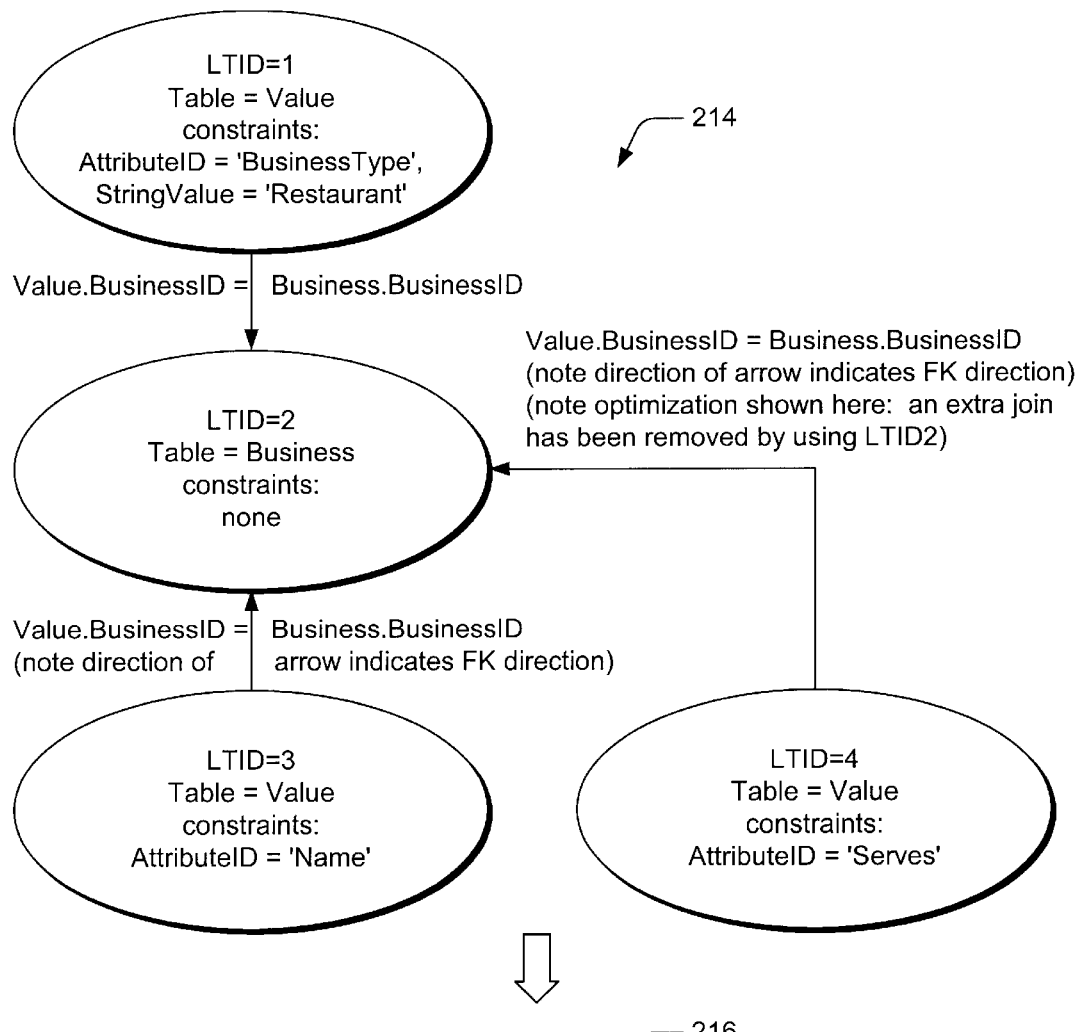

FIGS. 40A–C show yet another reduction of the same CQL query, but in this case assuming the physical schema of FIG. 22, and the mapping of FIG. 23. As illustrated, the nodes in the SID tree 210 are each linked to each other by foreign keys. Thus, in this instance, the SID tree 210 does not fold down into the JID tree 212, because each SID tree node has a different, stand-alone mapping. The JID tree 212 is reduced to the LTID tree 214, which includes the tables Value and Business, but with three different instances of the Value table, constrained in three different ways. This LTID tree in turn is used to form the SQL statement 216, wherein the Facts Name and Cuisine are found in the StringValue columns of the tables T3 and T4 formed by the inner joins specified in the From clause, and where the AttributeID (of table T1–Value)=BusinessType, and the StringValue (column of T1)=Restaurant. The joins for this From clause are performed in the order specified by the LTID node numbers.

Figure 41:
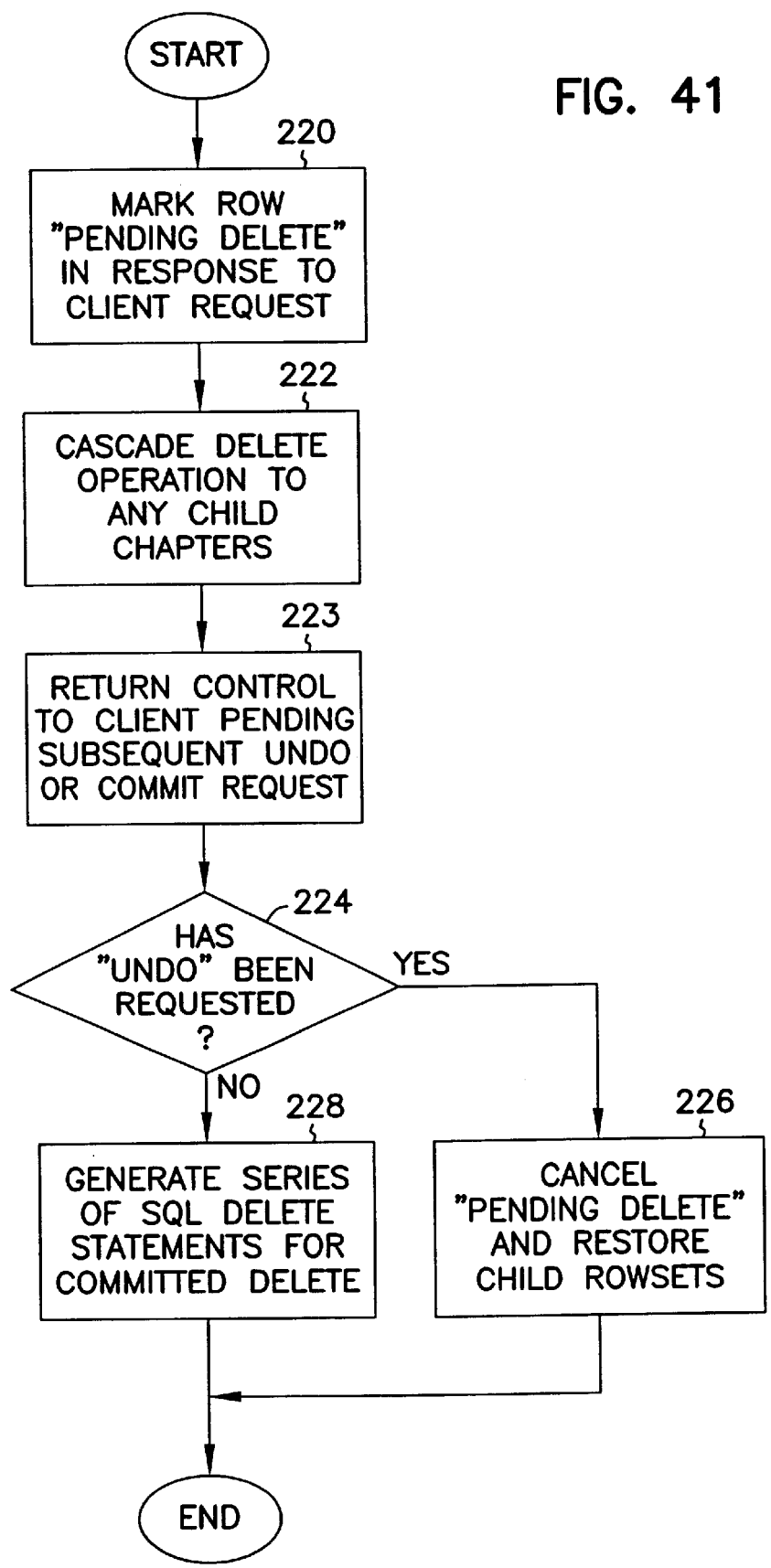
FIGS. 41, 42 and 43 illustrate the processing of conceptual DELETE, UPDATE and INSERT statements according to one example embodiment of the invention.

Rowset based DELETE operations: Before discussing the generating of DML, there will first be described the rowset housekeeping issues associated with DELETE operations. Referring to FIG. 41, when a consumer requests that a row be deleted, DSL 62 marks the indicated row "pending delete" and the DELETE operation cascades to any child chapters that are present in the rowset (222). This is necessary to preserve the logical consistency of the rowset—in particular, there cannot be any "orphaned" child rowsets. Control is returned to the client, pending a subsequent undo or commit request (223). If an 'undo' is preformed on a deleted row (224) (before the changes have been committed) then the row is no longer considered "pending delete" and any child rowsets are similarly restored (226). When the delete is committed a series of SQL DELETE statements are generated for each row marked "pending delete" (228). Specifically a DELETE statement is generated for the main table of the deleted Object and further DELETE statements are recursively generated for each table whose primary key is "weak" on the primary key of the main table. This recursion happens in "post-order" so that the "weakest" tables are deleted first (any other order would result in referential integrity violations from SQL). The WHERE part of the DELETE statement is simply the primary key values of rows in the main table of the SELECT statement. Note that if the consumer had not requested these primary key values, they would have be automatically added to the request and fetched as hidden columns so that they can be used for this purpose.

Figure 42:
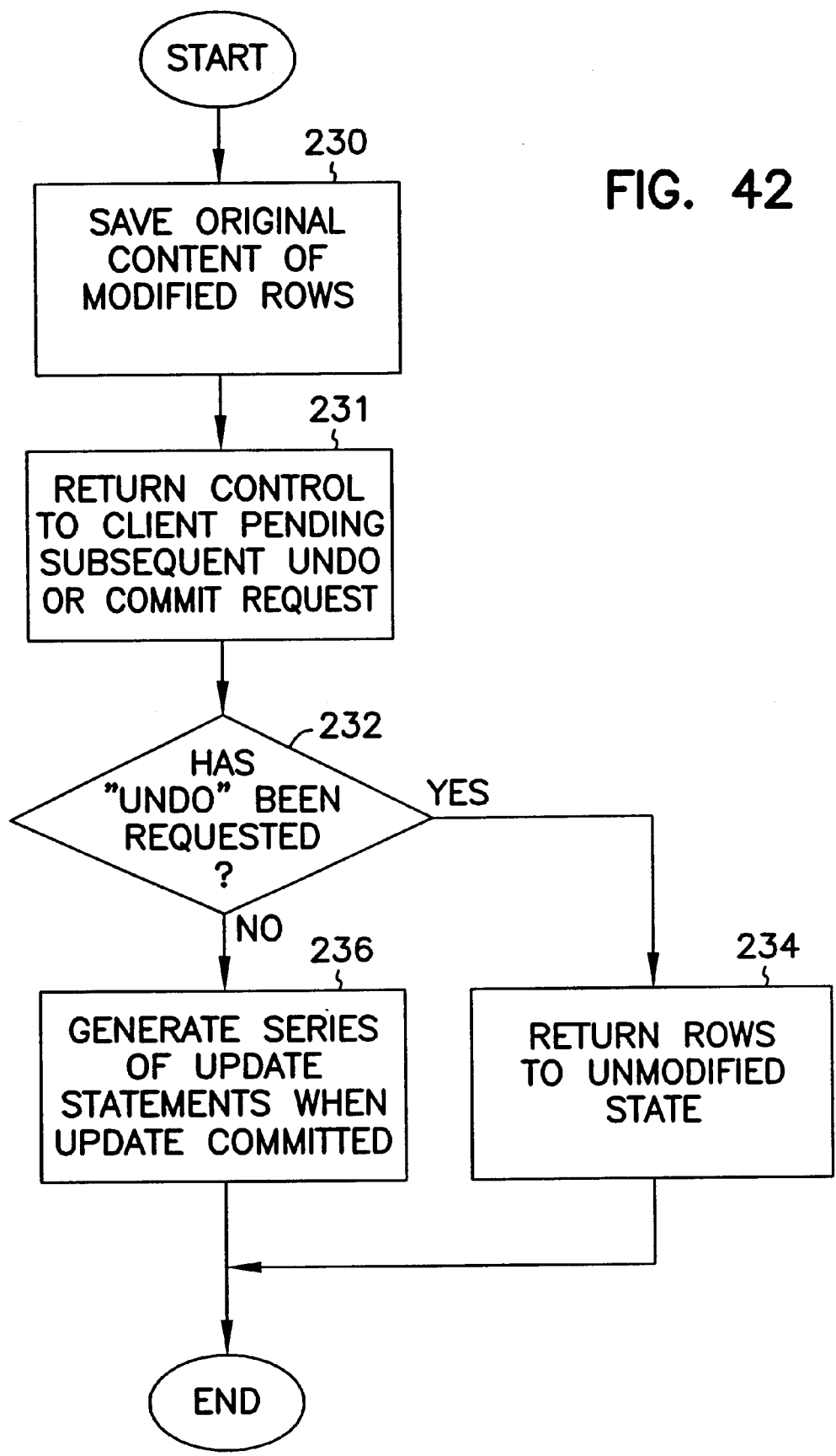

Rowset based UPDATE operations: Here the rowset "housekeeping" is modest. Referring to FIG. 42, UPDATE operations will be described. Rows whose content has been modified are so marked by DSL 62 at the time of modification, and the original contents preserved (230). Control is returned to the client, pending a subsequent undo or commit request (231). In the event of an "undo" (232) the original contents are reverted and the row is returned to an "unmodified" state (234). When an UPDATE is committed a suitable series of UPDATE statements need to be generated (236). This is done in the same way as in the SELECT case—a recursive walk of the LTID tree is performed. Here again, the edges of the LTID tree correspond to foreign keys, and they therefore tie columns together and they have direction. The recursion proceeds as follows: an UPDATE statement for the current table is generated with the portion describing the update corresponding exactly to those value columns which have been changed and the WHERE portion of the UPDATE statement being formed by:

1) available portions of the primary key in the rowset (and as with the DELETE statement the primary key for the root of the query is automatically fetched even if not requested);
2) constraints on the current LTID's primary that came from constraints encoded in the conceptual to physical mapping; and
3) known column values from the parent LTID of this LTID that are constrained due to the foreign key that links the parent and child (this is what causes the known primary key in the root table to be part of the where clause of all of the children).

This almost completes the formation of the UPDATE statements. However, when doing the recursion, if the foreign key that links a child (that is going to be visited) to the parent is such that the child constrains the parent and not vice-versa, then an update is not generated for that child. Instead, a SELECT statement is generated (Oust as in the normal SELECT processing) and the resulting values are used in the where clause of the update for the parent (and made available to further children of the parent). This aspect of the processing handles cases where, for instance, a value was changed from one conceptual domain value to another (e.g. a product which was once "cheap" (code 1) becomes "expensive" (code 2)—the rowset contains the values "cheap" and "expensive" and these must be mapped to codes 1 & 2 by means of a SELECT statement in order to perform the required update correctly).

Now that all the issues have been identified, a recap showing an effective order is helpful, for the current LTID:

1) add Facts that were selected directly into the rowset to the set of known Facts;
2) add Facts that can be computed because of constraints from the parent LTID to the known Facts;
3) add Facts that can be computed because they are mapping constraints to the known Facts;
4) generate SELECT statements for any children of the current node which constrain the current node rather than are constrained by it (by consulting the direction of the foreign key linking the parent and child);
5) generate an UPDATE statement for the current table where all of the known Facts which are in this table and not part of it's primary key are modified to their new values and in which the where part is all of the parts of the primary key which are known (and will necessarily be known in totality) are computed from the other known Facts as described above; and
6) visit all of the children of this LTID node which are constrained by this node and generate UPDATE statements in like manner for them.

Figure 43:
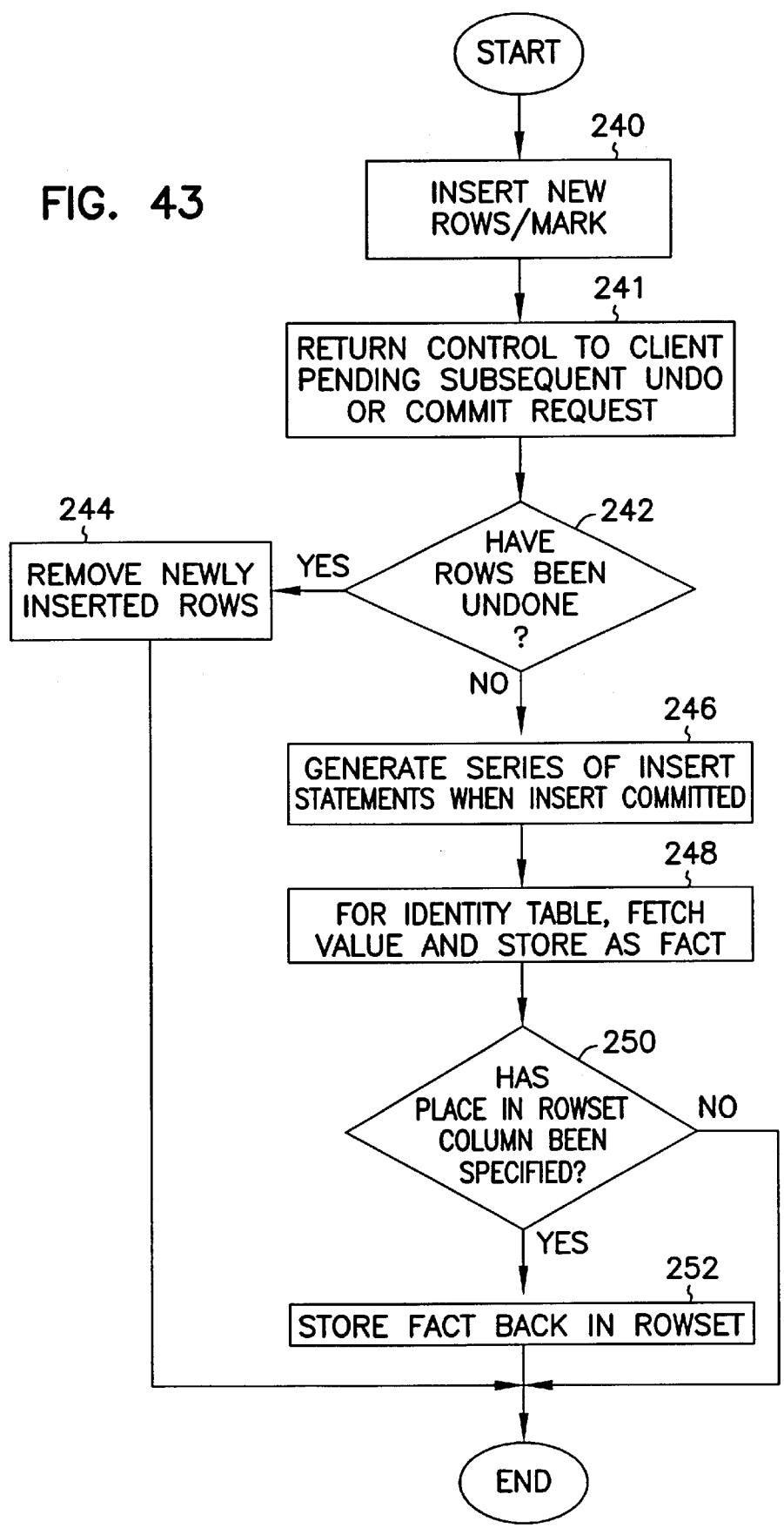

Rowset based INSERT operations: Referring now to FIG. 43, the INSERT operation will be described. The rowset housekeeping operations here consist of allowing new rows to be inserted and tracking these newly inserted rows (240), returning to the client, and, pending a subsequent undo or commit request (241), removing them from the rowset (244) in the case of an "undo" operation (242). To commit an INSERT, a process (246) that is analogous to the UPDATE operation (including the possibility of SELECT statements appearing (245)) is used. The process requires only one minor modification compared to the UPDATE process: after any given INSERT statement is executed it is possible that the table involved had "identity," also known as "auto-increment" columns. The Value that was assigned to these auto-increment columns must be fetched from the server and stored as a Fact available to future child nodes in a like manner to the SELECT case (248). If the DSL 62 consumer has specified a place in the rowset (250) for one of these columns (not necessary) then this Fact must also be stored back in the rowset when the insert is complete (252).

Lastly, it is worth noting that there are some ordering constraints to preserve correctness in the case where there are child rowsets being updated concurrently with parent rowsets (a DSL 62 client can commit specific rowsets or all the rowsets at once). The two rules that must be followed are:

1) the contents of child rowsets must be deleted before the parent rowsets are deleted; and
2) the contents of child rowsets must be inserted after the parent rowset has been inserted.

Updates can happen in any order, while DELETES can happen before or after INSERTS, whichever is most convenient to an embodiment.

Preferably, DSL 62 provides a timestamp support where when an update is done, if the timestamp has changed since the fetch, the update is aborted.

DETAILED DESCRIPTION OF DSL 62

Thus, the system as described above provides for mapping a conceptual schema (preferably represented via an ORM) to a physical schema. It further provides a query language which allows accessing and manipulating the physical database using conceptual terms, such as Entities, Values and Predicates. DSL 62 uses the mapping information to interpret the CQL commands and queries and converts them to one or more DML queries by which the underlying physical data may be accessed. The details of translating CQL queries to DML queries are not important to the invention, and the invention is in no way limited to any particular translation/interpretation process or methodology. In general, however, it is important that DSL 62 ensure, prior to execution of a CQL query, that the query will not result in a corruption of the underlying physical database, and that the CQL query can successfully complete. There are many different rules and approaches that can be taken for this purpose, and such rules and approaches will vary depending on the type of physical database and the DML required. In particular, the rules of translation of CQL to DML will be a function of CQL on the one hand (including the ORM model, commands and syntax) and the physical database and its properties on the other. Accordingly, the details of these translations are not essential to the invention.

Figure 44:
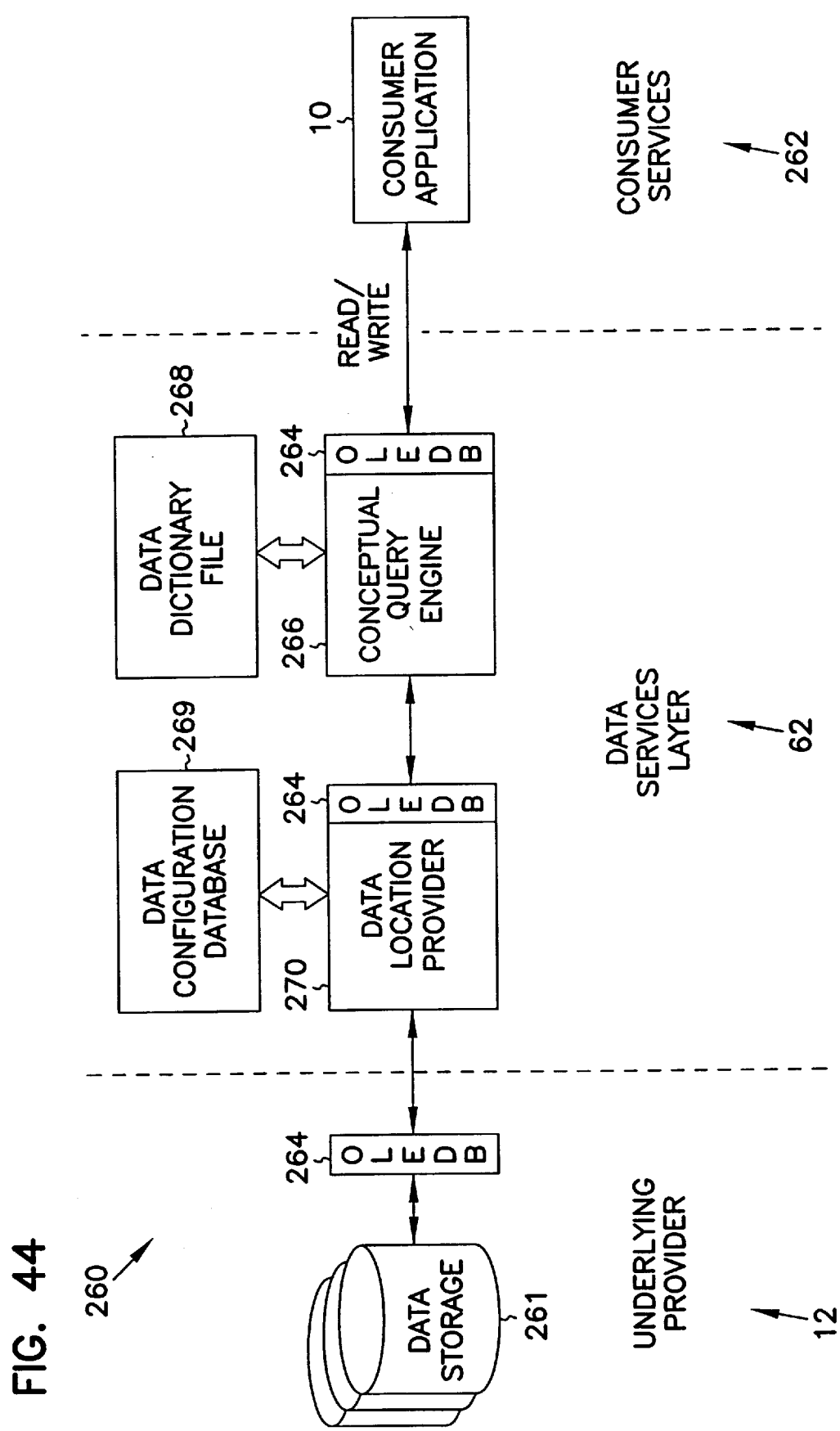
FIGS. 44, 45 and 46 illustrate one example embodiment of a data services layer in a computing environment according to the present invention.

Referring now to FIG. 44, there is shown in more detail an implementation of the DSL 62 in a data services architecture 260. Data services architecture 260 is segmented in FIG. 44 into an underlying provider 12, DSL 62, and consumer services 262. The consumer services layer 262 includes one or more consumer applications 10 generating CQL requests 61 to the DSL 62 through an OLE DB interface 264. DSL 62 includes a conceptual query engine (CQE) 266, DDF (data dictionary file) 268 containing conceptual schema information, a data location provider (DLP) 270, and a data configuration database (DCD) 269 containing server and database information.

CQE 266 is responsible for accepting CQL queries 61, generating the physical DML (e.g. SQL), and fetching and returning the final result sets. CQE 266 optimizes the physical queries it generates (for example as shown in U.S. patent application Ser. No. '287) and reduces the network traffic. It also allows the data returned to be cached in its final conceptual rowset form, which can improve performance. DLP 270 acts essentially as a smart, efficient OLE DB command server, abstracting from its consumer, the CQE 266, the physical location of the data pertaining to a given command. The DLP 270 handles the connections to the databases, data partitioning strategies and error recovery. CQE 266 requests command Objects from DLP 270 for the execution of DML queries, formulates queries, and then requests those queries to be executed by the DLP 270. CQE 266 abstracts all the physical data and has logic for maximizing query performance. In this regard, while forming the query plan, query optimizations can be applied. Query optimizations depend on the specific DBMS server being used, the environment and specific application needs. CQE 266 stores all its performance logic in separate, pluggable components—called performance profiles, and chooses a suitable profile for a certain query. The performance profile is used to optimize the query plan. The performance profile abstraction allows tuning of the query plans differently depending on the environment. These performance characteristics may be used by differing CQL interpreters independent of the particulars of the CQL, and these performance characteristics may embody knowledge of different operating environments including, but not limited to, the nature and quantity of the data in the application, the particulars of the DML interpreter (e.g. it's manufacturer and version number), the network topology and other architectural and operational issues associated with the deployment of a particular system. Domain specific knowledge may include, for example, facts such as that the domain is dealing with about 1 million books and that there are never more than two books by the same author. These data might be useful in creating better queries. Other domain specific information may include, for instance, information concerning what day of the week the system should avoid certain optimizations because of the likelihood these optimizations will run slow due to system conditions known to occur on a particular day. Another example may be that, at a certain time, such as in the middle of the night, ample memory is available, allowing optimizations that take advantage of the ample memory. Statistical index information from the physical store could also be provided in a performance profile and used to choose an effective execution plan.

Thus, the performance profile provides this domain specific knowledge to the DSL 62 in a generic fashion, maintaining the domain independence of the DSL 62. Performance profiles are preferably kept in the form of COM components (for example as found in Microsoft Windows® operating system) that can be used by CQE 266 when needed. DSL 62 supports distributed queries and can join the data across databases or servers.

The OLE DB interfaces 264 each provide a proven, robust database interface which defines objects and interfaces that are geared for database services. OLE DB componentizes data access providers and allows easy plug and play of components from different sources. One possible OLE DB provider is Microsoft's Microsoft OLE DB Provider for ODBC. By implementing the data services using OLE DB, the system can interface between them in a well-defined manner, allowing flexibility to solve the problems at hand. Any components exposed via OLE DB are accessible in C++ as well as Visual Basic/Script (VB/S) using ADO via a simple yet powerful object model. However, it shall be understood that OLE DB is in no way critical to the invention, and that DSL 62 can be implemented in a variety of other ways that do not use OLE DB.

Data Configuration Information

An important aspect of the DSL 62 is its ability to specify, store and retrieve information on database configurations. This information includes connection information for all databases in the configuration, how that data is partitioned, and what type of connection pooling and connection recovery the system is to maintain. Where this data is stored is not critical to the operation of the invention.

To provide operational flexibility, the catalogs described in the DDF 268 are further mapped to physical databases on physical servers using the DCD 269 which is stored in the DLP 270. The DLP 270 abstracts the data for the DCD 269 from CQE 266. For each database (an SQL Server in this example) in the configuration the following information is stored: 1) Database Name; 2) Server Name; 3) User ID; 4) Password; 5) Min Connections; 6) Max Connections; 7) Connect retries; and 8) ConfigurationID, which identifies a set of all the other data listed (a set of databases, with their corresponding Servers, User IDs, Passwords and the like). Only one ConfigurationID can be valid for an instance of CQE 266/DLP 270, and it is passed to these components as an intialization property.

Each distinct Database Name in a configuration is used as a name for a uniform data source set (UDSS). Each distinct UDSS groups all the databases with the same name into one unit, and it is assumed that each database in this unit may be used to satisfy requests for UPSOs 294 from this UDSS. As described more fully below, when CQE 266 passes a UDSS name to DLP 270 and requests an UPSO 294 from that UDSS, DLP 270 uses load balancing and performance logic as described further below to choose one of the databases within the named UDSS from which to return the UPSO 294. A UDSS contains one underlying provider data source object (UPDSO) 292 (described below with respect to FIG. 45) for each database in the group. As schematically illustrated in FIG. 46, each UPDSO 292 within a UDSS 291, has multiple sessions 295 that are each open to an underlying database 261 provider 12. For each UDSS, the DLP 270 stores the following data partitioning information: 1) UDSS Name (primary key); 2) Description of what type of data this group represents (i.e., Seattle Businesses); 3) Name of Vertical Partition this database group represents (i.e., Business); and 4) Whether or not this database group also represents a horizontal partition. If so, Horizontal Partition Details specifying in what range this database group falls (i.e., "city=seattle" or "'o'<BusinessName<='z'" if horizontal partitioning is applicable. According to this embodiment of the invention, vertical partitioning is provided. However, horizontal partitioning may also be provided if desired. The DLP 270 obtains the above noted data configuration information from the Data Configuration Object (DCO) 281. The DCO 281 reads the data configuration information from the DCD 269 and reports it to the DLP 270, as explained further below.

Usually there will be a UDSS for each data partition. For example, if business and product data is split into different databases there will be a UDSS for each. Also, it may be desirable to split the data horizontally (business IDs less than 10,000 go in one database and the rest in another). The DLP 270 supports both vertical and horizontal data partitioning.

The DLP 270 also stores error information that is global information applying to all databases in the system. This information includes a list of fatal error codes that will be trapped by the outer command object. Preferably, a data editing tool is provided to allow easy adding, changing and deleting of information in DCD 269.

COE 266 and DLP 270

CQE 266 and DLP 270 of DSL 62 are implemented as OLE DB providers. They both conform to the OLE DB 1.5 standard and supports advanced OLE DB features. CQE 266 and DLP 270 are factored according to the standard OLE DB factoring. These components include a Data Source Object (DSO), a Session Object (SO), a Command Object (CO), and a Rowset Object (RO). DSOs contain the machinery to connect to a data source, such as a file or DBMS. DSOs are a factory for sessions. Sessions provided by DSO's provide a context for transactions and can be implicitly or explicitly transacted. A single DSO can create multiple sessions. Sessions are a factory for transactions, commands and rowsets. Commands provided by SO's execute a text command, such as an SQL statement. If the text command specifies a rowset, such as SELECT statement, the command is a factory for the rowset. A single session can create multiple commands. Rowsets expose data in tabular format. A special case of a rowset is an index. Rowsets can be created from a session or a command.

Operation of COE 266 and DLP 270 OLE DB Components

Figure 45:
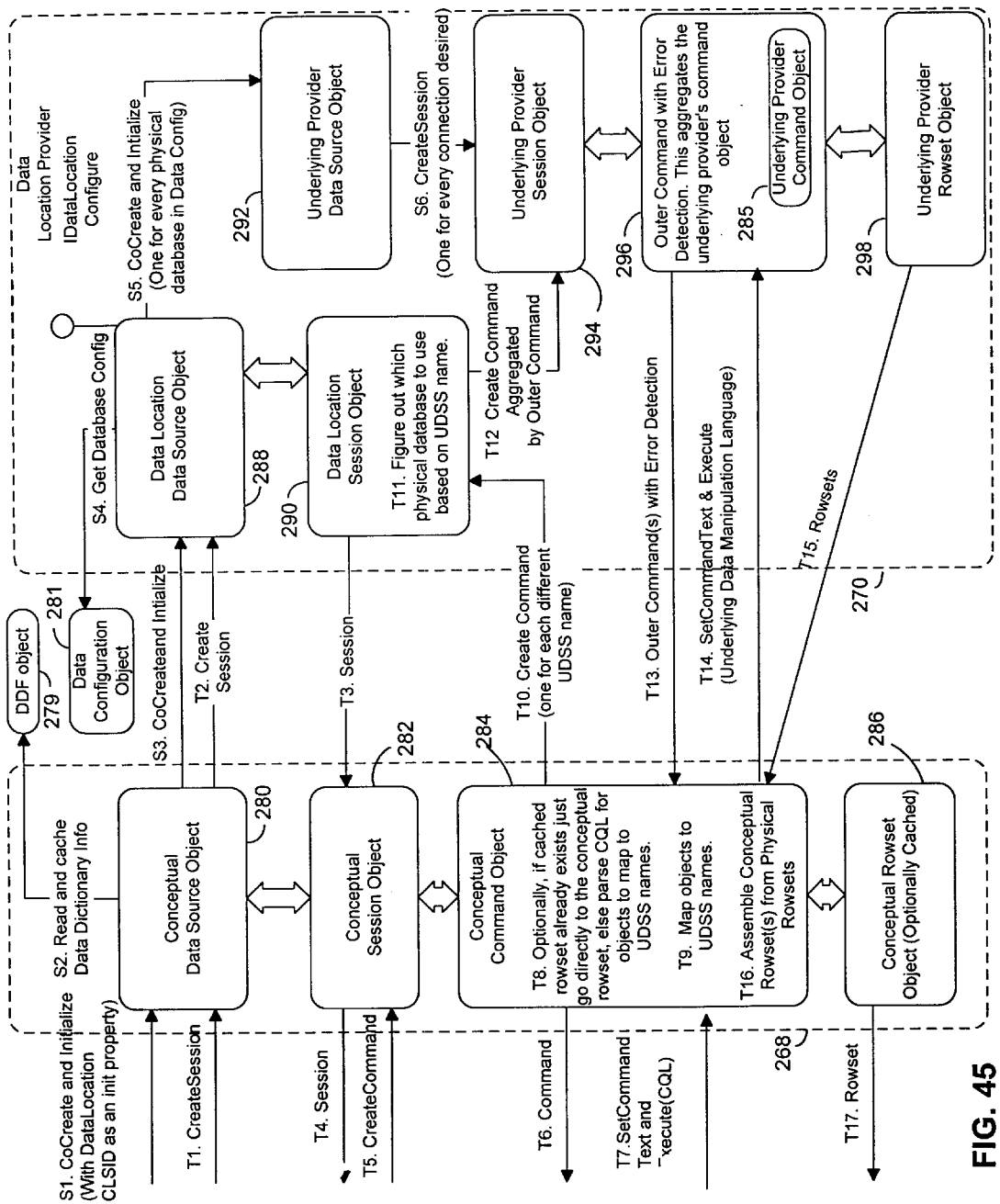
Figure 46:
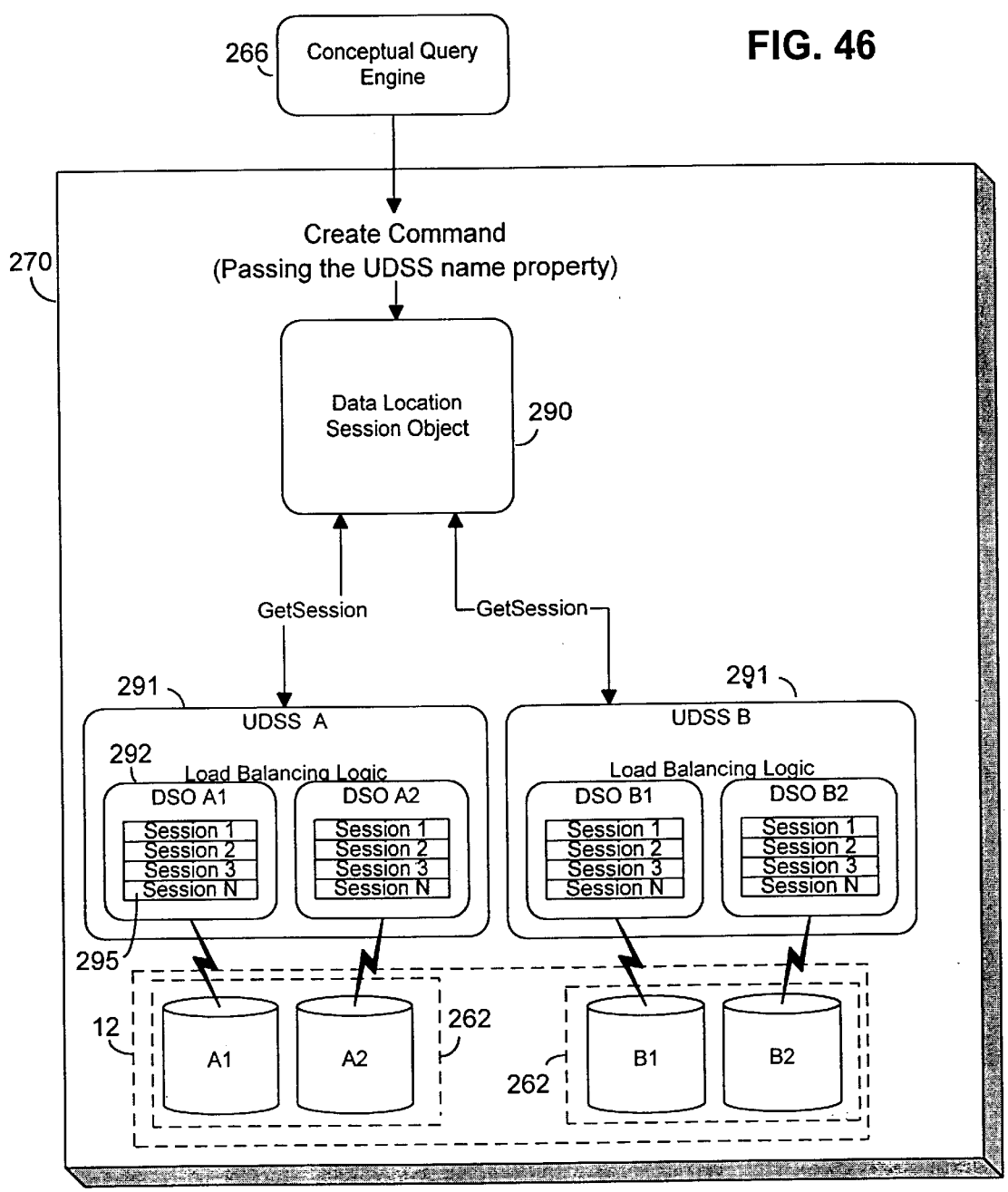

Referring to FIG. 45, the detailed operation of the CQE 266 and DLP 270 will be explained. In FIG. 45, numbers that start with "S" are startup operations, while "T" signifies standard transactions. The Conceptual Data Source Object (CDSO) 280 exists as one global instantiation shared by all process requests to the CQE 266. Its purpose is to establish a data provider for accessing conceptual data. Upon initialization (S1), CDSO 280 reads and caches data dictionary information from the DDF Object (DDFO) 279 (containing the information from the DDF 268), and creates and initializes the Data Location Data Source Object (DLDSO) 288.

DLDSO 288 reads the data configuration information using the Data Configuration Object (DCO) 281 (S4). It caches this data and uses it to create an underlying provider DSO (UPDSO) 292 for each physical data store 261 in the underlying provider 12 (S5). The UPDSO's 292 are organized by the DLDSO 288 into UDSSs, so there is one UDSS (291 in FIG. 46) for each type of database (in FIG. 46, databases A and B (262) each have two physical stores A1-A2 and B1-B2). The UDSSs present these individual data stores in each database as one UDSS data source.

DLDSO 288 initializes each UDSS pool with information on the databases to connect to and how many connections to use, and how many reconnects to attempt after a bad connection. The DLDSO 288 thus creates an Underlying Provider Session Object (UPSO) 294 connection specified in the data configuration information (S6). Opening these sessions at startup is an optimization that saves opening a session (an expensive operation) to a DBMS every time a query needs to be executed. The DLDSO 288 may optionally also provide for adding, deleting or changing the configuration data of a database in the DCO 281, allowing dynamic configuration of the multiple underlying data sources.

The DLDSO 288 performs data location, session pooling (complete with load balancing) and smart selection of an UPDSO 292 (for distributed transaction performance) to produce the right underlying commands to be used by the Conceptual Command Object (CCO) 284, as explained in more detail below. The DLDSO 288 relies on cached information from DCO 281 to understand where the data is physically located, how it is partitioned and what type of session pooling to perform.

Once initialization has been completed, the CDSO 280 may receive a request to create a session (T1). In response thereto, it requests (T2) the DLDSO 288 to create a Data Location Session Object (DLSO) 290 (described in detail below), and creates a Conceptual Session Object (CSO) 282. DLSO 290 returns (T3) to the CSO 282 a pointer to the DLSO 290, and the CSO 282 is then returned (T4) to the consumer application 10.

The consumer application 10 creates a new conceptual session and corresponding CSO 282 for every transaction. The CSO 282 provides a context for any transaction that needs to be applied. In response to a request (T5), CSO 282 can create a conceptual command, and has no interaction with the underlying provider 12. In one example embodiment, CSO 282 can return to a consumer application 10 a rowset that contains information about the conceptual schema as defined in the DDF 268. It provides for the return of a subset (or possibly all) information captured in the DDF 268.

CSO 282 may optionally provide a simple way of getting all information about a single Object. For example, instead of having to specify every attribute for a Restaurant, CSO 282 could accept the word "Restaurant" as a parameter and automatically open a rowset with all that information. CSO 282 may also pass transaction requests (for example in SQL) directly to a UPSO 294. Or, CSO 282 may optionally provide a mechanism to join a consumer application 10 with a transaction that has already been started.

The CCO 284 includes a reasoning engine that provides for the translation from a CQL to physical DML query(s) and also translates back the resulting physical rowset(s) to a conceptual rowset(s) in accordance with CQL syntax, rules and procedures as described herein above, and further below. The CCO 284 contains the methods needed to execute commands. Caching at the lowest level (conceptual rowsets) is also managed in CCO 284. The CCO 284 receives CQL queries (T7) and processes them in the reasoning engine. First, however, CCO 284 may, optionally, check to see if the requested rowset is already cached, and if so goes directly to the Conceptual Rowset Object (CRO) 286, which in turn, as explained further below, returns the requested rowset (T17). If the rowset is not cached, the reasoning engine is used to parse the CQL for Objects whose owning catalog name is used as the UDSS name specified to the DLSO 290. The logic of forming queries may also be cached to provide prepared commands. Prepared commands are commands that will be re-used and a stored procedure can be generated on the back-end for these commands.

A request (T10) to create a command for each different UDSS name is then submitted to the DLSO 290. The DLSO 290 in turn determines which physical database and UPSO 294 to use for the command based on the UDSS name (T11). The DLSO 290 invokes its DLDSO 288 session pooling to pick the correct UPSO 294 based on the name of the UDSS and current transaction situation. The DSO's in a UDSS all contain similar data and will most likely (although not necessarily) span servers for performance and availability. The DLSO 290 manages all the different UDSSs and has logic to return UPSOs 294 from the same physical server, if possible, for a given set of UDSSs. Thus, here may be multiple databases (belonging to different UDSSs) existing on the same server, and therefore a single connection (UPSO) to that server can be used to satisfy a request for multiple databases (UDSSs). If this optimization is not possible, then regular load balancing is performed to use multiple UPSOs 294 for multiple UDSS names requested. Since the DSOs 288 within a UDSS are considered equal, they can be efficiently load balanced. This is an optimization that allows distributing the load evenly to different databases and servers. The UDSS performs load balancing among the DSO's (for example a simple round robin technique) when deciding from which physical database to select the session. Once a physical database is selected, the first available session on that DSO is selected to satisfy the request. According to one embodiment, the DLP 270 does not check if the databases within a single UDSS are similar. This means that it is up to the consumer applications 10 to decide on how much discrepancy they can tolerate within a certain UDSS. For very large databases it may be operationally infeasible to ensure that all the databases in a UDSS are identical—it is preferred if there is some predictable degree of coherence between the databases.

The DLSO exposes, via the ITransactionLocal interface of Microsoft's OLE DB, support for coordinating into a single transaction the UPSOs handed out by the DLSO to the CSO. This interface invokes Microsoft's Distributed Transaction Coordinator ® (DTC), which joins each participating UPSO 294 to a single coordinated transaction. It is noted that DTC transactions that span servers are expensive and may be desirable to avoid. DTC transactions that do not span servers are cheap enough that it may be desirable to use them even for a single UPSO transaction. Depending on how the data is partitioned (if at all) the CQE 266 might require more than one UPSO 294 to complete its request. In this case the DLP 270 will be passed multiple UDSS names for which a UPSO 294 is desired. With load balancing, the returned UPSOs 294 could be associated with different servers. If this is a transacted write operation this can become very expensive (a distributed transaction involving multiple servers needs to be performed). The DLP 270 handles this problem by trying to return all requested UPSO 294s from the same physical server. This is an important optimization especially for transacted Read/Write operations since it saves doing a distributed transaction. If the UPSO 294s can not be obtained from the same server then they are returned regardless.

The DLSO 290 then requests (T12) the appropriate UPSO 294 to create an aggregated command, that is, a Data Location Command Object (DLCO) 296, on that session. The DLCO 296 wraps the command methods in the underlying provider command object (UPCO) 285 with error listening (described further below). The outer command DLCO 296 are passed back (T13) to the CCO 296. CCO 284 in turn sets the command text in the underlying DML and requests (T14) it to be executed by the UPCO 285.

The query produces an Underlying Provider Rowset Object (UPRO) 298, which returns (T15) rowsets to the CCO 284. The CCO 284 in turn assembles (T16) conceptual rowsets from the physical rowsets (T16), using conceptual to physical mapping data obtained from DDF 268. The conceptual rowsets are stored in a CRO 286. The CRO 286 in turn returns the conceptual rowsets (T17) to the consumer application 10. Upon request, CCO 284 can provide meta-data information about the columns returned in the conceptual rowset.

The CRO 286 holds the conceptual results in a tabular format very similar to cursors in ODBC or SQL server. One or more conceptual rowsets can be returned as a result of executing a CQL query. These rowsets will support many operations that are allowed on cursors—single row and multiple row fetch, scrolling and changing of data. These rowsets also support adding and deleting of rows and hierarchical data support. Hierarchical data support is achieved through OLE DB's chaptered rowset support. This allows for the chaining of rowsets to more accurately (and efficiently) represent hierarchical data. Rowsets represent the data in its final form and can easily be cached (by keeping an additional reference count on the object, if needed).

The CRO 286 supports manipulating data in the conceptual view and it will perform the necessary operations at the physical level. For example, an addition of a row to a Restaurant rowset would in-turn result in one or more INSERT (and possibly UPDATE) statements at the physical database 261. This provides a transparent, easy way of adding, changing and deleting information on the conceptual rowset and having the changes automatically applied at the physical level. It is assumed that this will be the primary mode of operation that will be utilized by the consumer layer 262. The CRO 286 also provides methods for binding to columns in the rowsets, and meta-data information about the columns returned in the conceptual rowset. CRO 286 allows a consumer application 10 to fetch sequential rows of data, and can provide information about the rowset itself. CRO 286 further provides the methods necessary to update, insert and delete data in a rowset. These operation are in terms of the conceptual rowset and will in-turn be performed in the physical database. The CRO 286 can further provide for scrolling rowsets (useful for the front-end data tools) and for resynchronizing (useful if these rowset are kept open on read/write data).

As noted above, underlying provider commands are aggregated to provide a DLCO 296 that allows for error detection. If a command method call results in a fatal connection error, the DLCO 296 passes the error back to the caller but then releases the UPSO pertaining to that command and attempts to create a new one. If the specified number of new creation attempts (this number originates from the data configuration information in DCD 269) is unsuccessful, the entire UPDSO 292 is marked as unstable and removed from the UDSS and passed to a plumber component that attempts to reestablish a connection. At this point all existing sessions on that UPDSO 292 are released. If following the receipt of an error the user does not release its outer command object, there will still be a reference on that outer command's session. The session will remain (although most likely in an unstable state) until the user releases the outer command. Following a connection error the user may request another command, and the UDSS will attempt to fulfill that request with other available, valid UPDSOs 292. If invoked, the plumber component alternates between attempts to establish contact with the database and periods of sleep. Once the database contact has been established, it is added back to the UDSS.

As indicated above, the CQE 266 CSO 282 implements explicit local transactions instigated by a consumer 10 by deferring to the corresponding DLSO 290. CQE specifies whether or not the returned UPSO 294 will be a possible transaction participant (i.e., used to update the database in some manner). The DLSO 290 keeps track of all UPSOs 294 that are dispensed to CQE 266 as transaction participants and therefore are part of the CQE 266 local transaction scope. When a CQE local transaction is begun, the DLP 270 obtains a distributed transaction object from the DTC, and joins all appropriate UPSOs 294 in that distributed transaction to accomplish the CQE local transaction. For the duration of the CQE 266 local transaction, the DLP 270 keeps an internal reference on each involved UPSO 294. This prevents a UPSO 294 which is part of an active transaction from being released by CQE 266 and added back to the pool before the transaction is over.

Transactions instigated by the consumer application 10 as explained above are considered explicit transactions. CQE 266 also has a need to instigate transactions itself, called implicit transactions in the following cases. A single conceptual insert/update/delete may result in the need for multiple DML (e.g., SQL) statements to be executed on the UPSO 294(s). To ensure that the conceptual insert/update/delete is done as an atomic unit of work, all DML issued to accomplish this insert/update/delete must be inside an implicit transaction. Implicit transactions are normally accomplished by just deferring to the CQE 266 explicit transaction support. Since distributed transactions are fairly expensive, if only one UPSO 294 is involved in the implicit transaction, an optimization is taken. The UPSO 294, which itself supports local transactions by definition, is used directly to accomplish the CQE implicit transaction. Synchronization is done to prevent the UPSO 294 from being involved in a direct local transaction (began to accomplish an implicit CQE transaction) and a distributed transaction (began to accomplish an explicit CQE transaction) at the same time. Note that this optimization of using the single UPSOs 294 local transaction support to accomplish an implicit transaction is not possible for explicit CQE 266 transactions because the CQE 266 consumer application 10 may at any time cause another UPSO 294 to be involved in the CQE 266 transaction scope, whereas CQE 266 knows at the commencement of an implicit CQE 266 transaction all the UPSOs 294 which will be involved, and can therefore use the optimization when only one UPSO 294 is involved.

Although DSL 62 has been described above with respect to processing CQL commands, as noted above, CQE 266, through CSO 282, and DLP 270 also include the capability to pass through standard DML (e.g. SQL). DML can be used to do operations that are not supported in CQL.

Figure 47:
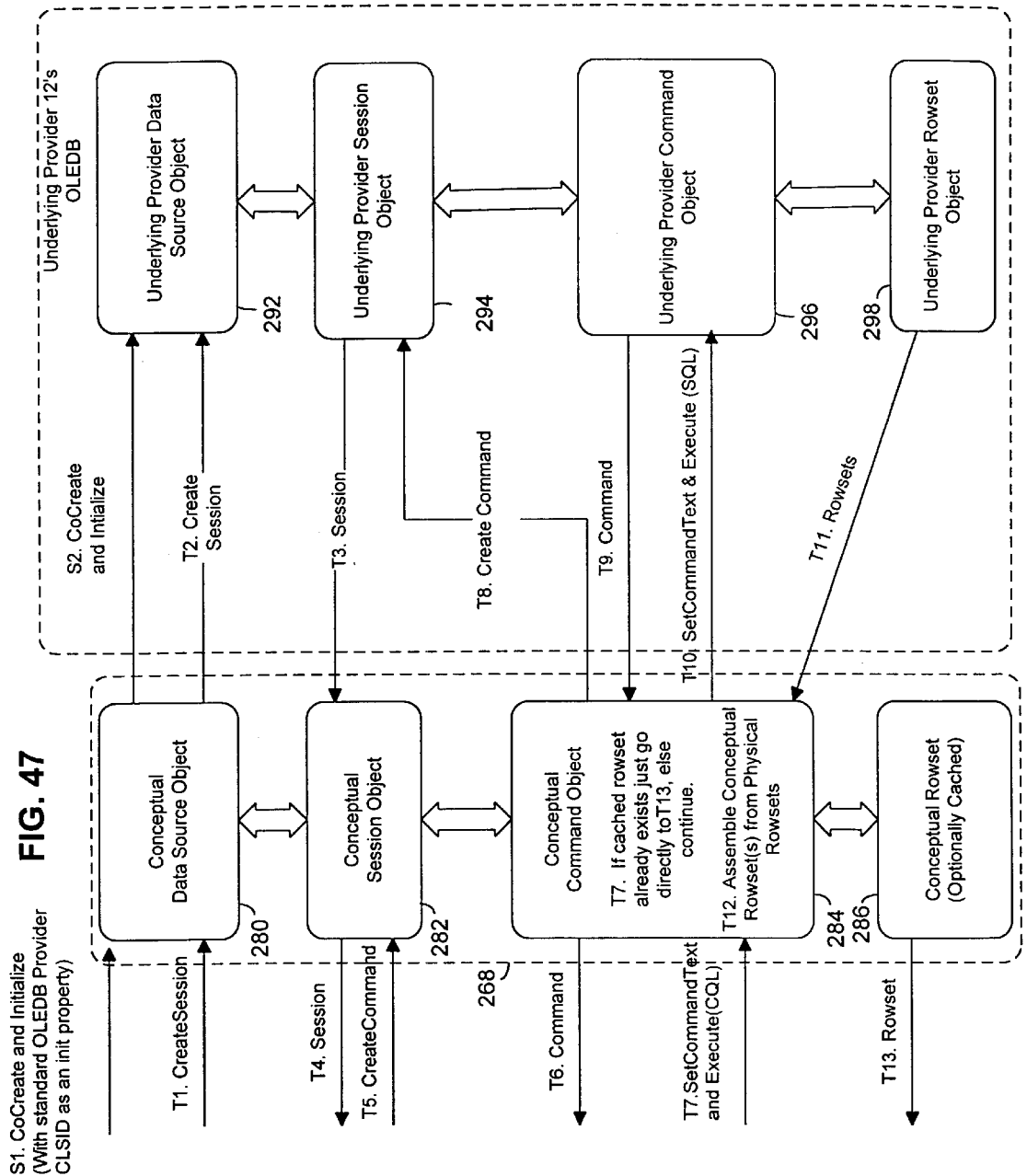
FIG. 47 illustrates an alternate embodiment of the invention.

In an alternate embodiment, the CQE 266 can consume any underlying OLE DB provider. In the example given above, the underlying provider is the DLP 270 since it supports connection pooling, load balancing, fault-tolerance and data partitioning. However, a CQE can be used without having to host the DLP 270. This is controlled by a DSO property that identifies the underlying provider. FIG. 47 demonstrates how this can be done.

CONCLUSION

Thus, there has been described a conceptual query language and system that can be used for querying a database using queries in a form related to the conceptual organization of the data, instead of queries formed around the physical schema of the data. By isolating the physical organization of the data from the conceptual organization, the process of writing queries can be made more intuitive, and the need to rewrite a CQL query in response to a change in physical organization of the data is lessened.

The invention has been described above with respect to various example embodiments. These examples should not be taken to limit the scope of the invention has set forth in the claims appended hereto.

What is claimed is:

1. A method for operating on data stored on a computer readable medium, comprising:
   creating a database of conceptual information and physical information about the data, wherein the conceptual information is mapped to the physical information, and storing the database on a computer readable data storage medium;
   receiving a conceptual request to operate on the data, wherein the conceptual request is in a form related to a conceptual organization of the data; and
   in response to the conceptual request, creating a data manipulation request to operate on the data by referencing the database of conceptual information and physical information about the data, and wherein the data manipulation request references the data at least in part in a manner related to a physical organization of the data.

2. A method according to claim 1 wherein the conceptual information is expressed in terms of data entities that have a relationship to one another.

3. A method according to claim 2 wherein the conceptual request identifies data to be operated on as entities, and not by the physical information about the data.

4. A method according to claim 1 wherein the conceptual information is derived from a conceptual model of the data.

5. A method according to claim 1 where the conceptual information is derived from an Entity-Relation model of the data.

6. A method according to claim 4 wherein a mapping of the conceptual model is stored in a spreadsheet.

7. A method according to claim 4 wherein a mapping of the conceptual model is stored in plain text.

8. A method according to claim 1 wherein the data manipulation request is submitted to a host physical system, and wherein the physical information is automatically extracted from the host physical system by inspection thereof.

9. A method according to claim 1 wherein the conceptual request is written in a conceptual query language (CQL) which substantially uses terms belonging to or derived from a natural language.

10. A method according to claim 9 wherein the natural language is substantially American English.

11. A method according to claim 9 wherein the CQL includes terms in the classes of objects and predicates.

12. A method according to claim 11 wherein the predicates indicate one or more roles the objects play.

13. A method according to claim 9 wherein the data is organized in rows, and CQL includes a select command that retrieves data in rows.

14. A method according to claim 13 wherein the rows may be organized hierarchically.

15. A method according to claim 1 further including receiving the conceptual request in a data services layer, and wherein the data services layer creates the data manipulation request.

16. A method according to claim 15 wherein the data services layer is designed specifically for a particular type of physical data store.

17. A method according to claim 15 wherein at least two different data services layers can be used to receive the same conceptual request, and wherein each different data services layer creates a different data manipulation request depending on the underlying physical data store of a particular data services layer.

18. A method according to claim 1 wherein the conceptual information is mapped to the physical information at a first time, the physical information is changed at a later time, and the conceptual information is re-mapped to the changed physical information; and wherein a second conceptual request received after the conceptual information is re-mapped results in a second data manipulation request that references the changed physical information without a change in the form of conceptual requests.

19. A method according to claim 1 wherein the conceptual information is mapped to the physical information at a first time, the conceptual information is changed at a later time, and the changed conceptual information is re-mapped to the physical information; and wherein a second conceptual request received after the conceptual information is re-mapped results in a second data manipulation request that references the physical information without a change in the form of conceptual requests.

20. A method according to claim 15 wherein the conceptual information is mapped to the physical information at a first time, the conceptual information is changed at a later time, and the changed conceptual information is re-mapped to the physical information; and wherein a second conceptual request received after the conceptual information is re-mapped results in a second data manipulation request that references the physical information without a change in the form of conceptual requests.

21. A method according to claim 1 further comprising providing a profile of performance characteristics related to retrieving the data, and wherein the data manipulation request is formed based in part on the profile of performance characteristics.

22. A method according to claim 21 further including receiving the conceptual request in a data services layer, and wherein the data services layer creates the data manipulation request using the profile of performance characteristics.

23. A method according to claim 22 wherein the profile of performance characteristics is used by differing data services layers independent of the particulars of conceptual requests submitted to the data services layers.

24. A method according to claim 23 wherein the profile of performance characteristics embody knowledge of different operating environments including the nature and quantity of the data, characteristics of an interpreter of the data manipulation request, and the network topology.

25. A method according to claim 24 wherein the profile of performance characteristics provides domain specific knowledge to the differing data services layers in a generic fashion, so that the differing data services layers remain domain independent.

26. Apparatus for operating on data stored on a computer readable medium, comprising:

a database of conceptual information and physical information about the data, the database stored on a computer readable data storage medium;

one or more software components configured to execute on a computer and receive a machine-readable request to operate on the data, wherein the request is in a form related to a conceptual organization of the data; and the one or more software components further configured to produce a machine-readable query to operate on the data, wherein the query is formed by referencing the database of conceptual information and physical information about the data.

27. Apparatus according to claim 26 wherein the conceptual information is obtained from an object-relational-model of the data.

28. Apparatus according to claim 26 wherein the physical information indicates how the data is organized on the data storage medium.

29. Apparatus according to claim 26 wherein the request is written in a conceptual query language (CQL) which substantially uses terms belonging to or derived from a natural language.

30. Apparatus according to claim 29 wherein the natural language is substantially American English.

31. Apparatus according to claim 29 wherein the CQL includes terms in the classes of objects and predicates.

32. Apparatus according to claim 31 wherein the predicates specify roles that the objects play.

33. Apparatus according to claim 29 wherein the data is organized in rows, and CQL includes a select command that retrieves data in rows.

34. Apparatus according to claim 26 further including a set of data representing a profile of performance characteristics related to how to retrieve the data, and wherein the data manipulation request is formed based at least in part on the profile of performance characteristics.

35. A computer readable medium having a computer program encoded therein, wherein the computer program is executable on a computer to perform the method of claim 1.

36. A computer readable medium having a computer program encoded therein, wherein the computer program is executable on a computer to perform the method of claim 9.

37. Apparatus for operating on data stored on a computer readable medium, comprising:

a database of conceptual information and physical information about the data, the database stored on a computer readable data storage medium;

means for receiving a machine-readable request to operate on the data, wherein the request is in a form related to a conceptual organization of the data; and means for producing a machine-readable query to operate on the data, wherein the query is formed by referencing the database of conceptual information and physical information about the data.

38. Apparatus according to claim 37 wherein the conceptual information is obtained from an object-relational-model of the data.

39. Apparatus according to claim 38 wherein the physical information indicates how the data is organized on the data storage medium.

40. Apparatus according to claim 39 wherein the request is written in a conceptual query language (CQL) which substantially uses terms belonging to or derived from a natural language.

41. Apparatus according to claim 40 wherein the natural language is substantially American English.

42. Apparatus according to claim 40 wherein the CQL includes terms in the classes of objects and predicates.

43. Apparatus according to claim 42 wherein the predicates specify roles that the objects play.

44. Apparatus according to claim 40 wherein the data is organized in rows, and CQL includes a select command that retrieves data in rows.

45. Apparatus according to claim 37 further including a set of data representing a profile of performance characteristics related to how to retrieve data, and wherein the data manipulation request is formed based at least in part on the performance characteristics.

46. Apparatus according to claim 37 wherein the means for receiving includes a data manipulation request engine and a data provider, wherein the data provider includes means for managing sessions in the database, and wherein the means for producing a machine-readable query includes a query engine to translate a CQL data manipulation request to the machine-readable request to operate on the data, and to submit the machine-readable request to the data provider.

47. Apparatus according to claim 37 wherein the machine-readable query is written in a data manipulation language.

48. Apparatus according to claim 47 wherein the data manipulation language is standard query language (SQL).

* * * * *

UNITED STATES PATENT AND TRADEMARK OFFICE
CERTIFICATE OF CORRECTION

PATENT NO.   : 6,460,043 B1
DATED        : October 1, 2002
INVENTOR(S)  : Tabbara et al.

It is certified that error appears in the above-identified patent and that said Letters Patent is hereby corrected as shown below:

Column 6,
Line 14, replace "enviromnent" with -- environment --.

Column 10,
Line 9, replace "COL" with -- CQL --.

Column 14,
Line 6, replace "For e" with -- Foreign --.
Line 40, replace "How Annotations are Typically Combined into Mappings" with -- How annotations are typically combined into mappings --.

Column 16,
Line 31, replace "SPhysicalMapping" with -- SPhysicalMapping --.

Column 18,
Line 1, replace "COL" with -- CQL --.
Line 40, replace "COL" with -- CQL --.
Line 64, replace "COL" with -- CQL --.

Column 28,
Line 33, delete "The following example Delete all Italian resturants."
Between lines 35 and 36, insert -- DELETE [CASCADE] Restaurant [Cuisine. CuisineType= 'Italian'] --.

UNITED STATES PATENT AND TRADEMARK OFFICE
CERTIFICATE OF CORRECTION

PATENT NO.   : 6,460,043 B1
DATED        : October 1, 2002
INVENTOR(S)  : Tabbara et al.

It is certified that error appears in the above-identified patent and that said Letters Patent is hereby corrected as shown below:

Column 30,
Line 16, replace "filly" with -- fully --.

Column 41,
Lines 5 and 24, replace "COE" with -- CQE --.

Signed and Sealed this

Eighteenth Day of February, 2003

JAMES E. ROGAN
*Director of the United States Patent and Trademark Office*